(12) United States Patent
Ozcan et al.

(10) Patent No.: US 12,448,512 B2
(45) Date of Patent: Oct. 21, 2025

(54) SURFACE-MODIFIED AND DRIED MICROFIBRILLATED CELLULOSE REINFORCED THERMOPLASTIC BIOCOMPOSITES

(71) Applicants: UT-Battelle, LLC, Oak Ridge, TN (US); FiberLean Technologies Limited, Par (GB)

(72) Inventors: Soydan Ozcan, Oak Ridge, TN (US); Kai Li, Knoxville, TN (US); Halil Tekinalp, Knoxville, TN (US); Xianhui Zhao, Oak Ridge, TN (US); Jon Phipps, Gorran Haven (GB); Sean Ireland, Hampden, ME (US)

(73) Assignees: UT-BATTELLE, LLC, Oak Ridge, TN (US); FIBERLEAN TECHNOLOGIES LIMITED, Par (GB)

( * ) Notice: Subject to any disclaimer, the term of this patent is extended or adjusted under 35 U.S.C. 154(b) by 752 days.

(21) Appl. No.: 17/371,581

(22) Filed: Jul. 9, 2021

(65) Prior Publication Data
US 2022/0064437 A1 Mar. 3, 2022

Related U.S. Application Data

(63) Continuation of application No. PCT/US2021/041039, filed on Jul. 9, 2021.

(60) Provisional application No. 63/051,614, filed on Jul. 14, 2020.

(51) Int. Cl.
*C08L 67/04* (2006.01)
*C08B 3/08* (2006.01)
*C08L 1/10* (2006.01)

(52) U.S. Cl.
CPC ............. *C08L 67/04* (2013.01); *C08B 3/08* (2013.01); *C08L 1/10* (2013.01); *C08L 2205/16* (2013.01)

(58) Field of Classification Search
CPC ........ C08L 67/04; C08L 1/10; C08L 2205/16; C08B 3/08
See application file for complete search history.

(56) References Cited

U.S. PATENT DOCUMENTS

| 4,980,232 A | * | 12/1990 | Prevorsek | ............... | C08J 5/046 428/401 |
| 2006/0183821 A1 | * | 8/2006 | Kaspers | .................. | C08K 5/34 524/99 |
| 2019/0002591 A1 | * | 1/2019 | English | ..................... | C08B 3/08 |

FOREIGN PATENT DOCUMENTS

JP 2012111855 A * 6/2012

OTHER PUBLICATIONS https://worldwide.espacenet.com/publicationDetails/biblio?CC=JP&NR=2012111855A&KC=A&FT=D&ND=3&date=20120614&DB=EPODOC&locale=en_EP (Year: 2012).*

(Continued)

*Primary Examiner* — Catherine S Branch
*Assistant Examiner* — Olga Lucia Donahue
(74) *Attorney, Agent, or Firm* — WARNER NORCROSS + JUDD LLP

(57) ABSTRACT

A process for producing dried, vinyl carboxylate surface-modified microfibrillated cellulose having improved mechanical properties and a microfibril structure and a process for producing a vinyl carboxylate, surface-modified microfibrillated cellulose-thermoplastic polyester or thermoplastic polyolefin composite material having improved mechanical strength properties utilizing dried, vinyl carboxylate surface-modified microfibrillated cellulose.

24 Claims, 29 Drawing Sheets

(56) References Cited

OTHER PUBLICATIONS

Alliance, A. T. Cellulose Nanomaterials Research Roadmap; 2016, 68 pages.
Arias, A.; Heuzey, M.-C.; Huneault, M. A.; Ausias, G.; Bendahou, A., "Enhanced Dispersion of Cellulose Nanocrystals in Melt-processed Polylactide-based Nanocomposites", Cellulose 2014, 22, 483-498.
Dhuiège, B.; Pecastaings, G.; Sèbe, G., "Sustainable Approach for the Direct Functionalization of Cellulose Nanocrystals Dispersed in Water by Transesterification of Vinyl Acetate", ACS Sustainable Chem. Eng. 2019, 7, 187-196.
Ding, W.; Jahani, D.; Chang, E.; Alemdar, A.; Park, C. B.; Sain, M., "Development of PLA/cellulosic Fiber Composite Foams Using Injection Molding: Crystallization and Foaming Behaviors", Compos. Part A Appl. Sci. Manuf. 2016, 83, 130-139.
Gupta, A.; Simmons, W.; Schueneman, G. T.; Hylton, D.; Mintz, E. A., "Rheological and Thermo-mechanical Properties of Poly(lactic acid)/lignin-coated Cellulose Nanocrystal Composites", ACS Sustainable Chem. Eng. 2017, 5, 1711-1720.
Habibi, Y., "Key Advances in the Chemical Modification of Nanocelluloses", Chem. Soc. Rev. 2014, 43, 1519-1542.
Hu, Z.; Berry, R. M.; Pelton, R.; Cranston, E. D., "One-pot Water-based Hydrophobic Surface Modification of Cellulose Nanocrystals Using Plant Polyphenols", ACS Sustainable Chem. Eng. 2017, 5, 5018-5026.
Iwatake, A.; Nogi, M.; Yano, H., "Cellulose Nanofiber-reinforced Polylactic Acid", Compos. Sci. Technol. 2008, 68, 2103-2106.
Jonoobi, M.; Harun, J.; Mathew, A. P.; Oksman, K., "Mechanical Properties of Cellulose Nanofiber (CNF) Reinforced Polylactic Acid (PLA) Prepared by Twin Screw Extrusion", Compos. Sci. Technol. 2010, 70, 1742-1747.
Jonoobi, M.; Mathew, A. P.; Abdi, M. M.; Makinejad, M. D.; Oksman, K., "A Comparison of Modified and Unmodified Cellulose Nanofiber Reinforced Polylactic Acid (pla) Prepared by Twin Screw Extrusion", J. Polym. Environ. 2012, 20, 991-997.
Li, K.; Skolrood, L.; Aytug, T.; Tekinalp, H.; Ozcan, S., "Strong and Tough Cellulose Nanofibrils Composite Films: Mechanism of Synergetic Effect of Hydrogen Bonds and Ionic Interactions", ACS Sustainable Chem. Eng. 2019, 7, 14341-14346.
Li, K.; Wang, Y.; Rowe, M.; Zhao, X.; Li, T.; Tekinalp, H.; Ozcan, S., "Poly(lactic acid) Toughening Through Chain End Engineering", ACS Appl. Polym. Mater. 2020, 2, 411-417.
Lin, N.; Huang, J.; Chang, P. R.; Feng, J.; Yu, J., "Surface Acetylation of Cellulose Nanocrystal and its Reinforcing Function in Poly(lactic acid)", Carbohydr. Polym. 2011, 83, 1834-1842.
Lee, J. H.; Park, S. H.; Kim, S. H., "Surface Modification of Cellulose Nanowhiskers and their Reinforcing Effect in Polylactide", Macromol. Res. 2014, 22, 424-430.
Lu, Y.; Tekinalp, H. L.; Eberle, C. C.; Peter, W.; Naskar, A. K.; Ozcan, S., "Nanocellulose in Polymer Composites and Biomedical Applications", Tappi J., 2014, 13, 47-54.
Lu, Y.; Armentrout, A. A.; Li, J.; Tekinalp, H. L.; Nanda, J.; Ozcan, S., "A Cellulose Nanocrystal-based Composite Electrolyte with Superior Dimensional Stability for Alkaline Fuel Cell Membranes", J. Mater. Chem. A, 2015, 3, 13350-13356.
Miao, C.; Hamad, W. Y., "Cellulose Reinforced Polymer Composites and Nanocomposites: A Critical Review", Cellulose 2013, 20, 2221-2262.
Meng, X.; Nguyen, N. A.; Tekinalp, H.; Lara-Curzio, E.; Ozcan, S., "Supertough PLA-silane Nanohybrids by in Situ Condensation and Grafting", ACS Sustainable Chem. Eng. 2018, 6, 1289-1298.
Okubo, K.; Fujii, T.; Thostenson, E. T., "Multi-scale Hybrid Biocomposite: Processing and Mechanical Characterization of Bamboo Fiber Reinforced PLA with Microfibrillated Cellulose", Compos. Part A Appl. Sci. Manuf. 2009, 40, 469-475.
Palange, C.; Johns, M. A.; Scurr, D. J.; Phipps, J. S.; Eichhorn, S. J., "The Effect of the Dispersion of Microfibrillated Cellulose on the Mechanical Properties of Melt-compounded Polypropylene-polyethylene Copolymer", Cellulose, Sep. 27, 2019, vol. 26, 9645-9659.
ASTM Standard D638-03. "Standard Test Method for Tensile Properties of Plastics", West Conshohocken, PA: ASTM International. 2003, 17 pages.
Pandey, J. K.; Lee, C. S.; Ahn, S.-H., "Preparation and Properties of Bio-nanoreinforced Composites from Biodegradable Polymer Matrix and Cellulose Whiskers", J. Appl. Polym. Sci. 2010, 115, 2493-2501.
Qu, P.; Zhou, Y.; Zhang, X.; Yao, S.; Zhang, L., "Surface Mmodification of Cellulose Nanofibrils for Poly(lactic acid) Composite Application", J. Appl. Polym. Sci. 2012, 125, 3084-3091.
Qi, X.; Yang, G.; Jing, M.; Fu, Q.; Chiu, F.-C., "Microfibrillated Cellulose-reinforced Bio-based Poly(propylene carbonate) with Dual Shape and Self-healing Properties", J. Mater. Chem. A, 2014, 2, 20393-20401.
Raquez, J.-M.; Habibi, Y.; Murariu, M.; Dubois, P., "Polylactide (PLA)-based Nanocomposites", Prog. Polym. Sci. 2013, 38, 1504-1542.
Robles, E.; Urruzola, I.; Labidi, J.; Serrano, L., "Surface-modified Nano-cellulose as Reinforcement in Poly(lactic acid) to Conform New Composites", Ind. Crop. Prod. 2015, 71, 44-53.
Siqueira, G.; Bras, J.; Dufresne, A., "Cellulose Whiskers Versus Microfibrils: Influence of the Nature of the Nanoparticle and its Surface Functionalization on the Thermal and Mechanical Properties of Nanocomposites", Biomacromolecules 2009, 10, 425-432.
Sung, S. H.; Chang, Y.; Han, J., "Development of Polylactic Acid Nanocomposite Films Reinforced with Cellulose Nanocrystals Derived From Coffee Silverskin", Carbohydr. Polym. 2017, 169, 495-503.
Suryanegara, L.; Okumura, H.; Nakagaito, A. N.; Yano, H., "The Synergetic Effect of Phenylphosphonic Acid Zinc and Microfibrillated Cellulose on the Injection Molding Cycle Time of PLA Composites", Cellulose 2011, 18, 689-698.
Suryanegara, L.; Nakagaito, A. N.; Yano, H., Thermo-mechanical Properties of Microfibrillated Cellulose-reinforced Partially Crystallized PLA Composites. Cellulose 2010, 17, 771-778.
Suryanegara, L.; Nakagaito, A. N.; Yano, H., "The Effect of Crystallization of PLA on the Thermal and Mechanical Properties of Microfibrillated Cellulose-reinforced PLA Composites", Compos. Sci. Technol. 2009, 69, 1187-1192.
Tanpichai, S.; Sampson, W. W.; Eichhorn, S. J., "Stress-transfer in Microfibrillated Cellulose Reinforced Poly(lactic acid) Composites Using Raman Spectroscopy", Compos. Part A Appl. Sci. Manuf. 2012, 43, 1145-1152.
Tekinalp, H. L.; Meng, X.; Lu, Y.; Kunc, V.; Love, L. J.; Peter, W. H.; Ozcan, S., "High Modulus Biocomposites via Additive Manufacturing: Cellulose Nanofibril Networks as Microsponges", Compos. B. Eng. 2019, 173, 106817.
Tingaut, P.; Zimmermann, T.; Lopez-Suevos, F., "Synthesis and Characterization of Bionanocomposites with Tunable Properties from Poly(lactic acid) and Acetylated Microfibrillated Cellulose", Biomacromolecules 2010, 11, 454-64.
Van den Oever, M.; Beck, B.; Müssig, J., "Agrofibre Reinforced Poly (lactic acid) Composites: Effect of Moisture on Degradation and Mechanical Properties", Compos. Part A Appl. Sci. Manuf. 2010, 41, 1628-1635.
Xiao, L.; Mai, Y.; He, F.; Yu, L.; Zhang, L.; Tang, H.; Yang, G., "Bio-based Green Composites with High Performance from Poly(lactic acid) and Surface-modified Microcrystalline Cellulose", J. Mater. Chem. 2012, 22, 15732-15739.
Yoo, Y.; Youngblood, J. P., "Green One-pot Synthesis of Surface Hydrophobized Cellulose Nanocrystals in Aqueous Medium", ACS Sustainable Chem. Eng. 2016, 4, 3927-3938.
Yu, H. Y.; Zhang, H.; Song, M. L.; Zhou, Y.; Yao, J.; Ni, Q. Q., "From Cellulose Nanospheres, Nanorods to Nanofibers: Various Aspect Ratio Induced Nucleation/Reinforcing Effects on Polylactic Acid for Robust-barrier Food Packaging", ACS Appl. Mater. Interfaces 2017, 9, 43920-43938.
Zhao, X.; Tekinalp, H.; Meng, X.; Ker, D.; Benson, B.; Pu, Y.; Ragauskas, A. J.; Wang, Y.; Li, K.; Webb, E.; Gardner, D. J.;

(56) References Cited

OTHER PUBLICATIONS

Anderson, J.; Ozcan, S., "Poplar as biofiber reinforcement in composites for large-scale 3D printing. ACS Applied Bio Materials", 2019, 2, 4557-4570.
Zimmermann, M. V. G.; Borsoi, C.; Lavoratti, A.; Zanini, M.; Zattera, A. J.; Santana, R. M. C., "Drying Techniques Applied to Cellulose Nanofibers", J. Reinf. Plast. Compos. 2016, 35, 628-643. I.
Cetin Nihat Sami et al: "Acetylation of Cellulose Nanowhiskers with Vinyl Acetate under Moderate Conditions : Acetylation of Cellulose Nanowhiskers with Vinyl Acetate under? . . . ", Macromolecular BioScience, vol. 9, No. 10, Jul. 13, 2009 (Jul. 13, 2009).
International Search Report mailed Dec. 2, 2021 in International Application No. PCT/US2021/041039, 15 pages.
Kai Li, et al., "Surface-Modified and Oven-Dried Microfibrillated Cellulose Reinforced Biocomposites: Cellulose Network Enabled High Performance", Carbohydrate Polymers 256 (2021) 117525, 12 pages.
International Preliminary Report on Patentability mailed Jan. 17, 2023 in International Application No. PCT/US2021/041039, 8 pages.
Palange Caterina, et al., "The Effect of the Dispersion of Microfibrillated Cellulose on the Mechanical Properties of Melt-compounded Polypropylene-polyethylene Copolymer", Cellulose, Springer Netherlands, Netherlands, Sep. 27, 2019, vol. 26, 9645-9659.
Suryanegara, L., et al, "The Effect of Crystallization of PLA on the Thermal and Mechanical Properties of Microfibrillated Cellulose-reinforced PLA Composites", Compos. Sci. Technol., Jun. 1, 2009, vol. 69, 1187-1192.

\* cited by examiner

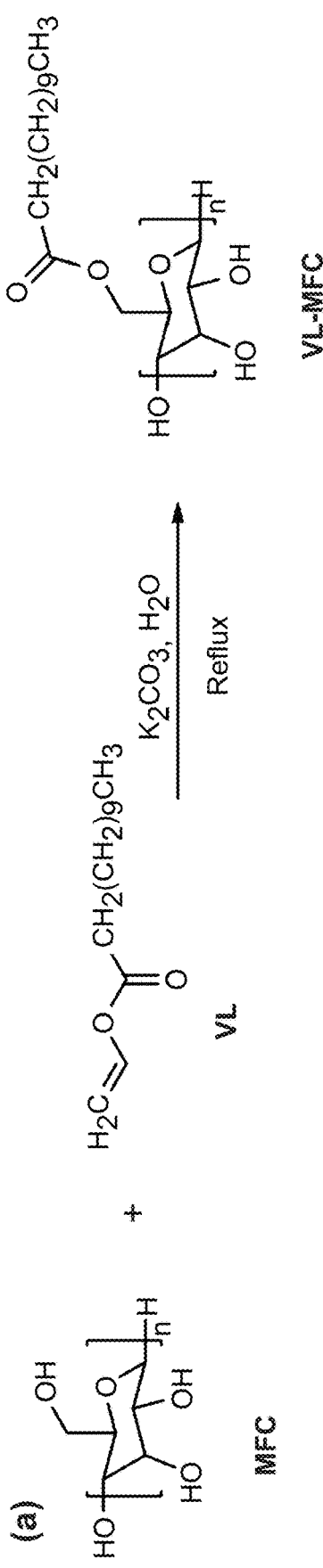
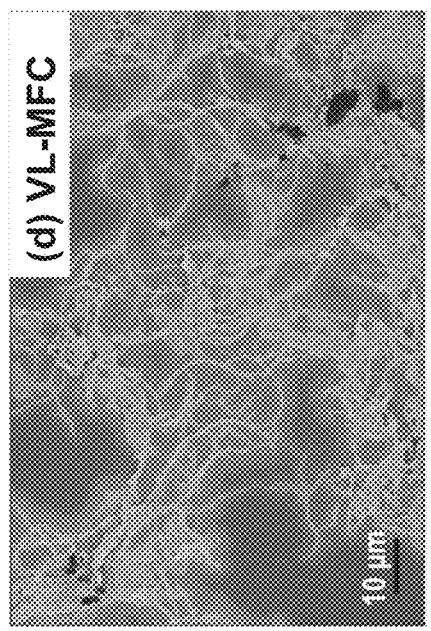
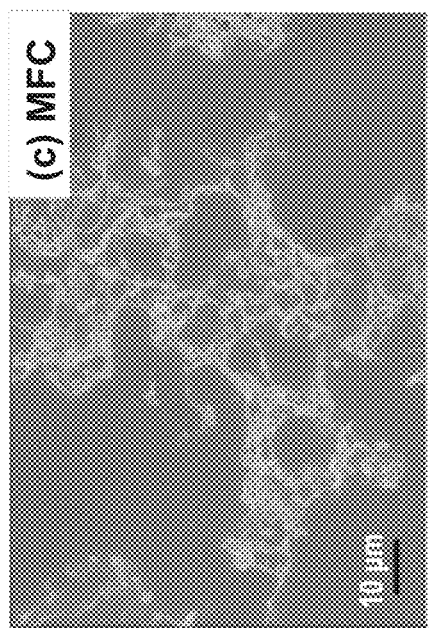
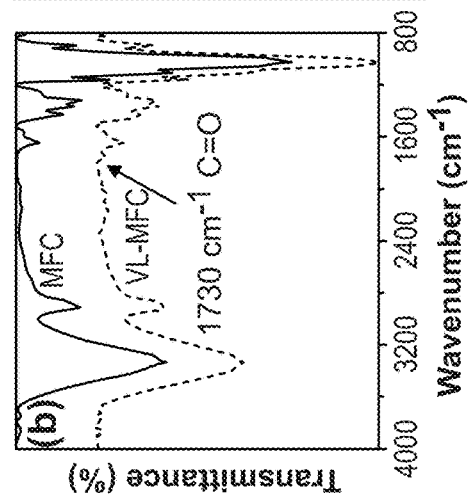

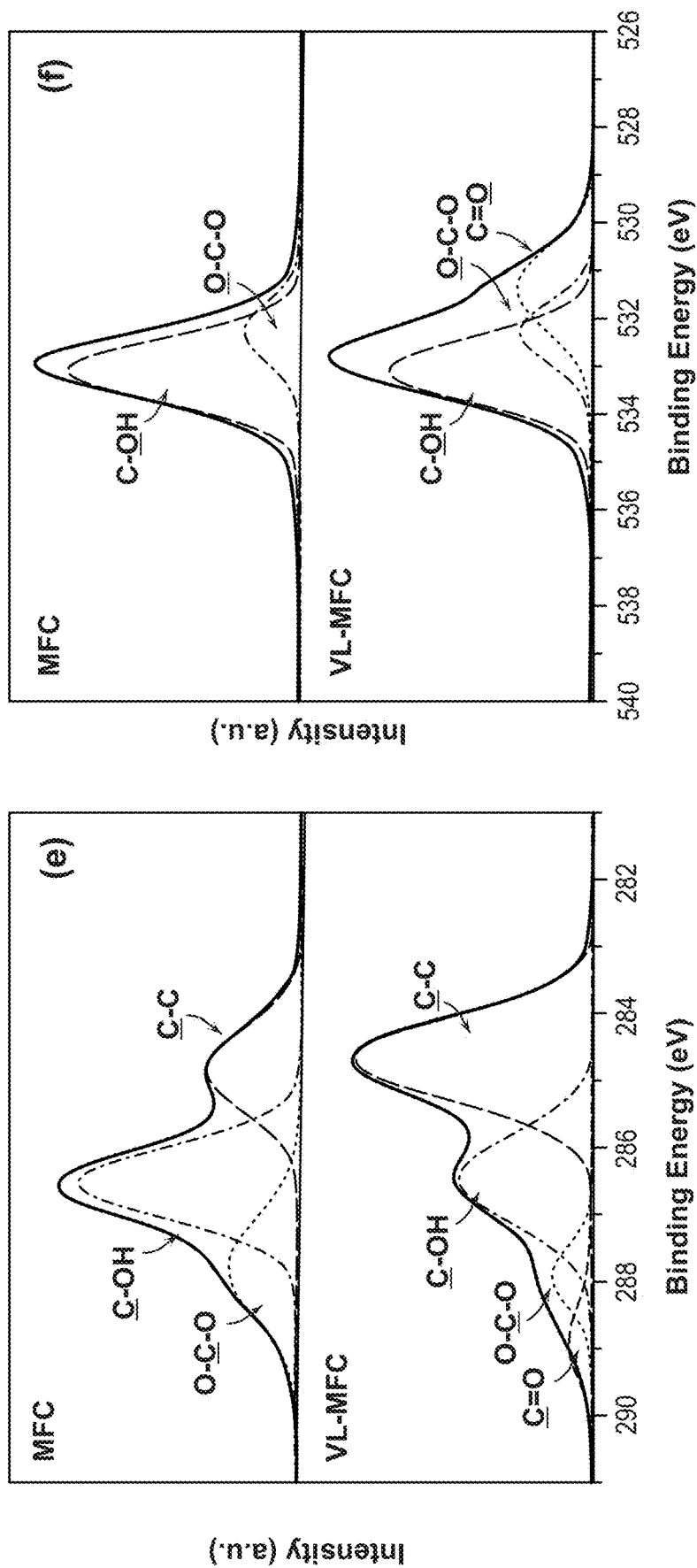

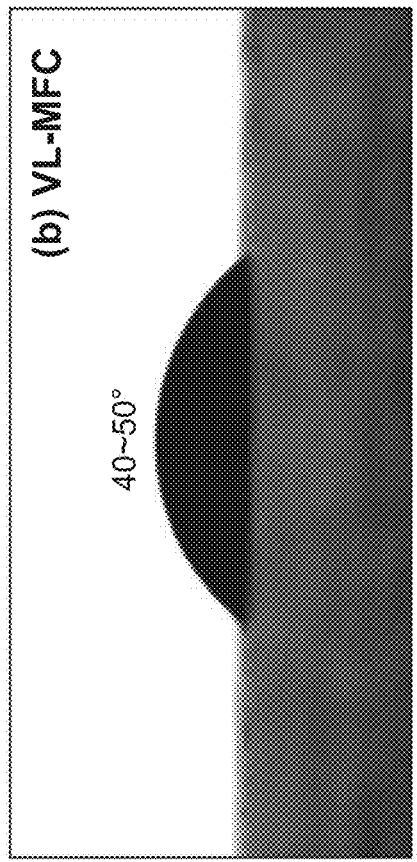
FIG. 2A
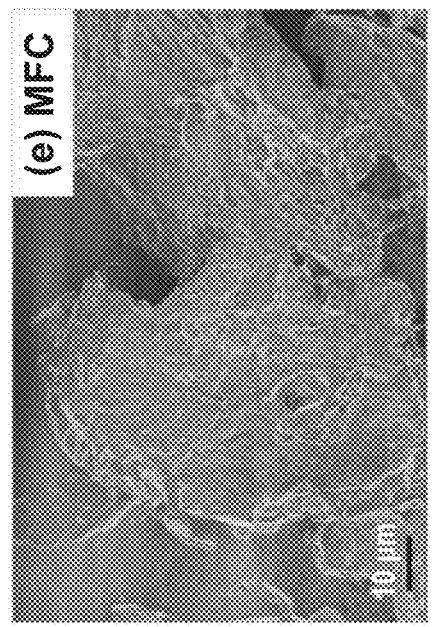
FIG. 2B
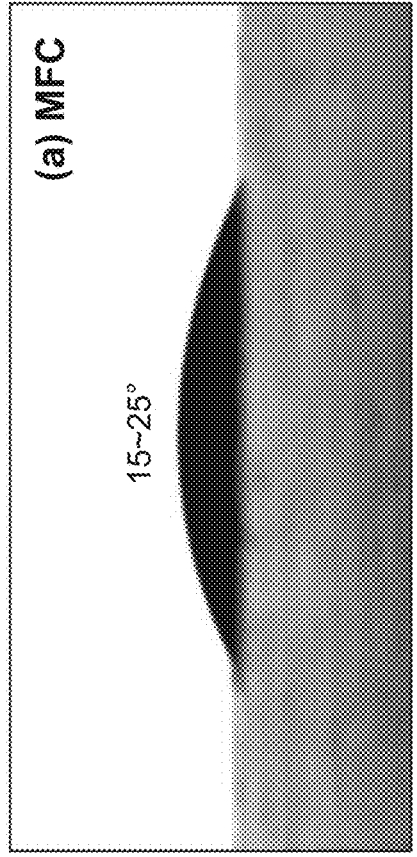
FIG. 2C
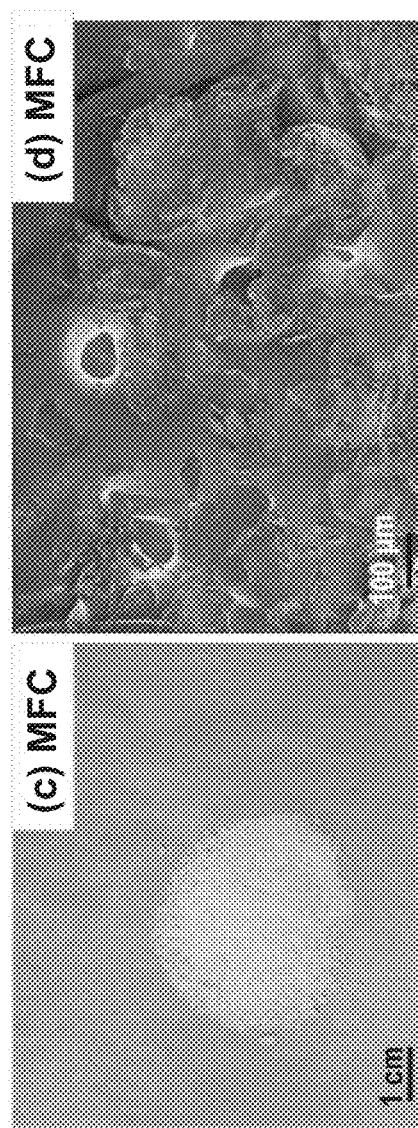
FIG. 2D
FIG. 2E

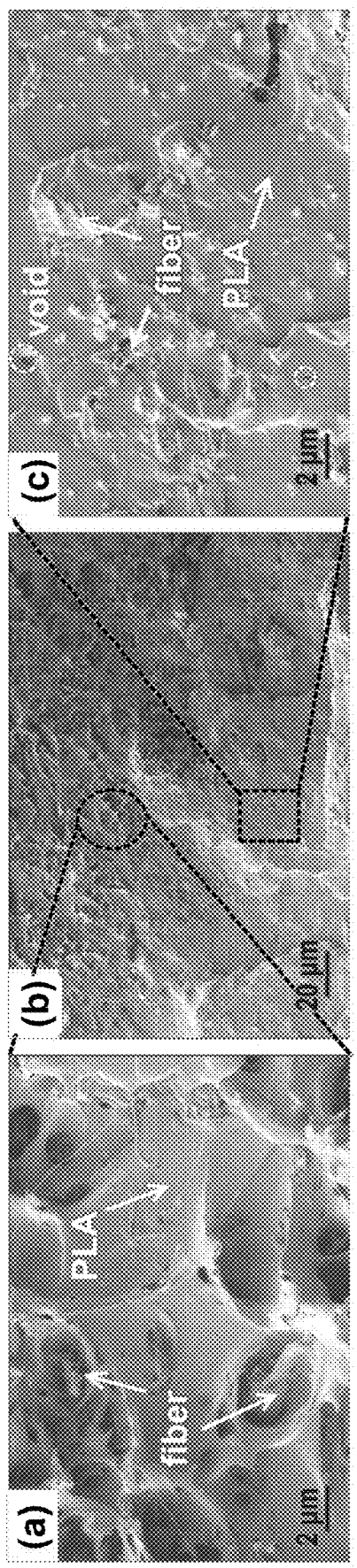
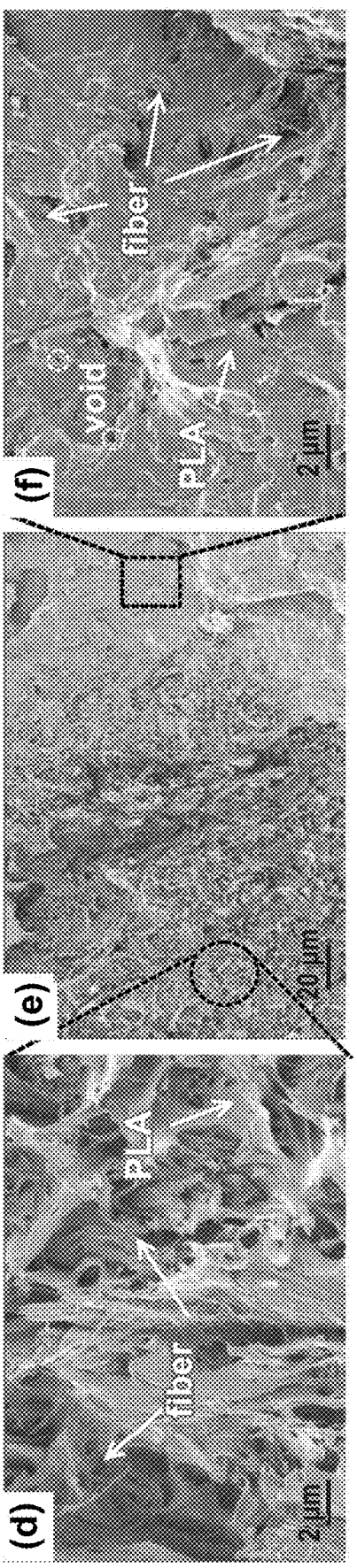
FIG. 5A  FIG. 5B  FIG. 5C
FIG. 5D  FIG. 5E  FIG. 5F

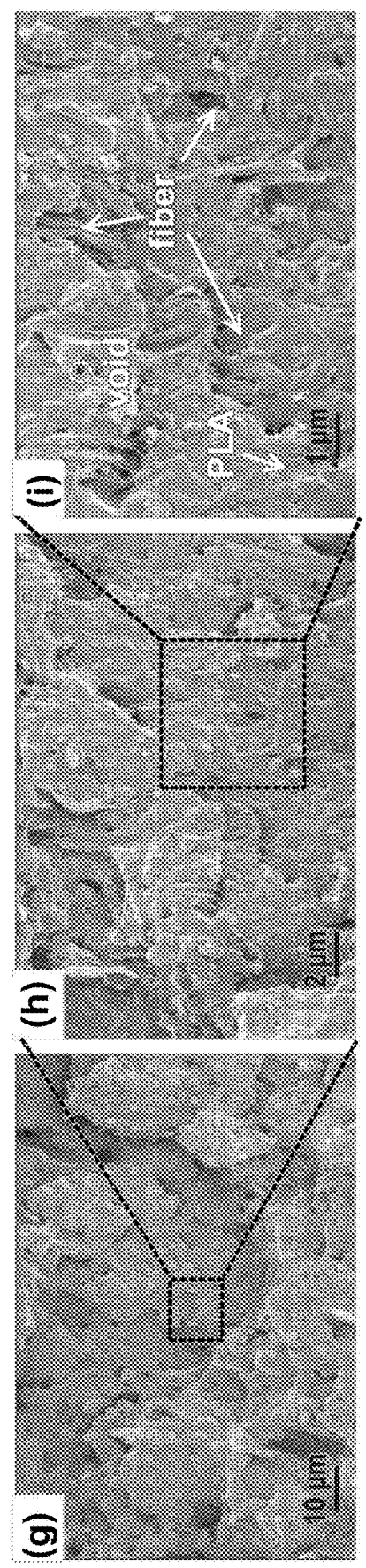

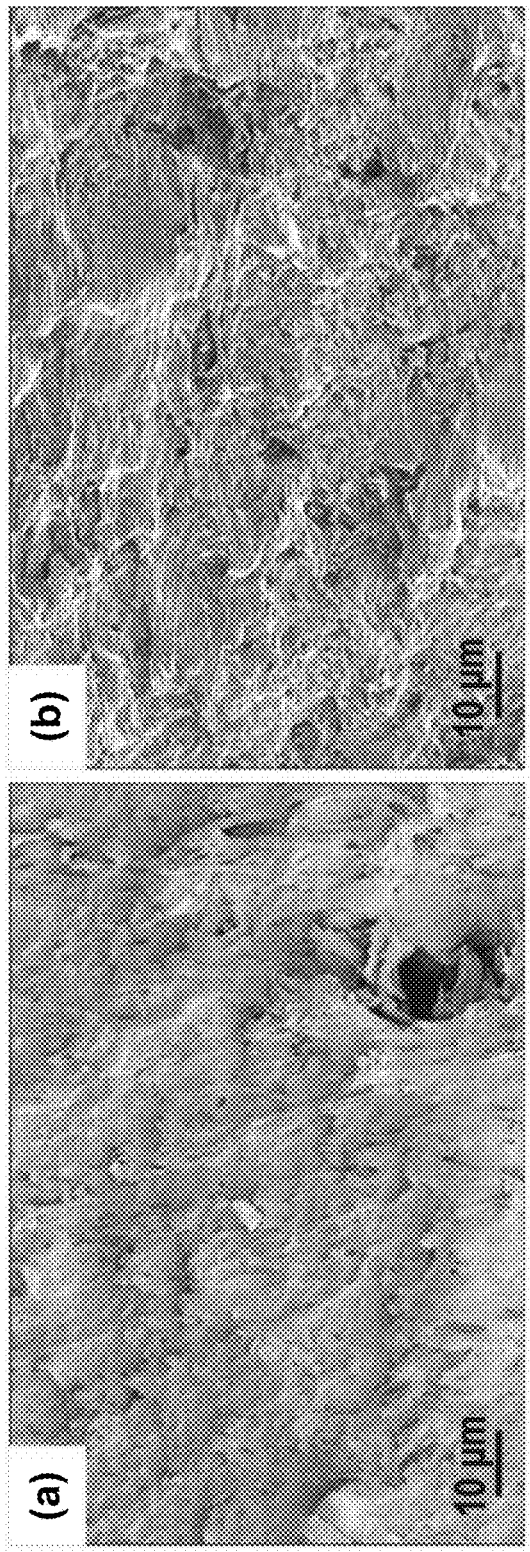
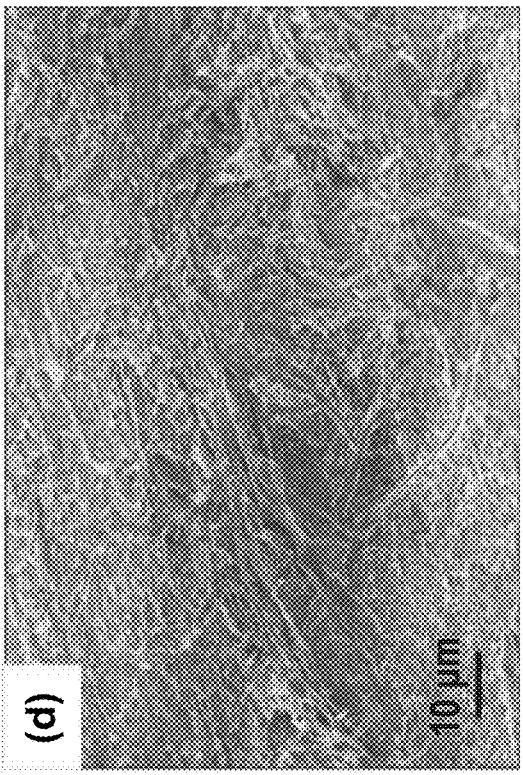
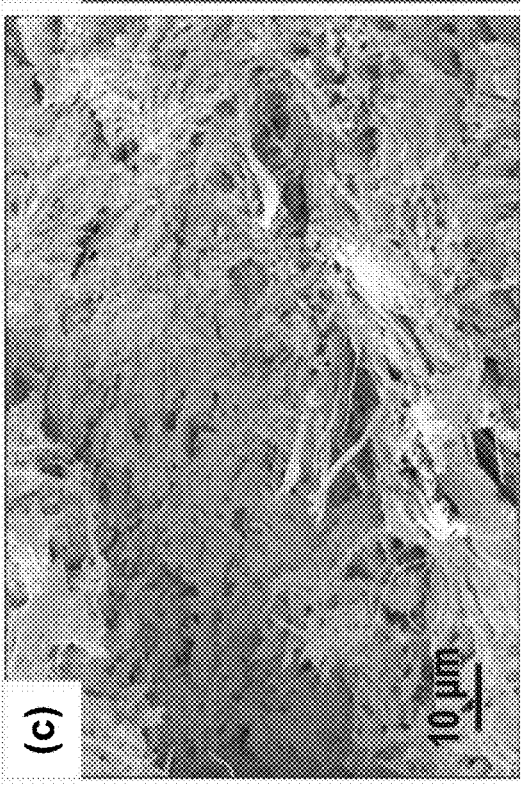
FIG. 6A  FIG. 6B  FIG. 6C  FIG. 6D (a)

(b)

SURFACE-MODIFIED AND DRIED MICROFIBRILLATED CELLULOSE REINFORCED THERMOPLASTIC BIOCOMPOSITES

CROSS REFERENCE TO RELATED APPLICATIONS

This application is a continuation of International Patent Application No. PCT/US2021/041039 filed Jul. 9, 2021 and claims the benefit of U.S. Provisional Patent Application No. 63/051,614, filed Jul. 14, 2020, the entire contents of which is incorporated herein by reference.

STATEMENT REGARDING FEDERALLY SPONSORED RESEARCH OR DEVELOPMENT

This invention was made with United States government support by US Department of Energy (DOE), Office of Energy Efficiency and Renewable Energy, Advanced Manufacturing Office, under contract DE-AC05-000R22725 with UT-Battelle LLC.

FIELD OF INVENTION

Surface-Modified and Dried Microfibrillated Cellulose Reinforced Thermoplastic Biocomposites.

BACKGROUND OF THE INVENTION

Nanocellulose, e.g., nano- and microfibrillated cellulose, is widely and desirably used as a reinforcement filler for biocomposites. Rapidly growing interest in using nano- and microfibrillated cellulose to reinforce polymer resins is attributable to its unique properties of high specific strength and modulus, high aspect ratio, light weight, low cost, biodegradability, and renewability. Miao, C.; Hamad, W. Y., Cellulose reinforced polymer composites and nanocomposites: a critical review. Cellulose 2013, 20, 2221-2262; Raquez, J.-M.; Habibi, Y.; Murariu, M.; Dubois, P., Polylactide (PLA)-based nanocomposites. Prog. Polym. Sci. 2013, 38, 1504-1542; Li, K.; Skolrood, L.; Aytug, T.; Tekinalp, H.; Ozcan, S., Strong and tough cellulose nanofibrils composite films: Mechanism of synergetic effect of hydrogen bonds and ionic interactions. ACS Sustainable Chem. Eng. 2019, 7, 14341-14346; Lu, Y.; Tekinalp, H. L.; Eberle, C. C.; Peter, W.; Naskar, A. K.; Ozcan, S., Nanocellulose in polymer composites and biomedical applications. Tappi J. 2014, 13, 47-54; and Lu, Y.; Armentrout, A. A.; Li, J.; Tekinalp, H. L.; Nanda, J.; Ozcan, S., A cellulose nanocrystal-based composite electrolyte with superior dimensional stability for alkaline fuel cell membranes. J. Mater. Chem. A, 2015, 3, 13350-13356. However, using nano- and microfibrillated cellulose as a composite reinforcement poses several problems in the art, including issues with drying, the incompatibility of hydrophilic microfibrillated cellulose ("MFC") and hydrophobic polymer resins, and the aggregation of microfibrillated cellulose in polymers. The challenge of drying MFC materials and the incompatibility between MFC and the polymer matrix, however, still limits the performance of MFC-reinforced biocomposites. Typically, drying processes employed to produce dried MFC result in fibril agglomerates because hydrogen bonding among the fibrils prevent their redispersal in the polymer during the composite preparation processes. This phenomenon leads to poor composite mechanical performance.

Microfibrillated cellulose is typically produced in water; thus, using it in melt-based industrial processes requires removing the water to prevent degradation of the polymer matrix, especially for biopolymers. Van den Oever, M.; Beck, B.; Müssig, J., Agrofibre reinforced poly (lactic acid) composites: Effect of moisture on degradation and mechanical properties. Compos. Part A Appl. Sci. Manuf 2010, 41, 1628-1635; and Li, K.; Wang, Y.; Rowe, M.; Zhao, X.; Li, T.; Tekinalp, H.; Ozcan, S., Poly(lactic acid) toughening through chain end engineering. ACS Appl. Polym. Mater. 2020, 2, 411-417.

Currently, oven drying, spray drying, freeze drying, and supercritical $CO_2$ drying ($scCO_2$) are among the methods used. Zimmermann, M. V. G.; Borsoi, C.; Lavoratti, A.; Zanini, M.; Zattera, A. J.; Santana, R. M. C., Drying techniques applied to cellulose nanofibers. J. Reinf Plast. Compos. 2016, 35, 628-643. However, oven drying results in highly dense microfibrillated cellulose films and spray drying results in particles, and the MFC fibril structure is lost in both methods. Freeze drying and $scCO_2$ drying preserve the fibril structure and can reduce fiber agglomeration. Freeze-dried nanocellulose has been used to reinforce poly (lactic acid) (PLA) and achieved an 80% increase in tensile strength and a 200% increase in the Young's modulus. Tekinalp, H. L.; Meng, X.; Lu, Y.; Kunc, V.; Love, L. J.; Peter, W. H.; Ozcan, S., High modulus biocomposites via additive manufacturing: Cellulose nanofibril networks as "microsponges". Compos. B. Eng. 2019, 173, 106817. However, freeze drying and $scCO_2$ drying are costly and hard to scale up to industrial applications. Drying nano- and microfibrillated cellulose effectively with less agglomeration at low cost is a key challenge for nanocellulose application in composites. Alliance, A. T. Cellulose nanomaterials research roadmap; 2016.

A problem identified in the art is that agglomeration of microfibrils is due to strong hydrogen bonding between the individual fibers and water. Abundant OH groups cause cellulose fibers to bond tightly with one another easily. As microfibrils dry, the hydrogen bonds between the fibers and water break, releasing bonded water; and hydrogen bonds form among the microfibrils resulting in agglomeration. Reducing the hydrogen bond strength is one way of reducing agglomeration. Surface treatments, such as hydrophobic surface functionalization, are shown herein to solve this problem in the art.

Another problem known in the art is that incompatibility between hydrophilic nanocellulose and hydrophobic polymer matrixes prevents effective dispersion. Much effort has been devoted to solving this problem, for example, using surface modification of microfibrillated cellulose with hydrophobic groups Lin, N.; Huang, J.; Chang, P. R.; Feng, J.; Yu, J., Surface acetylation of cellulose nanocrystal and its reinforcing function in poly(lactic acid). Carbohydr. Polym. 2011, 83, 1834-1842 and solution-based casting. Sung, S. H.; Chang, Y.; Han, J., Development of polylactic acid nanocomposite films reinforced with cellulose nanocrystals derived from coffee silverskin. Carbohydr. Polym. 2017, 169, 495-503. Solution casting is hard to scale up for large-volume applications, so surface modification has been a focus. However, most of the currently applied surface modification approaches use organic solvents, which require complex solvent exchange and create environmental concerns. Habibi, Y., Key advances in the chemical modification of microfibrillated celluloses. Chem. Soc. Rev. 2014, 43, 1519-1542. Microfibrillated cellulose is typically produced in water as a gel-like suspension, and functionalizing it in water is beneficial for its use.

Several methods of water-based nano- and microfibrillated cellulose modification have been developed. Hu, et al. developed one-pot hydrophobic surface modification of cellulose nanocrystals (CNCs) in water using tannic acid and decylamine. (Hu, Z.; Berry, R. M.; Pelton, R.; Cranston, E. D., One-pot water-based hydrophobic surface modification of cellulose nanocrystals using plant polyphenols. *ACS Sustainable Chem. Eng.* 2017, 5, 5018-5026). Yoo, et al. reported surface grafting with lactic acid followed by reaction of the long-chain hydrocarbons to obtain a hydrophobic surface (Yoo, Y.; Youngblood, J. P., Green one-pot synthesis of surface hydrophobized cellulose nanocrystals in aqueous medium. *ACS Sustainable Chem. Eng.* 2016, 4, 3927-3938). Modified CNCs obtained by these two methods can be dispersed well in a nonpolar organic solvent. Recently, Dhuiège et al. reported a transesterification reaction with vinyl acetate to functionalize CNCs in water and found the hydrophilicity decreased after modification. (Dhuiège, B.; Pecastaings, G.; Sebe, G. *ACS Sustainable Chem. Eng.* 2019, 7, 187-196). Palange et al. adopted the method of Hu et al. to modify microfibrillated cellulose (MFC) and investigated the dispersion of the modified MFC in a polypropylene-polyethylene (PP-co-PE) copolymer. Palange, C.; Johns, M. A.; Scurr, D. J.; Phipps, J. S.; Eichhorn, S. J., The effect of the dispersion of microfibrillated cellulose on the mechanical properties of melt-compounded polypropylene-polyethylene copolymer. *Cellulose* 2019, 26, 9645-9659. They found that modified MFC showed improved dispersion in PP-co-PE and less agglomeration compared with unmodified MFC. Overall, water-based surface modification of microfibrillated cellulose remains challenging, and how modification affects microfibrillated cellulose drying is unclear. Moreover, efforts to evaluate the reinforcement effect of modified microfibrillated cellulose obtained by water-based chemistry in a melting process are lacking.

Notwithstanding the advances above, there still remains a need to solve the foregoing problems associated with using MFC as a reinforcement filler in thermoplastic polyester biocomposites.

SUMMARY OF THE INVENTION

In accordance with the description, Figures, Examples and claims of the present specification, the inventors have discovered processes using a water-based transesterification reaction to functionalize microfibrillated cellulose and subsequently dry the surface-modified MFC, which processes thereby enhance the properties of the surface-modified MFC as a reinforcement filler for thermoplastic polyester and thermoplastic polyolefin biocomposites.

Thermoplastic polyester and thermoplastic polyolefin biocomposites useful in the invention include, for example, aliphatic polyesters, aliphatic and semi-aromatic thermoplastic copolymers, and thermoplastic aromatic copolymers, as well as, thermoplastic polyolefins and polyolefin elastomers.

Thermoplastic aliphatic polyesters useful in the present invention include, for example, polyglycolic acid (PGA), polylactic acid (PLA), polycaprolactone (PCL), polyhydroxyalkanoate (PHA), polyethylene adipate (PEA), and polyhydroxybutyrate (PHB). Thermoplastic aliphatic polyesters may also comprise copolymers such as poly(lactic-co-glycolic acid (PLGA) and poly(lactic-co-glycolic acid)-poly-L-lysine (PLGA-PLL).

Aliphatic polyester copolymers include, for example, polybutylene succinate, poly (3-hydroxybutyrate-co-3-hydroxyvalerate (PHBV).

Thermoplastic semi-aromatic copolymers useful in the present invention include, for example, polyethylene terephthalate (PET), polybutylene terephthalate (PBT), polytrimethylene terephthalate (PTT) and polyethylene naphthalate (PEN).

Thermoplastic aromatic polyesters useful in the present invention include, for example, a polycondensation copolymer of 4-hydroxybenzoic acid and 6-hydroxynaphthalene-2-carboxylic acid, known under the trademark Vectran™ (LCP), and a polyester of Bisphenol A and phthalic acid (PAR).

Thermoplastic polyolefins useful in the present invention include, for example, polyethylene (PE), polypropylene (PP), polymethylpentene (PMP), polybutene-1 (PB-1).

Polyolefin elastomers (POE) useful in the present invention include, for example, polyisobutylene (PIB), ethylene propylene rubber (EPR), ethylene propylene diene monomer (M-class) rubber (EPDM rubber).

Agents useful in the transesterification reaction with MFC of the present invention include vinyl carboxylates including, for example, vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octylate, vinyl methacrylate, vinyl crotonate, vinyl sorbate, vinyl benzoate, or vinyl cinamate, still more preferably vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, or vinyl octylate, and most preferably vinyl acetate, vinyl propionate, or vinyl butyrate.

Surprisingly, dried, vinyl laurate-modified MFC (VL-MFC) improved tensile strength by 38% and Young's modulus by 71% in biocomposites comprising PLA compared with neat PLA.

The results described in this specification demonstrate improved compatibility and dispersion of microfibrillated cellulose in thermoplastic polyester and thermoplastic polyolefin biocomposites, for example, PLA, after surface modification.

Without being bound by theory, the microfibrillated cellulose network formation and reinforcement mechanism of the present invention overcomes problems known in the art. The disclosure and examples herein demonstrate reinforcement through scalable water-based surface modification of MFC and subsequent drying of the surface-modified MFC. The method aids the dispersion of fibrils significantly in thermoplastic polyester and polyolefin biocomposites and improves the mechanical performance of microfibrillar cellulose-reinforced thermoplastic polyester and thermoplastic polyolefin biocomposites.

MFC is functionalized with an aqueous-phase modification process, and is subsequently dried and utilized for reinforcement of thermoplastic polyester and polyolefin biocomposites, such as polylactic acid (PLA). Surface treatment of the MFC can reduce its hydrophilicity and help preserve its fibril structure (after grinding), even after drying. Vinyl laurate-microfibrillated cellulose ("VL-MFC") effectively improved the tensile strength and Young's modulus by 38% and 71%, respectively, compared with neat PLA.

Morphology results suggest improved compatibility and dispersion of MFC in PLA after the MFC has been surface-modified according to the inventive processes. A cellulose network was formed when the VL-MFC content was increased to more than 20%, and a cellulose network reinforcement mechanism is proposed, without being bound by theory. Moreover, strong interfacial interactions, hydrogen bonding, and a possible hydrophobic interaction between VL-MFC and PLA appear to occur. The present invention is therefore a useful green process to modify microfibrillated cellulose in water and optimizing the drying of microfibrillated cellulose, as well as the use of such dried, surface-modified MFC in thermoplastic polyester and thermoplastic polyolefin biocomposite applications.

In the disclosure that follows and, the Examples below, water-based chemistry was utilized to modify the surface of MFC. Also demonstrated was the capability of dried MFC to serve as a reinforcement filler for thermoplastic polyester and thermoplastic polyolefin biocomposites. The transesterification reaction reported by Dhuiège, et al. was adapted and utilized to modify MFC with vinyl laurate in water (VL-MFC), followed by oven drying, and the VL-MFC was used as a PLA reinforcement. (Dhuiège, B.; Pecastaings, G.; Sebe, G., Sustainable approach for the direct functionalization of cellulose nanocrystals dispersed in water by transesterification of vinyl acetate. *ACS Sustainable Chem. Eng.* 2019, 7, 187-196).

Surprisingly, dried, surface-modified VL-MFC improved the tensile strength of the biocomposites comprising PLA by 38% and the Young's modulus by 71% compared with neat PLA. A cellulose network reinforcement mechanism is proposed to explain the reinforcement effect. The Examples reported below demonstrate that drying, combined with surface modification, is a facile method of effectively drying cellulose nanomaterials for use in composite materials.

In a first aspect, a method is provided for producing a vinyl carboxylate, surface-modified microfibrillated cellulose-thermoplastic polyester or thermoplastic polyolefin biocomposite material having improved mechanical strength properties, the method comprising the following steps:
(a) preparing or obtaining a dried vinyl carboxylate, surface-modified microfibrillated cellulose;
(b) heating the polylactic acid to about 175° C.;
(c) combining the vinyl carboxylate, surface-modified microfibrillated cellulose with the heated thermoplastic polyester or thermoplastic polyolefin in a mixing apparatus; and
(d) recovering the vinyl carboxylate, surface-modified microfibrillated cellulose-thermoplastic polyester biocomposite; wherein the vinyl carboxylate, surface-modified microfibrillated cellulose-thermoplastic polyester or thermoplastic polyolefin biocomposite demonstrates improved tensile strength and Young's modulus compared to neat thermoplastic polyester or thermoplastic polyolefin biocomposite.

In an embodiment of the first aspect, the process according to the first aspect comprises about 5 wt. %, or about 10 wt. %, or about 15 wt. %, or about 20 wt. %, or about 25 wt. %, or about 30 wt. % or more of vinyl carboxylate, surface-modified microfibrillated cellulose in the vinyl carboxylate, surface-modified microfibrillated cellulose-thermoplastic polyester biocomposite. In a preferred embodiment of the first aspect, the vinyl carboxylate, surface-modified microfibrillated cellulose in the vinyl carboxylate, surface-modified microfibrillated cellulose-thermoplastic polyester biocomposite is about 20 wt. % or more, about 30 wt. % or more, about 40 wt. % or more, or about 50 wt. % or more, or present in a range of about 20 wt. % to about 50 wt. % or about 20 wt. % to about 40 wt. %, or about 30 wt. % to about 50 wt. %.

In an embodiment of the first aspect or the foregoing embodiments, the vinyl carboxylate, surface-modified microfibrillated cellulose-thermoplastic polyester or thermoplastic polyolefin biocomposite is a vinyl-laurate surface-modified microfibrillated cellulose-polylactic acid biocomposite.

In a second aspect a method is provided for producing a dried, vinyl carboxylate surface-modified microfibrillated cellulose having improved mechanical properties and a microfibril structure, the method comprising the steps of:
(a) dispersing microfibrillated cellulose in an aqueous medium by high-shear mixing;
(b) adding a $K_2CO_3$ solution and vinyl carboxylate to the microfibrillated cellulose dispersion of step (a) and heating and mixing the mixture of $K_2CO_3$ solution, vinyl carboxylate and microfibrillated cellulose at a sufficient temperature to react the vinyl carboxylate and microfibrillated cellulose by a transesterification process in the aqueous phase, to form a vinyl carboxylate, surface-modified microfibrillated cellulose;
(c) removing unreacted vinyl carboxylate and $K_2CO_3$ by cooling the vinyl carboxylate, surface-modified microfibrillated cellulose to room temperature and filtering; and
(d) drying the surface-modified microfibrillated cellulose.

In an embodiment of the second aspect or the foregoing embodiments, the vinyl-carboxylate, surface-modified microfibrillated cellulose is a vinyl-laurate, surface-modified microfibrillated cellulose.

In an embodiment of the second aspect or the foregoing embodiments, the unreacted vinyl carboxylate and $K_2CO_3$ is removed from the vinyl-carboxylate, surface-modified microfibrillated cellulose by washing the vinyl carboxylate, surface-modified microfibrillated cellulose with a water and methanol mixture.

In an embodiment of the second aspect or the foregoing embodiments, the unreacted vinyl laurate and $K_2CO_3$ is removed from the vinyl-laurate, surface-modified microfibrillated cellulose by washing the vinyl laurate, surface-modified microfibrillated cellulose with a water and methanol mixture.

In an embodiment of the second aspect or the foregoing embodiments, the temperature in step (b) is about 80° C., or preferably about 60° C. in order to reduce energy consumption.

In a third aspect, there is provided a dried, vinyl carboxylate, surface-modified microfibrillated cellulose having improved mechanical properties, prepared according to the process of the second aspect.

In a fourth aspect, there is provided a dried vinyl carboxylate, surface-modified microfibrillated cellulose-thermoplastic polyester or thermoplastic polyolefin biocomposite, prepared according to the first aspect.

In an embodiment of the fourth aspect, there is provided a dried, vinyl-laurate, surface-modified microfibrillated cellulose-thermoplastic polyester biocomposite, prepared according to the first aspect.

In an embodiment of the aspects of the invention, the process further comprises the step of grinding the surface-modified microfibrillated cellulose.

It is further appreciated that certain features described herein, which are, for clarity, described in the context of different aspects of the present disclosure and/or in separate embodiments, can also be provided in combination in a single embodiment. Conversely, various features which are, for brevity, described in the context of a single aspect of the present disclosure and/or in a single embodiment, can also be provided separately or in any suitable sub-combination.

BRIEF DESCRIPTION OF THE DRAWINGS

For a more complete understanding of the principles disclosed herein, and the advantages thereof, reference is made to the following descriptions taken in conjunction with the accompanying drawings, in which:

FIG. 1A depicts a possible reaction scheme to prepare VL-MFC; FIG. 1B depicts ATR-IR of MFC and VL-MFC; FIG. 1C shows a photograph of SEM images of MFC; FIG. 1D shows a photograph of VL-MFC; FIG. 1E is an XPS spectra of C1s in MFC and VL-MFC; and FIG. 1F is an XPS spectra of O1s in MFC and VL-MFC.

FIG. 2A depicts the contact angle of MFC and FIG. 2B depicts the contact angle of VL-MFC. FIG. 2C depicts dried, untreated MFC. FIGS. 2D and 2E are SEM images of 1 g. ground MFC.

FIGS. 5A, 5B and 5C show SEM images of the cross-section after tensile testing of PLA+5% VL-MFC; FIGS. 5D, 5E and 5F show SEM images of the cross-section after tensile testing of PLA+10% VL-MFC; FIGS. 5G, 5H and 5I show SEM images of the cross-section after tensile testing of PLA+20% VL-MFC; and FIGS. 5J, 5K and 5L show SEM images of the cross-section after tensile testing of PLA+30% VL-MFC.

FIG. 6A depicts SEM images of the etched surface of VL-MFC-reinforced PLA composites of PLA+5% VL-MFC; FIG. 6B depicts SEM images of the etched surface of VL-MFC-reinforced PLA composites of PLA+10% VL-MFC; FIG. 6C depicts SEM images of the etched surface of VL-MFC-reinforced PLA composites of PLA+20% VL-MFC, and FIG. 6D depicts SEM images of the etched surface of VL-MFC-reinforced PLA composites of PLA+30% VL-MFC.

DETAILED DESCRIPTION OF THE INVENTION

Figure 2H:
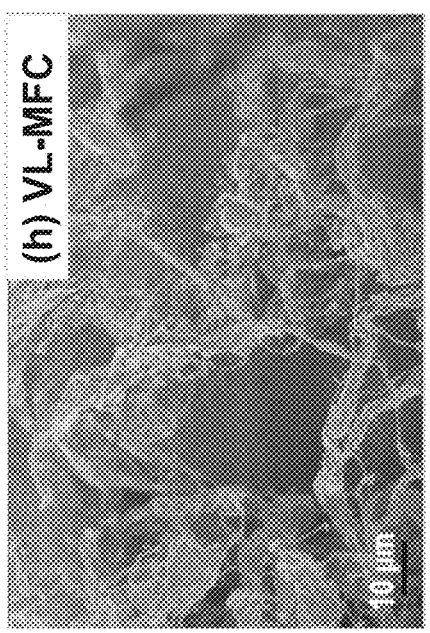
FIGS. 2G and 2H are SEM images of VL-MFC.

The titles, headings and subheadings provided herein should not be interpreted as limiting the various aspects of the disclosure. Accordingly, the terms defined below are more fully defined by reference to the specification in its entirety. All references cited herein are incorporated by reference in their entirety.

Unless otherwise defined, scientific and technical terms used herein shall have the meanings that are commonly understood by those of ordinary skill in the art. Further, unless otherwise required by context, singular terms shall include pluralities and plural terms shall include the singular.

In this application, the use of "or" means "and/or" unless stated otherwise. In the context of a multiple dependent claim, the use of "or" refers back to more than one preceding independent or dependent claim in the alternative only.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the terms "comprising" (and any form of comprising, such as "comprise", "comprises", and "comprised"), "having" (and any form of having, such as "have" and "has"), "including" (and any form of including, such as "includes" and "include"), or "containing" (and any form of containing, such as "contains" and "contain"), are inclusive or open-ended and do not exclude additional, un-recited elements or method steps. Additionally, a term that is used in conjunction with the term "comprising" is also understood to be able to be used in conjunction with the term "consisting of" or "consisting essentially of.

As used herein, the term "include" and its grammatical variants are intended to be non-limiting, such that recitation of items in a list is not to the exclusion of other like items that can be substituted or added to the listed items.

As used herein, the term "copolymer" is defined as a polymer composition comprising two or more different monomeric units.

The degree of functionalization of the derivatized cellulose (or derivatized microfibrillated cellulose) is referred to as the degree of substitution, or "DS", which is the average number of functionalizations per β-anhydroglucose unit of a cellulose chain. In other words, the degree of functionalization, as used herein, is the amount of anionic and/or cationic substituents present on the cellulose and the degree of substitution is the average number of anionic and/or cationic substituents on the per β-anhydroglucose unit of a cellulose chain. The methods of determining the DS of a derivatized cellulose and/or derivatized microfibrillated cellulose are disclosed in U.S. Pat. No. 6,602,992, which is hereby incorporated by reference herein in its entirety.

The fibrous substrate comprising cellulose (variously referred to herein as "fibrous substrate comprising cellulose," "cellulose fibres," "fibrous cellulose feedstock," "cellulose feedstock" and "cellulose-containing fibres (or fibrous," etc.) may be derived from virgin or recycled pulp.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time.

As used herein, the phrase "integer from X to Y" means any integer that includes the endpoints. For example, the phrase "integer from 1 to 5" means 1, 2, 3, 4, or 5.

Microfibrillated Cellulose

MFC, although well-known and described in the art, for purposes of the presently disclosed and/or claimed inventive concept(s), is defined as cellulose consisting of microfibrils in the form of either isolated cellulose microfibrils and/or microfibril bundles of cellulose, both of which are derived from a cellulose raw material. Thus, microfibrillated cellulose is understood to comprise partly or totally fibrillated cellulose or lignocellulose fibers, which may be achieved by a variety of processes known in the art.

As used herein, "microfibrillated cellulose" can be used interchangeably with "microfibrillar cellulose," "nanofibrillated cellulose," "nanocellulose," "nanofibril cellulose," "nanofibers of cellulose," "nanoscale fibrillated cellulose," "microfibrils of cellulose," and/or simply as "MFC." Additionally, as used herein, the terms listed above that are interchangeable with "microfibrillated cellulose" may refer to cellulose that has been completely microfibrillated or cellulose that has been substantially microfibrillated but still contains an amount of non-microfibrillated cellulose at levels that do not interfere with the benefits of the microfibrillated cellulose as described and/or claimed herein.

By "microfibrillating" is meant a process in which microfibrils of cellulose are liberated or partially liberated as individual species or as small aggregates as compared to the fibres of the pre-microfibrillated pulp. Typical cellulose fibres (i.e., pre-microfibrillated pulp) suitable for use in papermaking include larger aggregates of hundreds or thousands of individual cellulose fibrils.

Microfibrillated cellulose comprises cellulose, which is a naturally occurring polymer comprising repeated glucose units. The term "microfibrillated cellulose", also denoted MFC, as used in this specification includes microfibrillated/microfibrillar cellulose and nano-fibrillated/nanofibrillar cellulose (NFC), which materials are also called nanocellulose.

Microfibrillated cellulose is prepared by stripping away the outer layers of cellulose fibers that may have been exposed through mechanical shearing, with or without prior enzymatic or chemical treatment. There are numerous methods of preparing microfibrillated cellulose that are known in the art.

In a non-limiting example, the term microfibrillated cellulose is used to describe fibrillated cellulose comprising nanoscale cellulose particle fibers or fibrils frequently having at least one dimension less than 100 nm. When liberated from cellulose fibres, fibrils typically have a diameter less than 100 nm. The actual diameter of cellulose fibrils depends on the source and the manufacturing methods.

The particle size distribution and/or aspect ratio (length/width) of the cellulose microfibrils attached to the fibrillated cellulose fiber or as a liberated microfibril depends on the source and the manufacturing methods employed in the microfibrillation process.

In a non-limiting example, the aspect ratio of microfibrils is typically high and the length of individual microfibrils may be more than one micrometer and the diameter may be within a range of about 5 to 60 nm with a number-average diameter typically less than 20 nm. The diameter of microfibril bundles may be larger than 1 micron, however, it is usually less than one.

In a non-limiting example, the smallest fibril is conventionally referred to as an elementary fibril, which generally as a diameter of approximately 2-4 nm. It is also common for elementary fibrils to aggregate, which may also be considered as microfibrils.

In a non-limiting example, the microfibrillated cellulose may at least partially comprise nanocellulose. The nanocellulose may comprise mainly nano-sized fibrils having a diameter that is less than 100 nm and a length that may be in the micron-range or lower. The smallest microfibrils are similar to the so-called elemental fibrils, the diameter of which is typically 2 to 4 nm. Of course, the dimensions and structures of microfibrils and microfibril bundles depend on the raw materials used in addition to the methods of producing the microfibrillated cellulose. Nonetheless, it is expected that a person of ordinary skill in the art would understand the meaning of "microfibrillated cellulose" in the context of the presently disclosed and/or claimed inventive concept(s).

Depending on the source of the cellulose fibers and the manufacturing process employed to microfibrillate the cellulose fibres, the length of the fibrils can vary, frequently from about 1 to greater than 10 micrometers.

A coarse MFC grade might contain a substantial fraction of fibrillated fibers, i.e. protruding fibrils from the tracheid (cellulose fiber), and with a certain amount of fibrils liberated from the tracheid (cellulose fiber).

In an embodiment, the microfibrillated cellulose may also be prepared from recycled pulp or a papermill broke and/or industrial waste, or a paper streams rich in mineral fillers and cellulosic materials from a papermill.

The fibrous substrate comprising cellulose may be added to a grinding vessel fibrous substrate comprising cellulose in a dry state. For example, a dry paper broke may be added directly to the grinder vessel. The aqueous environment in the grinder vessel will then facilitate the formation of a pulp.

Preparing the Aqueous Suspension of Microfibrillated Cellulose and Inorganic Particulate Material In certain embodiments, the composition comprising microfibrillated cellulose is obtainable by a process comprising microfibrillating a fibrous substrate comprising cellulose in the presence of a grinding medium. The process is advantageously conducted in an aqueous environment.

The particulate grinding medium, when present, may be of a natural or a synthetic material. The grinding medium may, for example, comprise balls, beads or pellets of any hard mineral, ceramic or metallic material. Such materials may include, for example, alumina, zirconia, zirconium silicate, aluminum silicate or the mullite-rich material which is produced by calcining kaolinitic clay at a temperature in the range of from about 1300° C. to about 1800° C. For example, in some embodiments a Carbolite® grinding media is preferred. Alternatively, particles of natural sand of a suitable particle size may be used.

The grinding may be carried out in one or more stages. For example, a coarse inorganic particulate material may be ground in the grinder vessel to a predetermined particle size distribution, after which the fibrous material comprising cellulose is added and the grinding continued until the desired level of microfibrillation has been obtained. The coarse inorganic particulate material used in accordance with the first aspect of this invention initially may have a particle size distribution in which less than about 20% by weight of the particles have an equivalent spherical diameter (e.s.d.) of less than 2 µm for example, less than about 15% by weight, or less than about 10% by weight of the particles have an e.s.d. of less than 2 µm. In another embodiment, the coarse inorganic particulate material used in accordance with the first aspect of this invention initially may have a particle size distribution, as measured using a Malvern Insitec or equivalent apparatus, in which less than about 20% by volume of the particles have an e.s.d of less than 2 µm for example, less than about 15% by volume, or less than about 10% by volume of the particles have an e.s.d. of less than 2 µm. In another embodiment, the fibrous material containing cellulose may be ground in the presence of a grinding medium and in the absence of inorganic particulate matter, as described below.

The coarse inorganic particulate material may be wet or dry ground in the absence or presence of a grinding medium. In the case of a wet grinding stage, the coarse inorganic particulate material is preferably ground in an aqueous suspension in the presence of a grinding medium. In such a suspension, the coarse inorganic particulate material may preferably be present in an amount of from about 5% to about 85% by weight of the suspension; more preferably in an amount of from about 20% to about 80% by weight of the suspension. Most preferably, the coarse inorganic particulate material may be present in an amount of about 30% to about 75% by weight of the suspension. As described above, the coarse inorganic particulate material may be ground to a particle size distribution such that at least about 10% by weight of the particles have an e.s.d of less than 2 µm, for example, at least about 20% by weight, or at least about 30% by weight, or at least about 40% by weight, or at least about 50% by weight, or at least about 60% by weight, or at least about 70% by weight, or at least about 80% by weight, or at least about 90% by weight, or at least about 95% by weight, or about 100% by weight of the particles, have an e.s.d of less than 2 µm after which the cellulose pulp is added and the two components are co-ground to microfibrillate the fibres of the cellulose pulp. In another embodiment, the coarse inorganic particulate material is ground to a particle size distribution, as measured using a Malvern Innsitec apparatus (or equivalent) such that at least about 10% by volume of the particles have an e.s.d of less than 2 µm, for example, at least about 20% by volume, or at least about 30% by volume or at least about 40% by volume, or at least about 50% by volume, or at least about 60% by volume, or at least about 70% by volume, or at least about 80% by volume, or at least about 90% by volume, or at least about 95% by volume, or about 100% by volume of the particles, have an e.s.d of less than 2 µm after which the cellulose pulp is added and the two components are co-ground to microfibrillate the fibres of the cellulose pulp.

Generally, the type of and particle size of grinding medium to be selected for use in the invention may be dependent on the properties, e.g., the particle size of, and the chemical composition of, the feed suspension of material to be ground. Preferably, the particulate grinding medium comprises particles having an average diameter in the range of from about 0.1 mm to about 6.0 mm and, more preferably, in the range of from about 0.2 mm to about 4.0 mm. The grinding medium (or media) may be present in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge Unless otherwise stated, particle size properties of the microfibrillated cellulose materials are as measured by the well-known conventional method employed in the art of laser light scattering, using a Malvern Insitec apparatus (or equivalent), as supplied by Malvern Instruments Ltd (or by other methods which give essentially the same result).

The fibrous substrate comprising cellulose may be in the form of a pulp (i.e., a suspension of cellulose fibres in water), which may be prepared by any suitable chemical or mechanical treatment, or combination thereof.

Details of the procedure used to characterise the particle size distributions of mixtures of inorganic particle material and microfibrillated cellulose using a Malvern Insitec apparatus (or equivalent) are provided below.

The fibrous substrate comprising cellulose may be microfibrillated in the presence of an inorganic particulate material to obtain microfibrillated cellulose having a $d_{50}$ ranging from about 5 µm to about 500 µm, as measured by laser light scattering. The fibrous substrate comprising cellulose may be microfibrillated in the presence of an inorganic particulate material to obtain microfibrillated cellulose having a $d_{50}$ of equal to or less than about 400 µm, for example equal to or less than about 300 µm, or equal to or less than about 200 µm, or equal to or less than about 150 µm, or equal to or less than about 125 µm, or equal to or less than about 100 µm, or equal to or less than about 90 µm, or equal to or less than about 80 µm, or equal to or less than about 70 µm, or equal to or less than about 60 µm, or equal to or less than about 50 µm, or equal to or less than about 40 µm, or equal to or less than about 30 µm, or equal to or less than about 20 µm, or equal to or less than about 10 µm.

The fibrous substrate comprising cellulose may be microfibrillated in the presence of an inorganic particulate material to obtain microfibrillated cellulose having a modal fibre particle size ranging from about 0.1-500 µm and a modal inorganic particulate material particle size ranging from 0.25-20 µm. The fibrous substrate comprising cellulose may be microfibrillated in the presence of an inorganic particulate material to obtain microfibrillated cellulose having a modal fibre particle size of at least about 0.5 µm, for example at least about 10 µm, or at least about 50 µm, or at least about 100 µm, or at least about 150 µm, or at least about 200 µm, or at least about 300 µm, or at least about 400 µm.

The fibrous substrate comprising cellulose may be microfibrillated in the presence of an inorganic particulate material to obtain microfibrillated cellulose having a fibre steepness equal to or greater than about 10, as measured by Malvern. Fibre steepness i.e., the steepness of the particle size distribution of the fibres) is determined by the following formula:

$$Steepness=100 \times (d30/d70).$$

The microfibrillated cellulose may have a fibre steepness equal to or less than about 100. The microfibrillated cellulose may have a fibre steepness equal to or less than about 75, or equal to or less than about 50, or equal to or less than about 40, or equal to or less than about 30. The microfibrillated cellulose may have a fibre steepness from about 20 to about 50, or from about 25 to about 40, or from about 25 to about 35, or from about 30 to about 40.

The finer mineral peak can be fitted to the measured data points and subtracted mathematically from the distribution to leave the fibre peak, which can be converted to a cumulative distribution. Similarly, the fibre peak can be subtracted mathematically from the original distribution to leave the mineral peak, which can also be converted to a cumulative distribution. Both these cumulative curves may then be used to calculate the mean particle size ($d_{50}$) and the steepness of the distribution ($d_{30}/d_{70} \times 100$). The differential curve may then be used to find the modal particle size for both the mineral and fibre fractions.

The Inorganic Particulate Material

The inorganic particulate material, when present, may, for example, be an alkaline earth metal carbonate or sulphate, such as calcium carbonate, magnesium carbonate, dolomite, gypsum, a hydrous kandite day such as kaolin, halloysite or ball clay, an anhydrous (calcined) kandite clay such as metakaolin or fully calcined kaolin, talc, mica, perlite or diatomaceous earth, or magnesium hydroxide, or aluminum trihydrate, or combinations thereof.

A preferred inorganic particulate material for use in the method is calcium carbonate. Hereafter, the invention may tend to be discussed in terms of calcium carbonate, and in relation to aspects where the calcium carbonate is processed and/or treated. The invention should not be construed as being limited to such embodiments.

The particulate calcium carbonate used in the present invention may be obtained from a natural source by grinding. Ground calcium carbonate (GCC) is typically obtained by crushing and then grinding a mineral source such as chalk, marble or limestone, which may be followed by a particle size classification step, in order to obtain a product having the desired degree of fineness. Other techniques such as bleaching, flotation and magnetic separation may also be used to obtain a product having the desired degree of fineness and/or color. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate in the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of the present invention. In all three processes, a calcium carbonate feed material, such as limestone, is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process the milk of lime is contacted with soda ash to produce, by double decomposition, a precipitate of calcium carbonate and a solution of sodium hydroxide. The sodium hydroxide may be substantially completely separated from the calcium carbonate if this process is used commercially. In the third main commercial process the milk of lime is first contacted with ammonium chloride to give a calcium chloride solution and ammonia gas.

The calcium chloride solution is then contacted with soda ash to produce by double decomposition precipitated calcium carbonate and a solution of sodium chloride. The crystals can be produced in a variety of different shapes and sizes, depending on the specific reaction process that is used. The three main forms of PCC crystals are aragonite, rhombohedral and scalenohedral, all of which are suitable for use in the present invention, including mixtures thereof.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate.

In some circumstances, minor additions of other minerals may be included, for example, one or more of kaolin, calcined kaolin, wollastonite, bauxite, talc or mica, could also be present.

When the inorganic particulate material of the present invention is obtained from naturally occurring sources, it may be that some mineral impurities will contaminate the ground material. For example, naturally occurring calcium carbonate can be present in association with other minerals. Thus, in some embodiments, the inorganic particulate material includes an amount of impurities. In general, however, the inorganic particulate material used in the invention will contain less than about 5% by weight, preferably less than about 1% by weight, of other mineral impurities.

The inorganic particulate material used during the microfibrillating step of the method of the present invention will preferably have a particle size distribution in which at least about 10% by weight of the particles have an e.s.d of less than 2 µm, for example, at least about 20% by weight, or at least about 30% by weight, or at least about 40% by weight, or at least about 50% by weight, or at least about 60% by weight, or at least about 70% by weight, or at least about 80% by weight, or at least about 90% by weight, or at least about 95% by weight, or about 100% of the particles have an e.s.d of less than 2 µm.

Unless otherwise stated, particle size properties referred to herein for the inorganic particulate materials are as measured in a well-known manner by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value.

Alternatively, where stated, the particle size properties referred to herein for the inorganic particulate materials are as measured by the well-known conventional method employed in the art of laser light scattering, using a Malvern Insitec apparatus (or equivalent), as supplied by Malvern Instruments Ltd (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value.

Unless otherwise stated, particle size properties of the microfibrillated cellulose materials are as are as measured by the well-known conventional method employed in the art of laser light scattering, using a Malvern Insitec L machine as supplied by Malvern Instruments Ltd (or by other methods which give essentially the same result).

Details of the procedure used to characterize the particle size distributions of mixtures of inorganic particle material and microfibrillated cellulose using a Malvern Mastersizer S machine are provided below.

Another preferred inorganic particulate material for use is kaolin clay. Hereafter, this section of the specification may tend to be discussed in terms of kaolin, and in relation to aspects where the kaolin is processed and/or treated. The invention should not be construed as being limited to such embodiments. Thus, in some embodiments, kaolin is used in an unprocessed form.

Kaolin clay used in this invention may be a processed material derived from a natural source, namely raw natural kaolin clay mineral. The processed kaolin clay may typically contain at least about 50% by weight kaolinite. For example, most commercially processed kaolin clays contain greater than about 75% by weight kaolinite and may contain greater than about 90%, in some cases greater than about 95% by weight of kaolinite.

Kaolin clay used in the present invention may be prepared from the raw natural kaolin clay mineral by one or more other processes which are well known to those skilled in the art, for example by known refining or beneficiation steps.

For example, the clay mineral may be bleached with a reductive bleaching agent, such as sodium hydrosulfite. If sodium hydrosulfite is used, the bleached clay mineral may optionally be dewatered, and optionally washed and again optionally dewatered, after the sodium hydrosulfite bleaching step.

The clay mineral may be treated to remove impurities, e.g. by flocculation, flotation, or magnetic separation techniques well known in the art. Alternatively the clay mineral used in the first aspect of the invention may be untreated in the form of a solid or as an aqueous suspension.

The process for preparing the particulate kaolin clay used in the present invention may also include one or more comminution steps, e.g., grinding or milling. Light comminution of a coarse kaolin is used to give suitable delamination thereof. The comminution may be carried out by use of beads or granules of a plastic (e.g. nylon), sand or ceramic grinding or milling aid. The coarse kaolin may be refined to remove impurities and improve physical properties using well known procedures. The kaolin clay may be treated by a known particle size classification procedure, e.g., screening and centrifuging (or both), to obtain particles having a desired $d_{50}$ value or particle size distribution.

The fibrous substrate comprising cellulose may be derived from any suitable source, such as wood, grasses (e.g., sugarcane, bamboo) or rags (e.g., textile waste, cotton, hemp or flax). The fibrous substrate comprising cellulose may be in the form of a pulp (i.e., a suspension of cellulose fibres in water), which may be prepared by any suitable chemical or mechanical treatment, or combination thereof. For example, the pulp may be a chemical pulp, or a chemithermomechanical pulp, or a mechanical pulp, or a recycled pulp, or a papermill broke, or a papermill waste stream, or waste from a papermill, or a combination thereof. The cellulose pulp may be beaten (for example in a Valley beater) and/or otherwise refined (for example, processing in a conical or plate refiner) to any predetermined freeness, reported in the art as Canadian standard freeness (CSF) in $cm^3$. CSF means a value for the freeness or drainage rate of pulp measured by the rate that a suspension of pulp may be drained. For example, the cellulose pulp may have a Canadian standard freeness of about 10 $cm^3$ or greater prior to being microfibrillated. The cellulose pulp may have a CSF of about 700 $cm^3$ or less, for example, equal to or less than about 650 $cm^3$, or equal to or less than about 600 $cm^3$, or equal to or less than about 550 $cm^3$, or equal to or less than about 500 $cm^3$, or equal to or less than about 450 $cm^3$, or equal to or less than about 400 $cm^3$, or equal to or less than about 350 $cm^3$, or equal to or less than about 300 $cm^3$, or equal to or less than about 250 $cm^3$, or equal to or less than about 200 $cm^3$, or equal to or less than about 150 $cm^3$, or equal to or less than about 100 $cm^3$, or equal to or less than about 50 $cm^3$. The cellulose pulp may then be dewatered by methods well known in the art, for example, the pulp may be filtered through a screen in order to obtain a wet sheet comprising at least about 10% solids, for example at least about 15% solids, or at least about 20% solids, or at least about 30% solids, or at least about 40% solids. The pulp may be utilized in an unrefined state, that is to say, without being beaten or dewatered, or otherwise refined.

The cellulose pulp may be beaten (for example in a Valley beater) and/or otherwise refined (for example, processing in a conical or plate refiner) to any predetermined freeness, reported in the art as Canadian standard freeness (CSF) in $cm^3$. CSF means a value for the freeness or drainage rate of pulp measured by the rate that a suspension of pulp may be drained, and this test is carried out according to the T 227 cm-09 TAPPI standard. For example, the cellulose pulp may have a Canadian standard freeness of about 10 $cm^3$ or greater prior to being microfibrillated. The cellulose pulp may have a CSF of about 700 $cm^3$ or less, for example, equal to or less than about 650 $cm^3$, or equal to or less than about 600 $cm^3$, or equal to or less than about 550 $cm^3$, or equal to or less than about 500 $cm^3$, or equal to or less than about 450 $cm^3$, or equal to or less than about 400 $cm^3$, or equal to or less than about 350 cm³, or equal to or less than about 300 cm³, or equal to or less than about 250 cm³, or equal to or less than about 200 cm³, or equal to or less than about 150 cm³, or equal to or less than about 100 cm³, or equal to or less than about 50 cm³. The cellulose pulp may have a CSF of about 20 to about 700. The cellulose pulp may then be dewatered by methods well known in the art, for example, the pulp may be filtered through a screen in order to obtain a wet sheet comprising at least about 10% solids, for example at least about 15% solids, or at least about 20% solids, or at least about 30% solids, or at least about 40% solids. The pulp may be utilized in an unrefined state, that is to say, without being beaten or dewatered, or otherwise refined.

Microfibrillated cellulose may be produced by any method of reducing the particle size of polysaccharides as would be known to a person of ordinary skill in the art. However, methods for reducing particle size while preserving a high aspect ratio in the polysaccharide are preferred. In particular, the at least one microfibrillated cellulose may be produced by a method selected from the group consisting of grinding; sonication; homogenization; impingement mixer; heat; steam explosion; pressurization-depressurization cycle; freeze-thaw cycle; impact; grinding (such as a disc grinder); pumping; mixing; ultrasound; microwave explosion; and/or milling. Various combinations of these may also be used, such as milling followed by homogenization. In one embodiment, the at least one microfibrillated cellulose is formed by subjecting one or more cellulose-containing raw materials to a sufficient amount of shear in an aqueous suspension such that a portion of the crystalline regions of the cellulose fibers in the one or more cellulose-containing raw materials are fibrillated.

Microfibrillation of the fibrous substrate comprising cellulose may be obtained under wet conditions in the presence of the inorganic particulate material by a method in which the mixture of cellulose pulp and inorganic particulate material is pressurized (for example, to a pressure of about 500 bar) and then passed to a zone of lower pressure. The rate at which the mixture is passed to the low pressure zone is sufficiently high and the pressure of the low pressure zone is sufficiently low as to cause microfibrillation of the cellulose fibres. For example, the pressure drop may be obtained by forcing the mixture through an annular opening that has a narrow entrance orifice with a much larger exit orifice. The drastic decrease in pressure as the mixture accelerates into a larger volume (i.e., a lower pressure zone) induces cavitation which causes microfibrillation. In an embodiment, microfibrillation of the fibrous substrate comprising cellulose may be obtained in a homogenizer under wet conditions in the presence of the inorganic particulate material. In the homogenizer, the cellulose pulp-inorganic particulate material mixture is pressurized (for example, to a pressure of about 500 bar), and forced through a small nozzle or orifice. The mixture may be pressurized to a pressure of from about 100 to about 1000 bar, for example to a pressure of equal to or greater than 300 bar, or equal to or greater than about 500, or equal to or greater than about 200 bar, or equal to or greater than about 700 bar. The homogenization subjects the fibres to high shear forces such that as the pressurized cellulose pulp exits the nozzle or orifice, cavitation causes microfibrillation of the cellulose fibres in the pulp. Additional water may be added to improve flowability of the suspension through the homogenizer. The resulting aqueous suspension comprising microfibrillated cellulose and inorganic particulate material may be fed back into the inlet of the homogenizer for multiple passes through the homogenizer. In a preferred embodiment, the inorganic particulate material is a naturally platy mineral, such as kaolin. As such, homogenization not only facilitates microfibrillation of the cellulose pulp, but also facilitates delamination of the platy particulate material.

The microfibrillated cellulose may be in the form of at least one of a dispersion (e.g., in a gel or gelatinous form), a diluted dispersion, and/or in a suspension.

Microfibrillated Cellulose Prepared Without Addition of Inorganic Particulate Material.

In a preferred embodiment, the microfibrillated cellulose is prepared in accordance with a method comprising a step of microfibrillating a fibrous substrate comprising cellulose in an aqueous environment by grinding in the presence of a grinding medium which is to be removed after the completion of grinding, wherein the grinding is performed in a tower mill or a screened grinder, and wherein the grinding is carried out in the absence of grindable inorganic particulate material.

A grindable inorganic particulate material is a material which would be ground in the presence of the grinding medium.

The particulate grinding medium may be of a natural or a synthetic material. The grinding medium may, for example, comprise balls, beads or pellets of any hard mineral, ceramic or metallic material. Such materials may include, for example, alumina, zirconia, zirconium silicate, aluminum silicate or the mullite-rich material which is produced by calcining kaolinitic clay at a temperature in the range of from about 1300° C. to about 1800° C. For example, in some embodiments a Carbolite® grinding media is preferred. Alternatively, particles of natural sand of a suitable particle size may be used.

Generally, the type of and particle size of grinding medium to be selected for use in the invention may be dependent on the properties, e.g., the particle size of, and the chemical composition of, the feed suspension of material to be ground. Preferably, the particulate grinding medium comprises particles having an average diameter in the range of from about 0.5 mm to about 6 mm. In one embodiment, the particles have an average diameter of at least about 3 mm.

The grinding medium may comprise particles having a specific gravity of at least about 2.5. The grinding medium may comprise particles have a specific gravity of at least about 3, or least about 4, or least about 5, or at least about 6.

The grinding medium (or media) may be present in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge.

The fibrous substrate comprising cellulose may be microfibrillated to obtain microfibrillated cellulose having a d∞ ranging from about 5 µm to about 500 µm, as measured by laser light scattering. The fibrous substrate comprising cellulose may be microfibrillated to obtain microfibrillated cellulose having a $d_{50}$ of equal to or less than about 400 µm, for example equal to or less than about 300 µm, or equal to or less than about 200 µm, or equal to or less than about 150 µm, or equal to or less than about 125 µm, or equal to or less than about 100 Lim, or equal to or less than about 90 µm, or equal to or less than about 80 µm, or equal to or less than about 70 µm, or equal to or less than about 60 µm, or equal to or less than about 50 µm, or equal to or less than about 40 µm, or equal to or less than about 30 µm, or equal to or less than about 20 µm, or equal to or less than about 10 µm.

The fibrous substrate comprising cellulose may be microfibrillated to obtain microfibrillated cellulose having a modal fibre particle size ranging from about 0.1-500 µm. The fibrous substrate comprising cellulose may be microfibrillated in the presence to obtain microfibrillated cellulose having a modal fibre particle size of at least about 0.5 µm, for example at least about 10 µm, or at least about 50 µm, or at least about 100 µm, or at least about 150 µm, or at least about 200 Lim, or at least about 300 pam, or at least about 400 µm.

The fibrous substrate comprising cellulose may be microfibrillated to obtain microfibrillated cellulose having a fibre steepness equal to or greater than about 10, as measured by Malvern. Fibre steepness (i.e., the steepness of the particle size distribution of the fibres) is determined by the following formula:

Steepness $100 \times (d_{30}/d_{70})$

The microfibrillated cellulose may have a fibre steepness equal to or less than about 100. The microfibrillated cellulose may have a fibre steepness equal to or less than about 75, or equal to or less than about 50, or equal to or less than about 40, or equal to or less than about 30. The microfibrillated cellulose may have a fibre steepness from about 20 to about 50, or from about 25 to about 40, or from about 25 to about 35, or from about 30 to about 40. In an embodiment, a preferred steepness range is about 20 to about 50.

In one embodiment, the grinding vessel is a tower mill. The tower mill may comprise a quiescent zone above one or more grinding zones. A quiescent zone is a region located towards the top of the interior of a tower mill in which minimal or no grinding takes place and comprises microfibrillated cellulose and inorganic particulate material. The quiescent zone is a region in which particles of the grinding medium sediment down into the one or more grinding zones of the tower mill.

The tower mill may comprise a classifier above one or more grinding zones. In an embodiment, the classifier is top mounted and located adjacent to a quiescent zone. The classifier may be a hydrocyclone.

The tower mill may comprise a screen above one or more grind zones. In an embodiment, a screen is located adjacent to a quiescent zone and/or a classifier. The screen may be sized to separate grinding media from the product aqueous suspension comprising microfibrillated cellulose and to enhance grinding media sedimentation.

In an embodiment, the grinding is performed tinder plug flow conditions. Under plug flow conditions the flow through the tower is such that there is limited mixing of the grinding materials through the tower. This means that at different points along the length of the tower mill the viscosity of the aqueous environment will vary as the fineness of the microfibrillated cellulose increases. Thus, in effect, the grinding region in the tower mill can be considered to comprise one or more grinding zones which have a characteristic viscosity. A skilled person in the art will understand that there is no sharp boundary between adjacent grinding zones with respect to viscosity.

In an embodiment, water is added at the top of the mill proximate to the quiescent zone or the classifier or the screen above one or more grinding zones to reduce the viscosity of the aqueous suspension comprising microfibrillated cellulose at those zones in the mill. By diluting the product microfibrillated cellulose at this point in the mill it has been found that the prevention of grinding media carry over to the quiescent zone and/or the classifier and/or the screen is improved. Further, the limited mixing through the tower allows for processing at higher solids lower down the tower and dilute at the top with limited backflow of the dilution water back down the tower into the one or more grinding zones. Any suitable amount of water which is effective to dilute the viscosity of the product aqueous suspension comprising microfibrillated cellulose may be added. The water may be added continuously during the grinding process, or at regular intervals, or at irregular intervals.

In another embodiment, water may be added to one or more grinding zones via one or more water injection points positioned along the length of the tower mill, the or each water injection point being located at a position which corresponds to the one or more grinding zones. Advantageously, the ability to add water at various points along the tower allows for further adjustment of the grinding conditions at any or all positions along the mill.

The tower mill may comprise a vertical impeller shaft equipped with a series of impeller rotor disks throughout its length. The action of the impeller rotor disks creates a series of discrete grinding zones throughout the mill.

In another embodiment, the grinding is performed in a screened grinder, preferably a stirred media detritor. The screened grinder may comprise one or more screen(s) having a nominal aperture size of at least about 250 µm, for example, the one or more screens may have a nominal aperture size of at least about 300 pnm, or at least about 350 µm, or at least about 400 µm, or at least about 450 µm, or at least about 500 µm, or at least about 550 µm, or at least about 600 Lm, or at least about 650 µm, or at least about 700 µm, or at least about 750 µm, or at least about 800 µm, or at least about 850 µm, or at or least about 900 µm, or at least about 1000 µm.

The screen sizes noted immediately above are applicable to the tower mill embodiments described above.

As noted above, the grinding is performed in the presence of a grinding medium. In an embodiment, the grinding medium is a coarse media comprising particles having an average diameter in the range of from about 1 mm to about 6 mm, for example about 2 mm, or about 3 mm, or about 4 mm, or about 5 mm.

In another embodiment, the grinding media has a specific gravity of at least about 2.5, for example, at least about 3, or at least about 3.5, or at least about 4.0, or at least about 4.5, or least about 5.0, or at least about 5.5, or at least about 6.0.

As described above, the grinding medium (or media) may be in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge.

In one embodiment, the grinding medium is present in amount of about 50% by volume of the charge.

By 'charge' is meant the composition which is the feed fed to the grinder vessel. The charge includes water, grinding media, the fibrous substrate comprising cellulose and any other optional additives (other than as described herein).

The use of a relatively coarse and/or dense media has the advantage of improved (i.e., faster) sediment rates and reduced media carry over through the quiescent zone and/or classifier and/or screen(s).

A further advantage in using relatively coarse screens is that a relatively coarse or dense grinding media can be used in the microfibrillating step. In addition, the use of relatively coarse screens (i.e., having a nominal aperture of least about 250 μm) allows a relatively high solids product to be processed and removed from the grinder, which allows a relatively high solids feed (comprising fibrous substrate comprising cellulose and inorganic particulate material) to be processed in an economically viable process. As discussed below, it has been found that a feed having a high initial solids content is desirable in terms of energy sufficiency. Further, it has also been found that product produced (at a given energy) at lower solids has a coarser particle size distribution.

In accordance with one embodiment, the fibrous substrate comprising cellulose is present in the aqueous environment at an initial solids content of at least about 1 w %. The fibrous substrate comprising cellulose may be present in the aqueous environment at an initial solids content of at least about 2 wt. %, for example at least about 3 wt. %, or at least about at least 4 wt. %. Typically the initial solids content will be no more than about 10 wt. %.

In another embodiment, the grinding is performed in a cascade of grinding vessels, one or more of which may comprise one or more grinding zones. For example, the fibrous substrate comprising cellulose may be ground in a cascade of two or more grinding vessels, for example, a cascade of three or more grinding vessels, or a cascade of four or more grinding vessels, or a cascade of five or more grinding vessels, or a cascade of six or more grinding vessels, or a cascade of seven or more grinding vessels, or a cascade of eight or more grinding vessels, or a cascade of nine or more grinding vessels in series, or a cascade comprising up to ten grinding vessels. The cascade of grinding vessels may be operatively inked in series or parallel or a combination of series and parallel. The output from and/or the input to one or more of the grinding vessels in the cascade may be subjected to one or more screening steps and/or one or more classification steps.

The total energy expended in a microfibrillation process may be apportioned equally across each of the grinding vessels in the cascade. Alternatively, the energy input may vary between some or all of the grinding vessels in the cascade.

A person skilled in the art will understand that the energy expended per vessel may vary between vessels in the cascade depending on the amount of fibrous substrate being microfibrillated in each vessel, and optionally the speed of grind in each vessel, the duration of grind in each vessel and the type of grinding media in each vessel. The grinding conditions may be varied in each vessel in the cascade in order to control the particle size distribution of the microfibrillated cellulose.

In an embodiment the grinding is performed in a closed circuit. In another embodiment, the grinding is performed in an open circuit.

As the suspension of material to be ground may be of a relatively high viscosity, a suitable dispersing agent may preferably be added to the suspension prior to grinding. The dispersing agent may be, for example, a water soluble condensed phosphate, polysilicic acid or a salt thereof, or a polyelectrolyte, for example a water soluble salt of a poly (acrylic acid) or of a poly(methacrylic acid) having a number average molecular weight not greater than 80,000. The amount of the dispersing agent used would generally be in the range of from 0.1 to 2.0% by weight, based on the weight of the dry inorganic particulate solid material. The suspension may suitably be ground at a temperature in the range of from 4° C. to 100° C.

Other additives which may be included during the microfibrillation step include: carboxymethyl cellulose, amphoteric carboxymethyl cellulose, oxidising agents, 2,2,6,6-Tetramethylpiperidine-1-oxyl (TEMPO), TEMPO derivatives, and wood degrading enzymes.

The pH of the suspension of material to be ground may be about 7 or greater than about 7 (i.e., basic), for example, the pH of the suspension may be about 8, or about 9, or about 10, or about 11. The pH of the suspension of material to be ground may be less than about 7 (i.e., acidic), for example, the pH of the suspension may be about 6, or about 5, or about 4, or about 3. The pH of the suspension of material to be ground may be adjusted by addition of an appropriate amount of acid or base. Suitable bases included alkali metal hydroxides, such as, for example NaOH. Other suitable bases are sodium carbonate and ammonia. Suitable acids included inorganic acids, such as hydrochloric and sulphuric acid, or organic acids. An exemplary acid is orthophosphoric acid.

The total energy input in a typical grinding process to obtain the desired aqueous suspension composition may typically be between about 100 and 1500 kWht$^{-1}$ based on the total dry weight of the inorganic particulate filler. The total energy input may be less than about 1000 kWht$^{-1}$, for example, less than about 800 kWht$^{-1}$, less than about 600 kWht$^{-1}$ less than about 500 kWht$^{-1}$, less than about 400 kWht$^{-1}$, less than about 300 kWht$^{-1}$, or less than about 200 kWht$^{-1}$. As such, the present inventors have surprisingly found that a cellulose pulp can be microfibrillated at relatively low energy input when it is co-ground in the presence of an inorganic particulate material. As will be apparent, the total energy input per tonne of dry fibre in the fibrous substrate comprising cellulose will be less than about 10,000 kWht$^{-1}$, for example, less than about 9000 kWht$^{-1}$, or less than about 8000 kWht$^{-1}$, or less than about 7000 kWht$^{-1}$, or less than about 6000 kWht$^{-1}$, or less than about 5000 kWht$^{-1}$ for example less than about 4000 kWht$^{-1}$, less than about 3000 kWht$^{-1}$, less than about 2000 kWht$^{-1}$, less than about 1500 kWht$^{-1}$, less than about 1200 kWht$^{-1}$, less than about 1000 kWht$^{-1}$, or less than about 800 kWht$^{-1}$. The total energy input varies depending on the amount of dry fibre in the fibrous substrate being microfibrillated, and optionally the speed of grind and the duration of grind.

Biocomposites Comprising Microfibrillated Cellulose.

Preparation vinyl laurate, surface-modified MFC ("VL-MFC"). VL-MFC was obtained by surface functionalization of MFC with VL according to the transesterification process reported by Dhuiège, et al. with modifications. Briefly, 19.2 g of 16% MFC cake (3 g MFC in mass) was dispersed in 500 mL of water by high-shear mixing (7000 rpm, 3 min) and then added into a 1000 mL flask. The K$_2$CO$_3$ solution (2 g in 20 mL water) and 4.5 g of VL were added to the MFC suspension, and the mixture was heated under magnetic stirring at 80° C. for 72 h. Then the reaction mixture was cooled to room temperature. The mixture was filtered through a Buchner funnel and washed with water and methanol to remove K$_2$CO$_3$ and unreacted VL. Then the obtained VL-MFC was oven dried at 60° C. to a constant weight. After it was completely dried, the VL-MFC was ground with an IKA 2900001 Economical Analytical Mill. Unmodified MWC was processed in the same way as the surface modified MFC set forth in the Examples in this specification.

Preparation of VL-MFC/PLA Composites.

Before being used to compound PLA composites, all materials were dried in an 80° C. oven for 4 h to remove any moisture in the sample. PLA+VL-MFC composites were prepared in a melt mixer (Intelli-Torque Plasti-Corder half-size mixer, C.W. Brabender, Instruments Inc.) by melting PLA at 175° C. for 3 min at 60 rpm and then adding the desired amount of VL-MFC slowly into the PLA melt and shear-mixing for another 5 min. Neat PLA and PLA+MFC composites were prepared at the same conditions. The content of VL-MFC and MFC ranged from 5 to 30% by mass. After compounding, a thin film sample of 1 mm thickness was prepared via compression molding at 180° C. The thin film was cut into slices, then compression molded into uniform bars at 180° C., and further cut into dog-bone specimens (ASTM D638 type-V). ASTM Standard D638-03. Standard test method for tensile properties of plastics. West Conshohocken, PA: ASTM International. 2003.

EXAMPLES

Characterizations.
Attenuated Total Reflectance Infrared Spectra (ATR-IR).
ATR-IR spectra of the MFC, VL-MFC, and PLA composites were measured with a PerkinElmer Frontier Fourier transform infrared (FTIR)/near-infrared (NIR) spectrometer with a diamond ATR attachment with a spectral resolution of 2 $cm^{-1}$ in the range of 4000-600 $cm^{-1}$.

Contact angle (CA): The surface hydrophobicities of MFC and VL-MFC were evaluated using a contact angle meter (OCA15EC Datapysics Instrument) controlled by SCA 20 software. Cast films from MFC and VL-MFC suspensions on glass slides were used for the measurement. For each measurement, 2 µL of deionized water was dispensed onto the specimen at room temperature with an injection speed of 0.5 µL. The image capture was recorded using an IDS video camera. The static contact angle was measured after ~20 s when a water droplet come into contact with the surfaces. Six tests were repeated on different samples and the average contact angle was calculated.

Mechanical properties. Stress-strain curves were obtained by stretching the dog-bone specimens at room temperature via a servo-hydraulic testing machine with a 2000 N loading cell at a speed of 1.5 mm/min. At least five specimens for each sample were tested and the average was reported.

Rheological testing. PLA composites were hot-pressed into films (1 mm thick) for rheological properties testing. The measurement was performed with a Discovery Hybrid Rheometer (TA Instruments) at 180° C. within the linear viscoelastic region with a gap of 800 µm. Parallel plate geometry with 8 mm diameter was applied for frequency sweep (0.01-100 rad/s) tests. A strain sweep test from 0.01% to 20% at 100 rad/s was conducted for each sample to ensure the use of a strain within a linear viscoelastic region.

Dynamic mechanical analysis (DMA): DMA was carried out using a DMA Q800 (TA Instruments) machine in multifrequency-strain mode. The compression-molded sample (3×10×63 $mm^3$) was used as a test specimen. The sample was clamped with a dual cantilever clamp and the measurement was performed at a constant frequency of 1 Hz with a temperature range from 25 to 120° C. at a ramp rate of 3° C./min.

Differential scanning calorimetry (DSC): The thermal properties of PLA composites were studied via a Q2000 (TA Instruments). First, the samples (4-8 mg) were heated from 20 to 200° C. and stabilized for 5 min at 200° C. Then the samples were cooled down to 20° C. and heated again to 200° C. for the second heating cycle. All the heating and cooling rates were fixed at 5° C./min. The degree of crystallization ($\chi_c$) was calculated using Eq. (1) with a second heating curve, $$\chi_c(\%) = \Delta H_m - \Delta H_c / w \times \Delta H_{100} \times 100\%, \quad (1)$$

where $\Delta H_m$, $\Delta H_c$, and $\Delta H_{100}$ are the enthalpies of the melting, crystallization, and 100% crystalline PLA, respectively. The $\Delta H_{100}$ value used for the calculation was 93 J/g. The w is the weight fraction of PLA in the sample.

Thermogravimetric analysis (TGA): TGA was carried out from room temperature to 700° C. with sample sizes of 4-8 mg in a TA Instruments Q500 under nitrogen flow. The sample was heated to 70° C. and in an isothermal process for 30 min to remove moisture and then ramped to 700° C. at a heating rate of 5° C./min.

Scanning electron microscope (SEM): Cross-sections of PLA composites after tensile testing were sputtered with iridium and then imaged with a Zeiss Merlin VP SEM/0 with a low voltage of 1 keV. For SEM of MFC and VL-MFC fibers, their aqueous suspensions were dropped on silicon wafers, dried in air, and then sputtered with iridium and imaged via SEM. To observe the etched surface, VL-MFC-reinforced PLA was fractured in liquid nitrogen and etched in a dichloromethane bath and then imaged by SEM after being coated with iridium.

X-ray photoelectron spectroscopy (XPS): XPS was conducted on a Thermo Scientific Model K-Alpha XPS instrument, which was equipped with microfocused, monochromatic Al $K_\alpha$ x-rays (1486.6 eV) that were focused to a range of spot sizes from 30 to 400 microns. Wide-energy-range survey spectra (0-1350 eV) were acquired for qualitative and quantitative analysis (pass energy=200 eV; step size=1.0 eV). Chemical bonding of the identified elements was assessed by collecting core-level spectra over a narrow energy range (pass energy=50 eV; step size=0.1 eV). The Thermo Scientific Avantage XPS software package (v. 4.61) was used for data collection and processing. When necessary, spectra were charge-corrected using the C 1s core-level peak set to 284.6 eV. The curve fitting of spectra (deconvolution) was analyzed with OriginPro 2018.

Synthesis of VL-MFC and Characterizations.

Chemical modification of MFC with VL was conducted through transesterification reaction in the aqueous phase, as shown in FIG. 1A. After reaction, the product was separated and oven dried to remove water. The reaction was confirmed by ATR-IR spectra (FIG. 1B), in which a peak at 1730 $cm^{-1}$ belonging to the C=O group appears after modification. The thermal stability of the VL-MFC was also characterized by TGA (a), which suggests similar thermal stability for VL-MFC with a slight decrease in $T_{5\%}$ (5% weight loss temperature in TGA). SEM images (FIG. 1C and FIG. 1D) were also recorded to characterize the morphology change after chemical modification. The results show that VL-MFC retains its fibril structure after modification. To further confirm the reaction, XPS of MFC and VL-MFC was conducted to identify the surface element species. As shown in FIG. 1E, the Cls spectrum of MFC is fitted with three peaks of 284.8, 286.5, and 287.8 eV, which are assigned to C—C, C—OH, and O—C—O, respectively. The C1s spectrum of VL-MFC is fitted with four peaks of 284.7, 286.5, 287.9, and 288.9 eV; and a new peak assigned to C=O (288.9 eV) is identified, suggesting the successful introduction of the ester group. Meanwhile, the peak intensity of the C—C in VL-MFC is enhanced compared with MFC as a result of the long alkyl chain attached to the cellulose backbone. The peak intensity of C—OH in VL-MFC decreases after modification owing to the reduction of the surface OH group after modification. Similarly, a C=O peak is also seen in the O1s spectrum of VL-MFC (FIG. 1F).

These results suggest that MFC was successfully functionalized by VL and the fibril structure was preserved after modification.

Figure 2G:
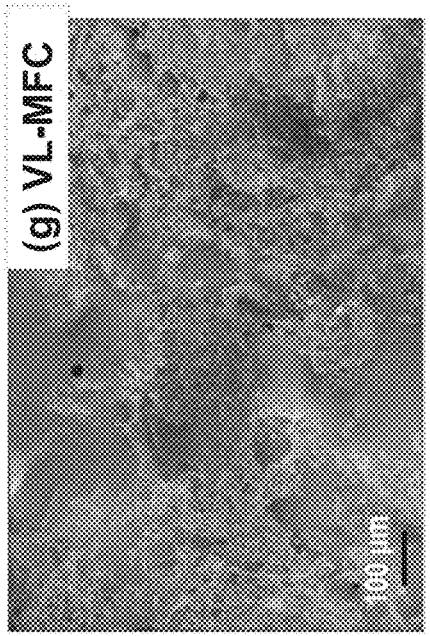
Figure 2F:
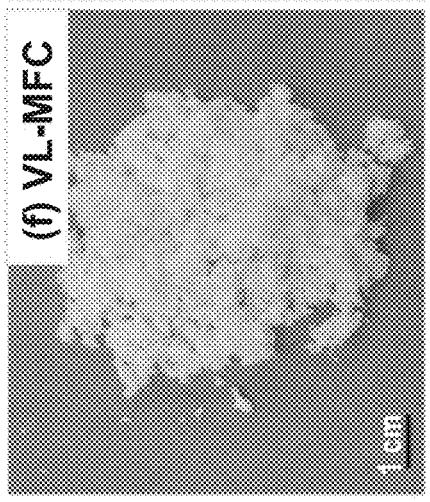
FIG. 2F depicts dried, vinyl laurate treated MFC.

After reactions, the VL-MFC surface was expected to be less hydrophilic than the MFC surface because of the introduction of a hydrophobic group. As shown in FIGS. 2A and 2B, the contact angle of the MFC increases from 250 (MFC) to 500 (VL-MFC) after modification, indicating the transesterification reaction successfully reduces the hydrophilicity of MFC. After grinding under the same conditions, MFC becomes a powder (FIG. 2C), whereas VL-MFC becomes a fluffy, porous fibril material (FIG. 2F). SEM images of ground MFC (FIGS. 2D and 2E) and VL-MFC (FIGS. 2G and 2H) also confirm that ground MFC turns to particles and loses its fibril structure, whereas VL-MFC retains a fibril structure with some agglomeration. These results suggest that VL-MFC is not strongly bonded after oven drying and can easily be separated by grinding. This result could be explained by the reduced hydrogen bond strength after chemical modification.

Mechanical Properties of the Composites.

Figure 3A:
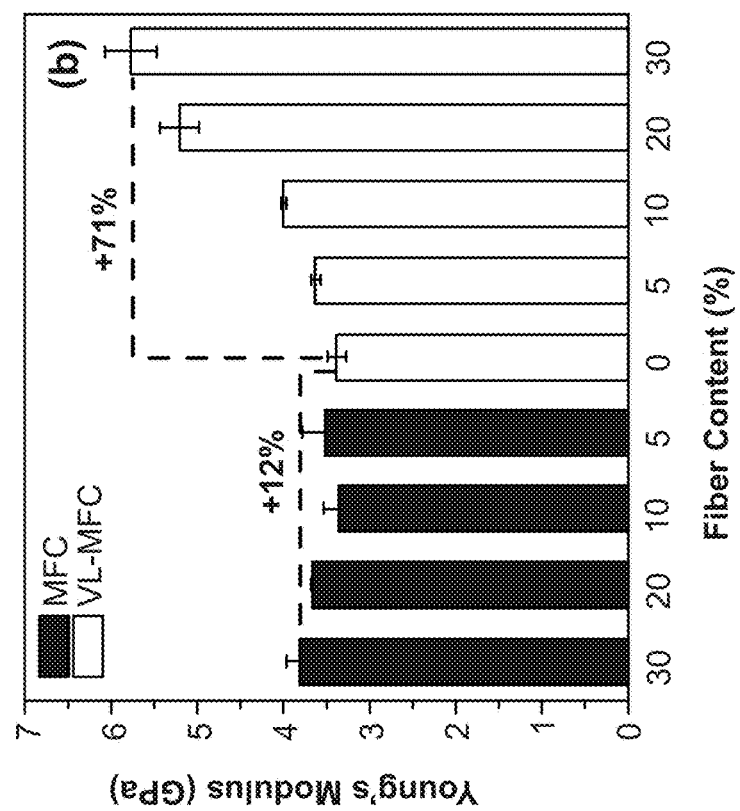
FIG. 3A plots tensile strength of PLA composites containing MFC and VL-MFC and FIG. 3B plots Young's modulus of PLA composites containing MFC and VL-MFC with different fiber contents.

VL-MFC and MFC were used as reinforcement fillers for PLA. The composites were directly compounded with PLA at fiber contents ranging from 5 to 30 wt. % at 175° C., and then compression molded into standard samples for testing. The tensile testing results are shown in FIG. 3A. For MFC-reinforced PLA, the tensile strength decreases as the MFC content increases, decreasing by 25% when the MFC content is 30% (45 MPa) compared with neat PLA (60 MPa). The Young's modulus of the MFC-reinforced PLA increases slightly, by around 12%, compared with neat PLA. These results suggest that dried MFC is unsuitable as a PLA reinforcement because of MFC agglomeration and incompatibility between the hydrophilic MFC and the hydrophobic PLA matrix. Moreover, as shown in FIGS. 2C and 2F, because oven-dried MFC disintegrates into particles after grinding and loses its fibril structure, the benefit of the high aspect ratio of the fiber is lost, making MFC a bad candidate for polymer reinforcement.

For VL-MFC, on the other hand, the hydrophilicity decreased after modification, so the compatibility of VL+MFC and PLA is improved. As shown in FIG. 3A, the tensile strength increases from 60 to 70 MPa after 5% VL-MFC is added. The tensile strength of PLA composites increases with VL-MFC content, reaching 82 MPa after the addition of 30% VL-MFC—an increase of 38% compared with neat PLA and 82% compared with PLA+30% MFC. The Young's modulus of VL-MFC composites increases by 71% compared with neat PLA, suggesting oven-dried VL-MFC provides an excellent reinforcement effect. This result can be explained by the improved compatibility between VL-MFC and the PLA matrix and good dispersion of VL-MFC following surface modification.

Morphology of the Composites

Figure 4A:
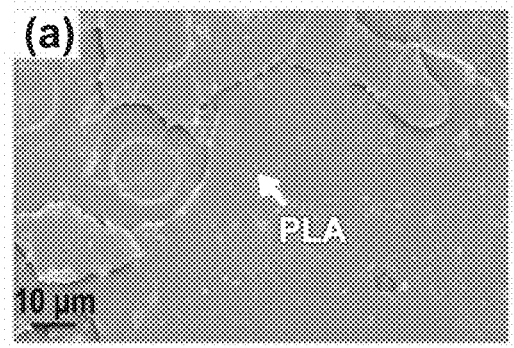
FIGS. 4A and 4B show SEM images of the cross-section of PLA after tensile testing.
Figure 4B:
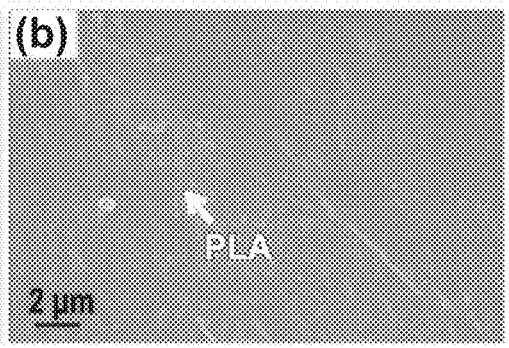
Figure 4C:
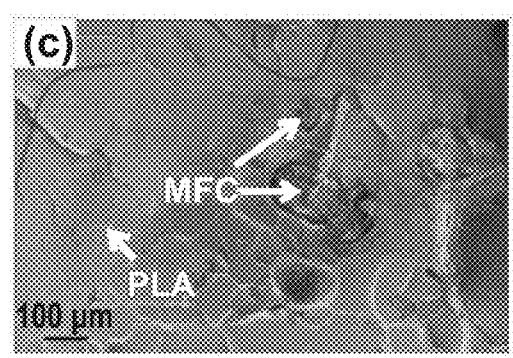
FIGS. 4C and 4D show SEM images of the cross-section after tensile testing of PLA+5% MFC.
Figure 4D:
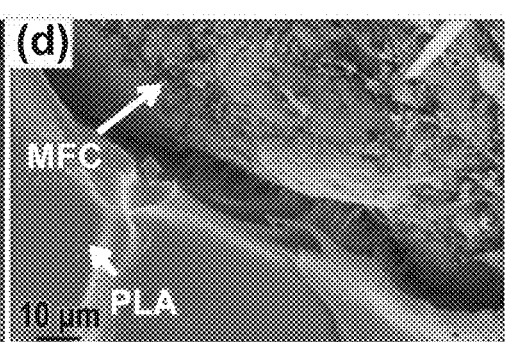
Figure 4E:
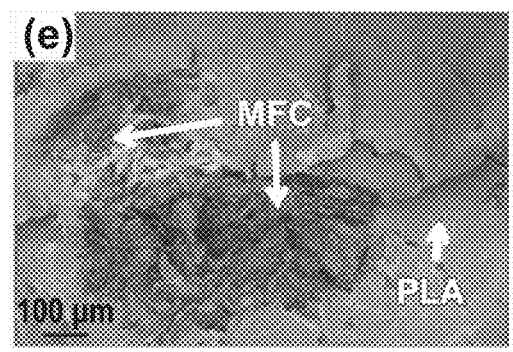
FIGS. 4E and 4F show SEM images of the cross-section after tensile testing of PLA+10% MFC.
Figure 4F:
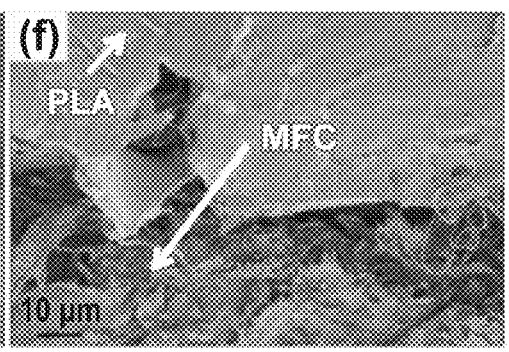
Figure 4G:
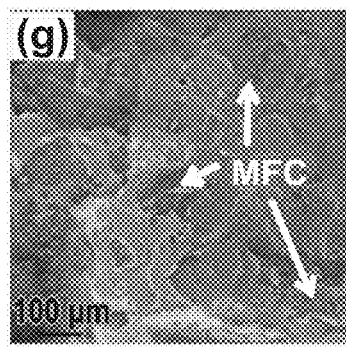
FIGS. 4G and 4H show SEM images of the cross-section after tensile testing of PLA+20% MFC.
Figure 4H:
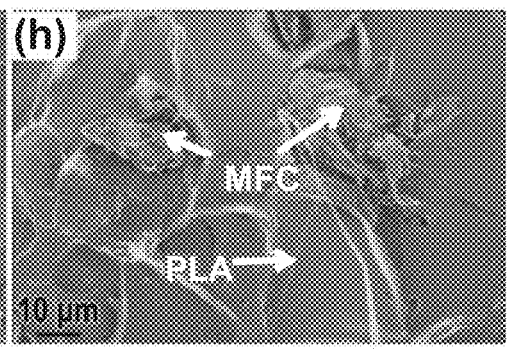
Figure 4I:
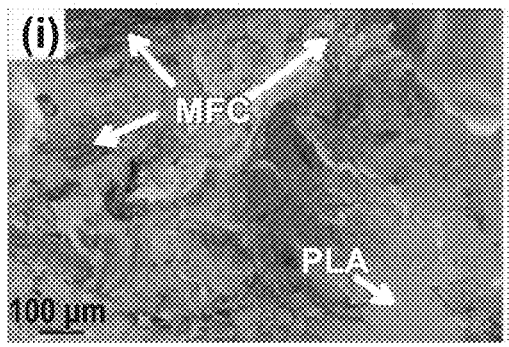
FIGS. 4I and 4J show SEM images of the cross-section after tensile testing of PLA+30% MFC.
Figure 4J:
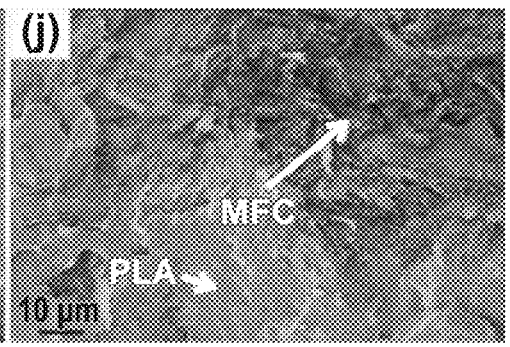

The morphology of the composites was investigated by SEM. As suggested by FIG. 4A to 4J, neat PLA has a smooth cross-section, and PLA+MFC composites have a large amount of MFC agglomeration. When the MFC content is low, e.g., 5% and 10% (FIGS. 4C and 4F), clear phase separation between MFC and PLA is observed, suggesting incompatibility between the MFC and PLA. The MFC particles act as defects in the composites and deteriorate the composite properties. When the MFC content increases, more agglomeration is observed. These results suggest poor dispersion of MFC and incompatibility between the MFC and the PLA matrix, which could explain the bad mechanical properties of PLA+MFC composites.

For PLA+VL-MFC composites, a higher degree of dispersion was observed, as illustrated in FIG. 5. For PLA+5% VL-MFC and PLA+10% VL-MFC composites, two different cellular structural morphologies (FIGS. 5B and 5E) and relatively homogenous structures were observed. For PLA+5% VL-MFC, phase separation was observed (FIG. 5A) in the cellular structure. With an increase in the VL-MFC content to 10% (FIG. 5D), PLA penetration of the fibril structures of VL-MFC networks was observed in the cellular region. Eventually, as the fiber content continues to increase, the cellular structure disappears. Instead, homogenous morphologies are observed for 20% and 30% VL-MFC content. The observation of a cellular structure in samples with low fiber content is possibly because of local fiber agglomeration. After modification, the hydrophobicity decreases, as shown in FIG. 2; however, the fibers are still hydrophilic and have a tendency to aggregate. Moreover, when the VL-MFC content is low, VL-MFC is unable to form a cellulose network—another possible reason for cellular structure formation.

Figure 3B:
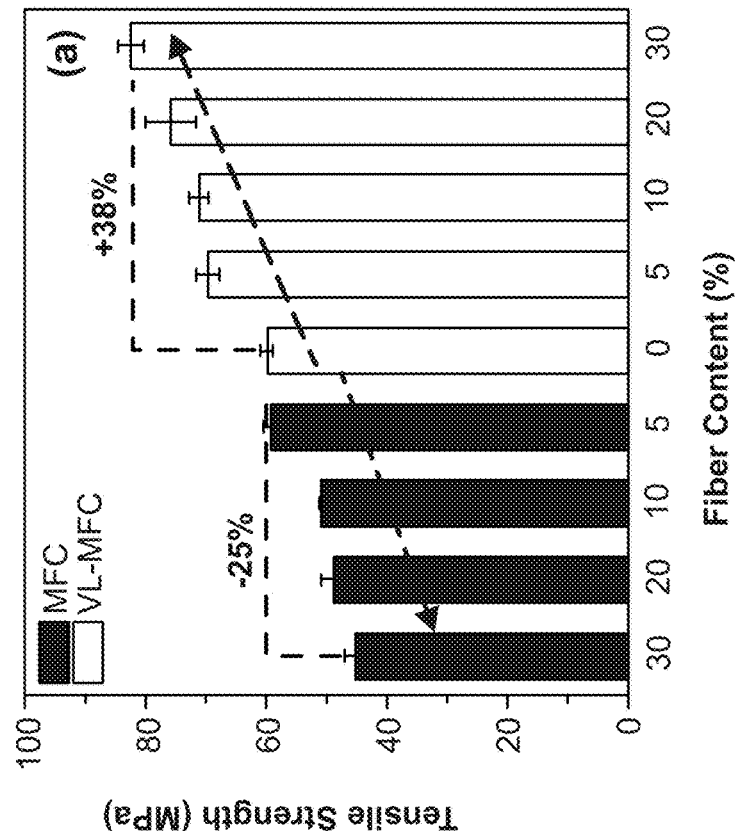

Despite the cellular morphology, a relatively homogenous phase in PLA+5% VL-MFC and PL+10% VL-MFC is also observed (FIGS. 5C and 5D). In these phases, fibers can clearly be seen, and there is no phase separation, suggesting improved compatibility. With increased VL-MFC content (FIG. 5F), a fibril structure appears. In PLA+20% VL-MFC and PLA+30% VL-MFC, fiber networks also may form. Voids are observed as well, a common phenomenon for compression-molded samples. The homogenous dispersion of VL-MFC in the PLA matrix results in excellent mechanical reinforcement. Moreover, the morphology change as the VL-MFC content increases, especially from 10% to 20%, provides evidence of the change in Young's modulus from 3.9 GPa (PLA+10% VL-MFC) to 5.2 GPa (PLA+20% VL-MFC) in FIG. 3B. It indicates the possible formation of a percolating network as the VL-MFC content increases.

To confirm the formation of a cellulose network in the composites, the fracture surfaces of VL-MFC-reinforced composites were etched in dichloromethane to remove the PLA and then observed by SEM (FIG. 6). Some fibril structure is observed in PLA+5% VL-MFC (FIG. 6A) and PLA+10% VL-MFC (FIG. 6B); however, the dominant phase is PLA, suggesting some VL-MFC was removed with the PLA during the etching process. When the VL-MFC increases to 20% (FIG. 6C), the VL-MFC fibers entangle to form a cellulose network. In PLA+30% VL-MFC composites, a clear VL-MFC network and many VL-MFC fiber bundles are observed. These results confirm that as the VL-MFC content increases, the VL-MFC forms a network that improves its reinforcement properties. A similar cellulose network was observed by Qi et al. in MFC-reinforced poly(propylene carbonate). Qi, X.; Yang, G.; Jing, M.; Fu, Q.; Chiu, F.-C., Microfibrillated cellulose-reinforced bio-based poly(propylene carbonate) with dual shape memory and self-healing properties. *J. Mater. Chem. A*, 2014, 2, 20393-20401.

Figure 7A:
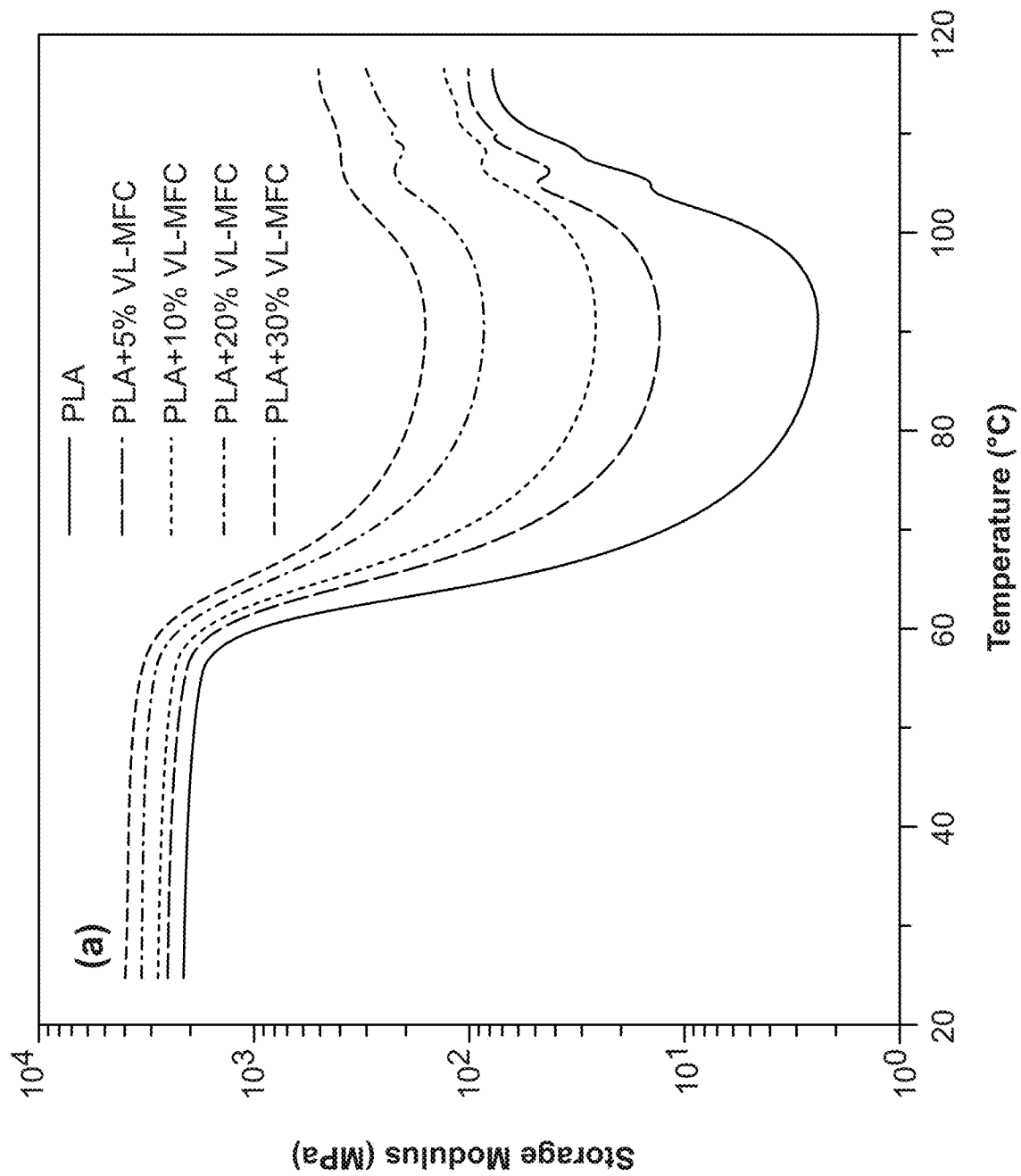
FIG. 7A presents DMA results for PLA+VL-MFC composites.
Figure 7B:
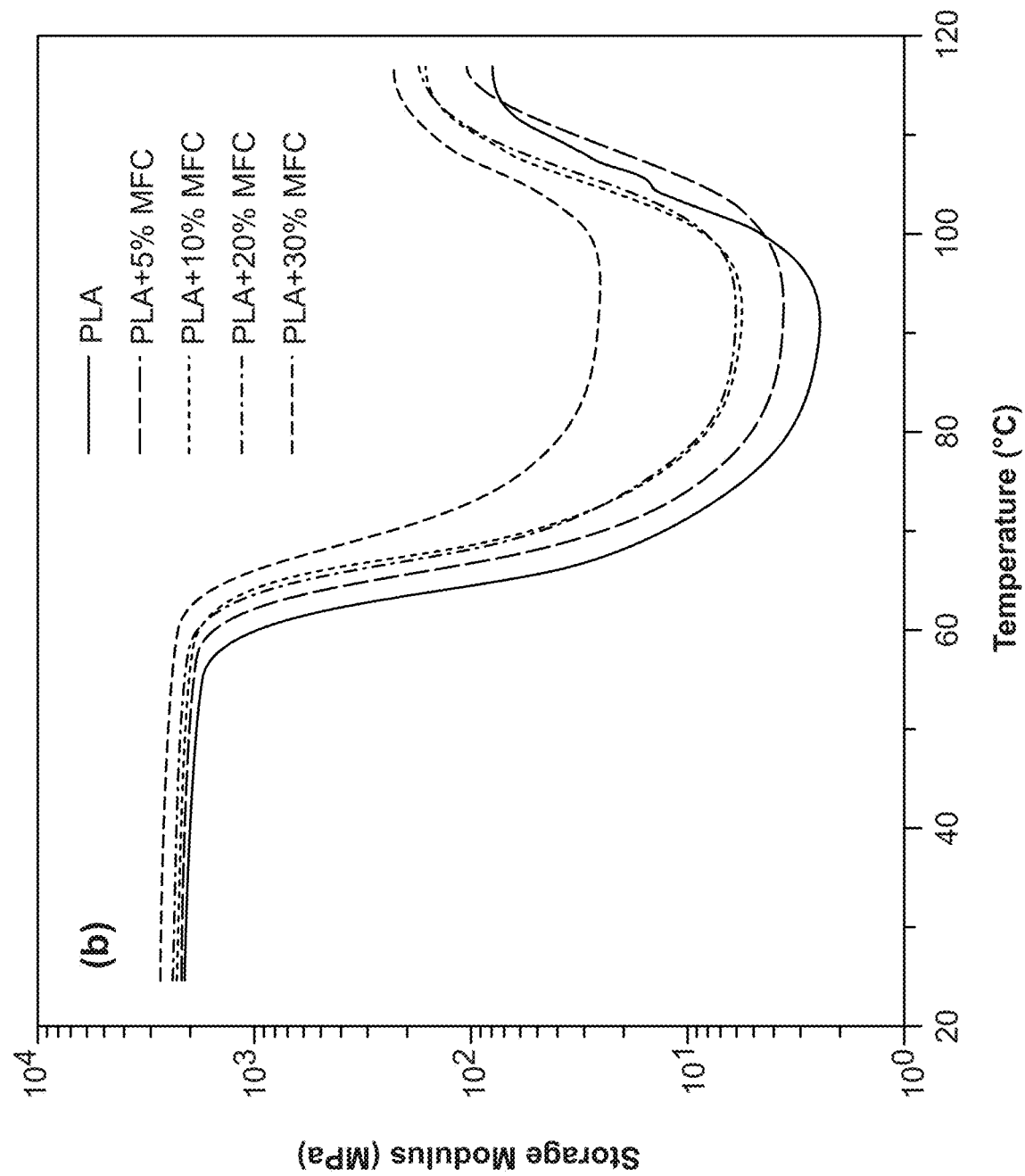
FIG. 7B presents DMA results for PLA+MFC composites.
Figure 11A:
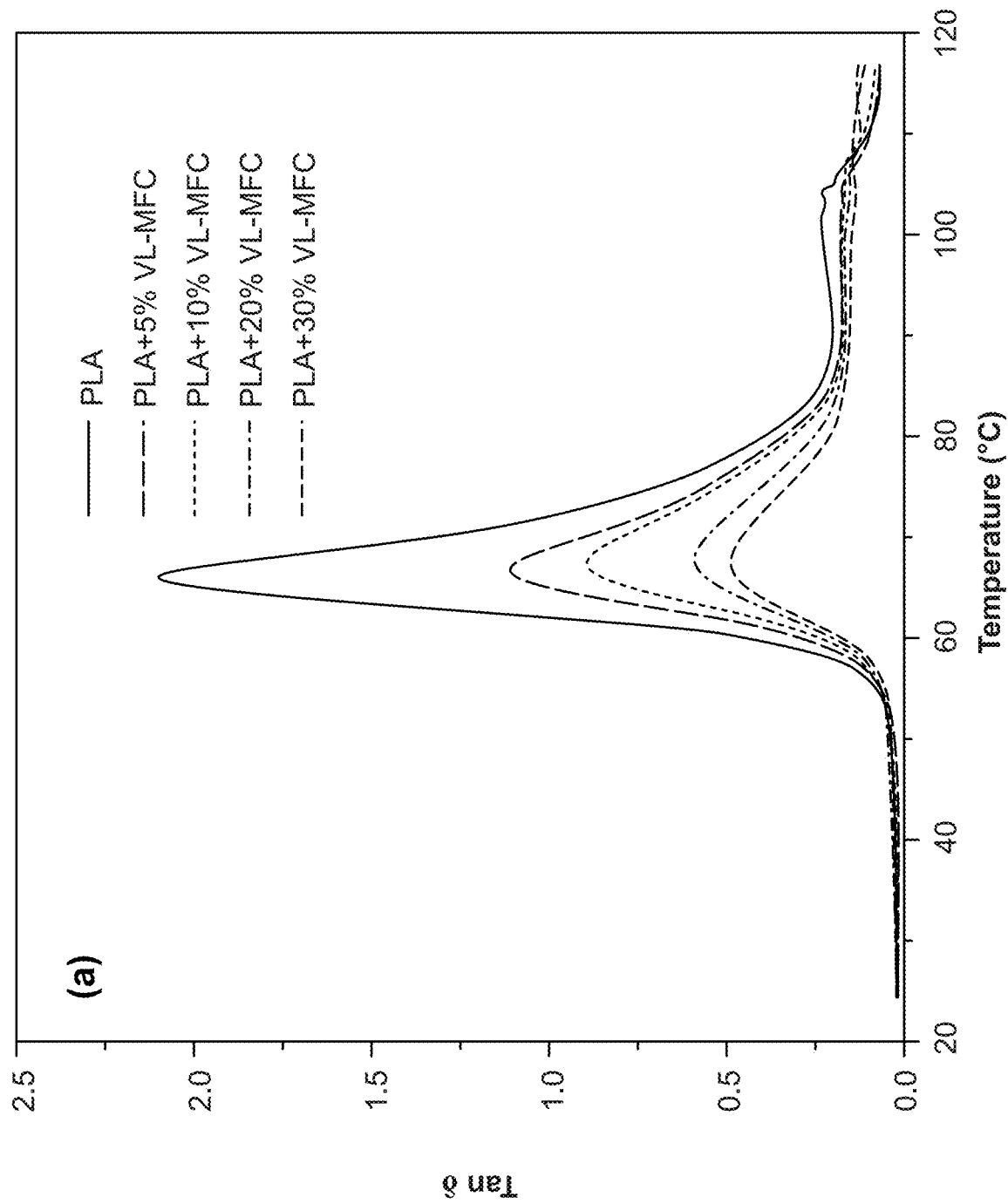
FIG. 11A is a plot of Tan δ of PLA+VL-MFC and FIG. 11B is a plot of Tan δ of PLA+MFC composites and neat PLA.
Figure 11B:
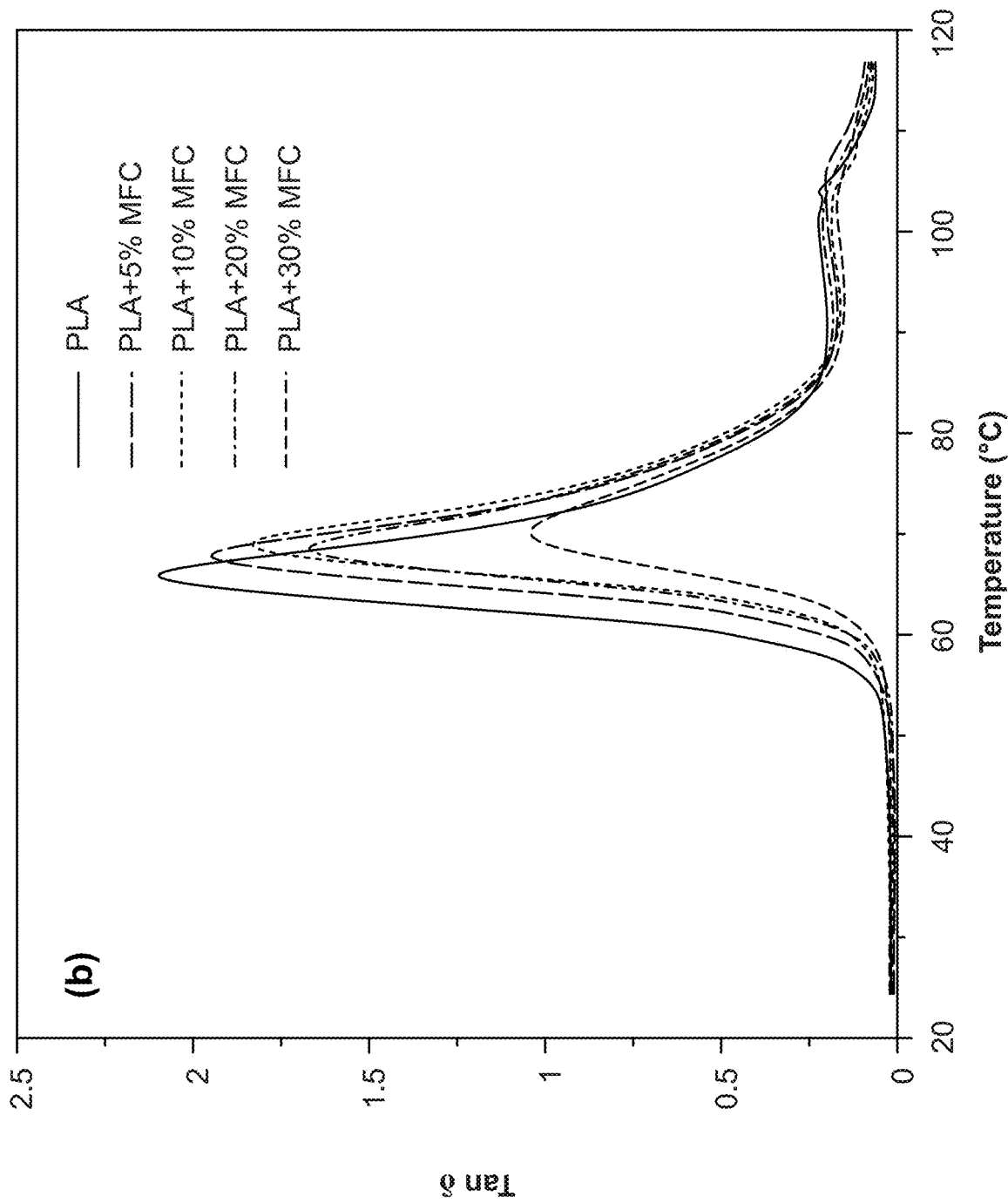

Dynamic Mechanical Analysis. DMA (FIG. 7) was conducted to investigate the influence of modified and unmodified MFC on the viscoelasticity of the composites. The logarithmic curves of the storage modulus (E') versus temperature (FIGS. 7A and 7B) show clearly three regions in the composites as the temperature changes: a glassy region (below 56° C.), a glass transition ($T_g$) (ca. 56-80° C.), and a rubbery state (ca. 80-100° C.). In the glassy region, E' increases with VL-MFC content (Table 1) in PLA+VL-MFC composites and is proportional to VL-MFC content, indicating good dispersion of VL-MFC in PLA composites. This finding suggests the strong reinforcement effect of VL-MFC in PLA might be due to the formation of a percolation cellulose network. For PLA+MFC, E' increases slightly after the addition of MFC, compared with neat PLA; but the values are much lower than for PLA+VL-MFC at the same fiber content. In the glass transition temperature ($T_g$) region, the E' of all the composites drops, but the E' values (Table 1) of VL-MFC-reinforced PLA are significantly higher than those of neat PLA and PLA+MFC. The increase in E' and decrease in the tan δ value of the PLA+VL-MFC and PLA+MFC composites (FIG. 11, Table 1) suggest that VL-MFC and MFC restrict the PLA chain mobility in the composites. Moreover, the $T_g$ of PLA increases slightly with the addition of fiber. In the rubbery region, a reinforcing effect reflecting the increase in E' value (Table 1) is observed after the addition of VL-MFC as well, and the effect becomes more pronounced as the filler content increases. For MFC-reinforced PLA, also, the E' in the rubbery region increases, but the effect is minimal, as detailed in Table 1. These results suggest that after modification, the compatibility of VL-MFC and the PLA matrix improved, and a significant reinforcement effect was observed in the PLA+VL-MFC composites.

TABLE 1

DMA results for PLA composites.

| Samples | E' at 25° C. (MPa) | E' at $T_g$ (MPa) | E" at 85° C. (MPa) | Intensity of tan δ | $T_g$ (tan δ, ° C.) |
| --- | --- | --- | --- | --- | --- |
| PLA | 2147 | 40.9 | 2.7 | 2.1 | 66.1 |
| PLA + 5% MFC | 2255 | 54.7 | 3.9 | 1.9 | 67.8 |
| PLA + 10% MFC | 2355 | 70.2 | 6.2 | 1.8 | 69.0 |
| PLA + 20% MFC | 2406 | 76.7 | 6.6 | 1.7 | 68.7 |
| PLA + 30% MFC | 2780 | 219 | 28.4 | 1.0 | 70.0 |
| PLA + 5% VL-MFC | 2546 | 143.1 | 14.1 | 1.1 | 66.7 |
| PLA + 10% VL-MFC | 2761 | 222.4 | 28.1 | 0.88 | 67.2 |
| PLA + 20% VL-MFC | 3324 | 479.8 | 93.4 | 0.58 | 67.4 |
| PLA + 30% VL-MFC | 3889 | 696.5 | 175.0 | 0.48 | 67.4 |

Rheological Properties.

Figure 7C:
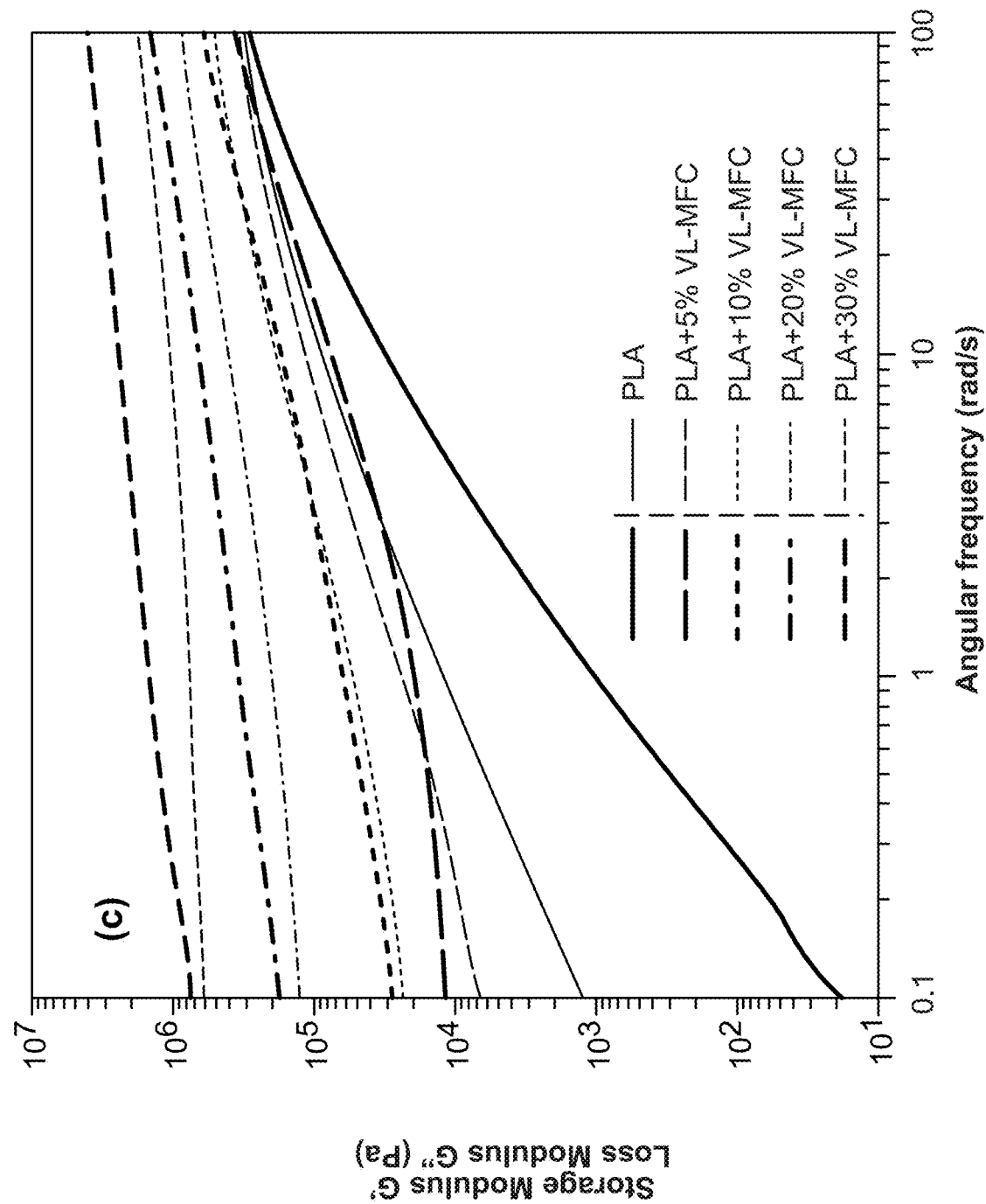
FIG. 7C depicts rheological properties for PLA+VL-MFC composites.
Figure 7D:
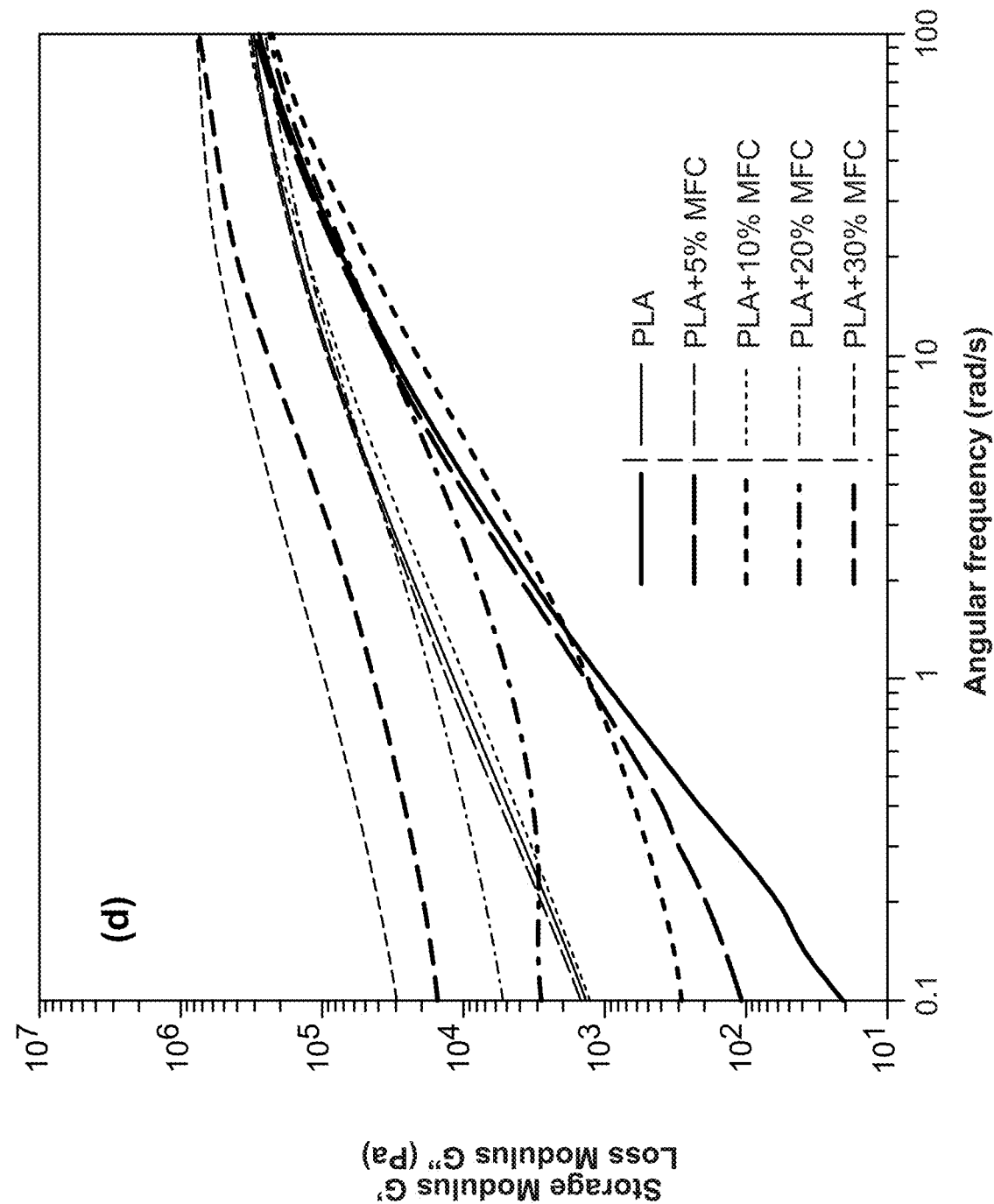
FIG. 7D depicts rheological properties for PLA+MFC (d) composites.

The impact of VL-MFC and MFC on the rheological properties of composites was investigated. As shown in FIG. 7C, introducing VL-MFC into PLA drastically increases the storage moduli (G') and loss moduli (G") of PLA+VL-MFC composites, and the effect is more prominent in the low-frequency region. These results could be explained by the fact that VL-MFC fiber restricts deformation. Both the G' and G" of PLA+VL-MFC increase as the VL-MFC content increases. For neat PLA, the G" value is higher than the G' value; and there is no cross point between G' and G", indicating that neat PLA behaves like a liquid in the frequency range of 0.1-100 rad/s. The G' and G" of PLA+5% VL-MFC and PLA+10% VL-MFC show cross points in a low-angular-frequency region (ca. 1 rad/s), suggesting they behave like a liquid in higher-shear regions and a solid in low-shear-frequency regions. As the VL-MFC content increases to 20 and 30%, the cross points disappear and G'>G" in the whole frequency region, suggesting PLA+20% VL-MFC and PLA+30% VL-MFC behave as solid rather than liquids. In contrast, for MFC-reinforced PLA composites (FIG. 7D), the G' increases with MFC content in the low-frequency region (0.1-1 rad/s) and in the high-frequency region, except for PLA+30% MFC, which has a higher G' than the other samples because of the rigidity of the MFC. Additionally, G">G' is observed in the whole frequency region for PLA+MFC composites, suggesting these MFC-reinforced composites behave like liquids. Compared with PLA+VL-MFC composites, the G' values of PLA+MFC composites are much lower, indicating less effective reinforcement.

Figure 12A:
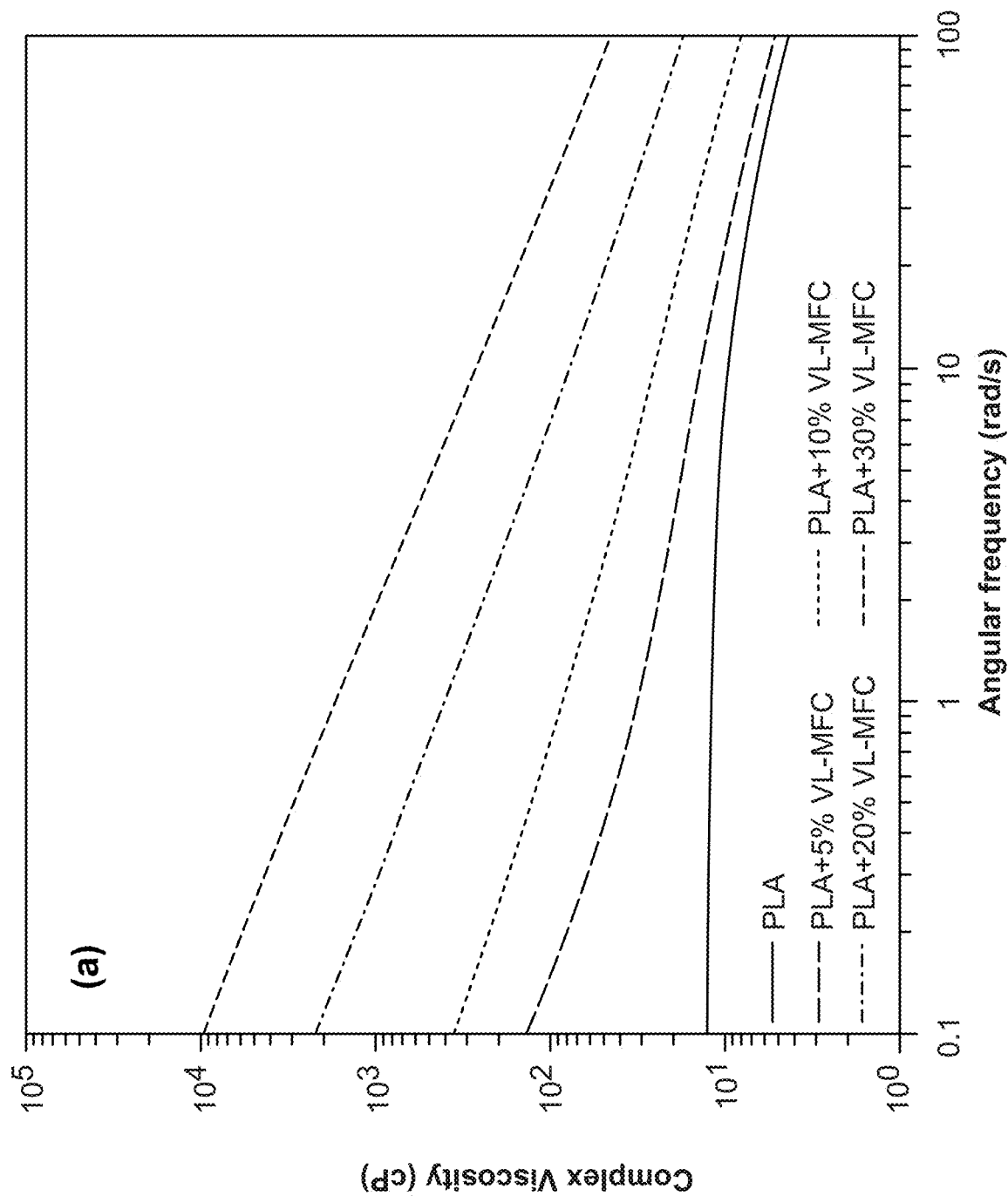
FIG. 12A is a plot of complex viscosity of the PLA+VL-MFC and FIG. 12B is a plot of complex viscosity of the PLA+MFC composites.
Figure 12B:
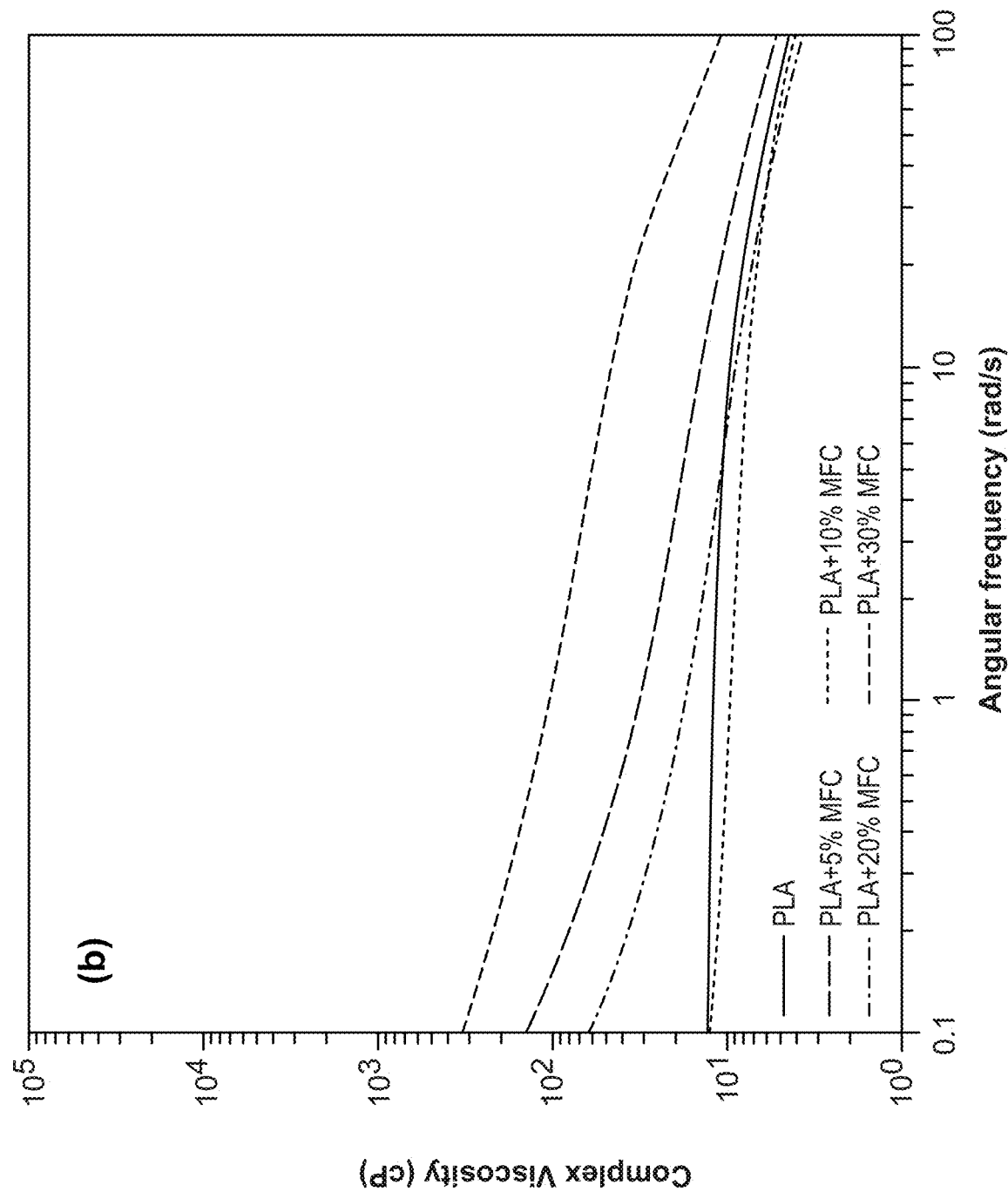

The complex viscosity (η*, FIG. 12) of the VL-MFC-reinforced composites changed dramatically with an addition of 5% VL-MFC and increased in proportion to the VL-MFC content (FIG. 12, insert). The change in η* was due to restriction of the motion of the PLA chain by VL-MFC. The η* of all the PLA composites decreased as the frequency increased and exhibited non-Newtonian behavior. Shear thinning behavior was observed and can be attributed to reduction of the viscous resistance by disentanglement of the VL-MFC and PLA chains in the flow direction. For PLA+MFC composites (FIG. 12B), η* did not have a clear relationship to the MFC content, and their η* values were higher than PLA values, except for PLA+10% MFC. The dramatic change in the η* and storage moduli of PLA+VL-MFC composites clearly shows a liquid-to-solid transition with an increase in VL-MFC content. This transition was caused by the formation of an interconnected network of polymer chains and nanofillers (VL-MFC in this case). A similar effect was observed in lignin-coated CNC-reinforced PLA composites. 24 VL-MFC fibers acted as physical cross-linking points; and above the rheological percolation threshold concentration, a VL-MFC network formed and thus prohibited mobility of the PLA chain under shear force.

Thermal Properties.

Figure 13:
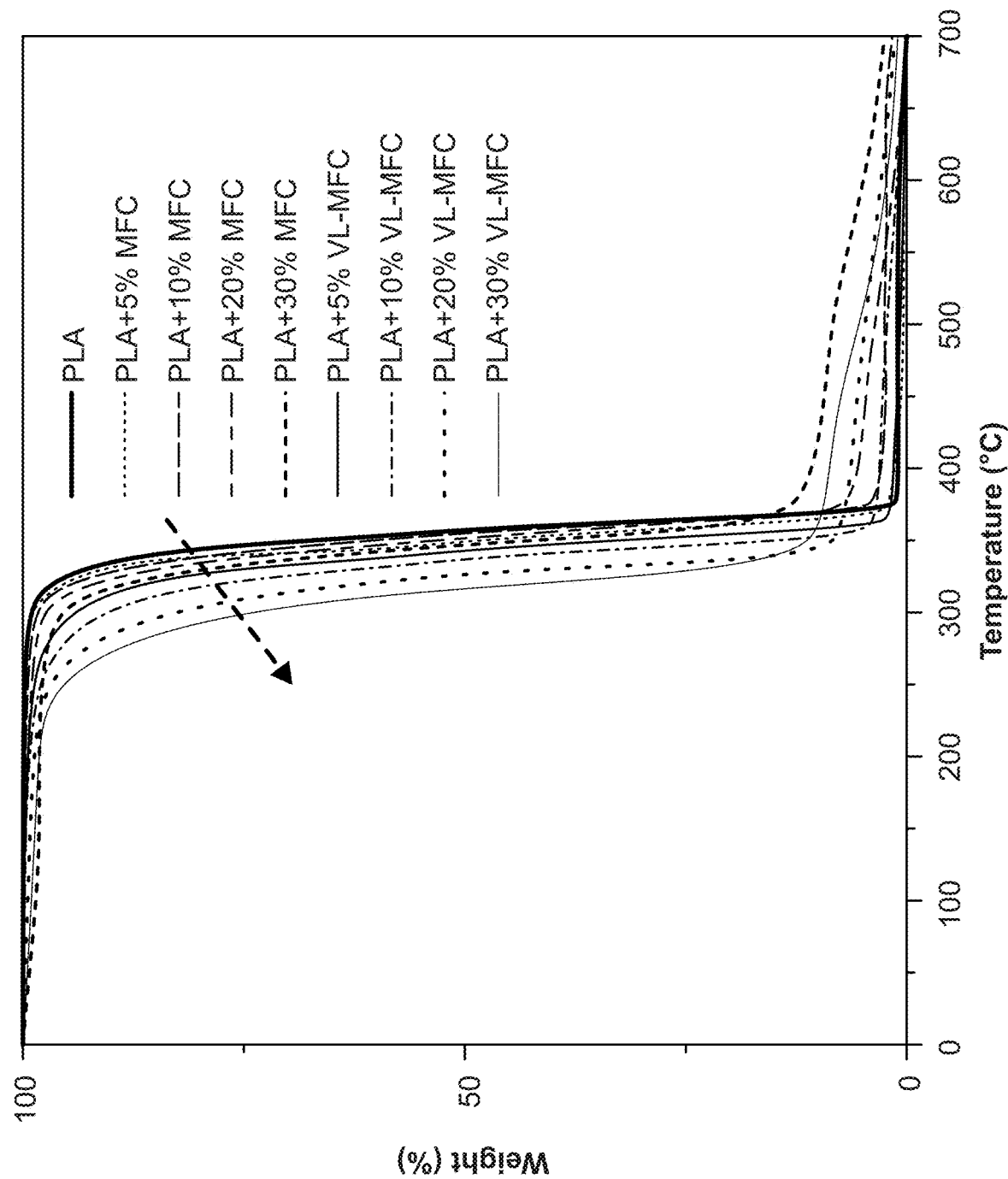
FIG. 13 is a plot of TGA results of MFC and VL-MFC reinforced PLA composites and neat PLA.
Figure 14A:
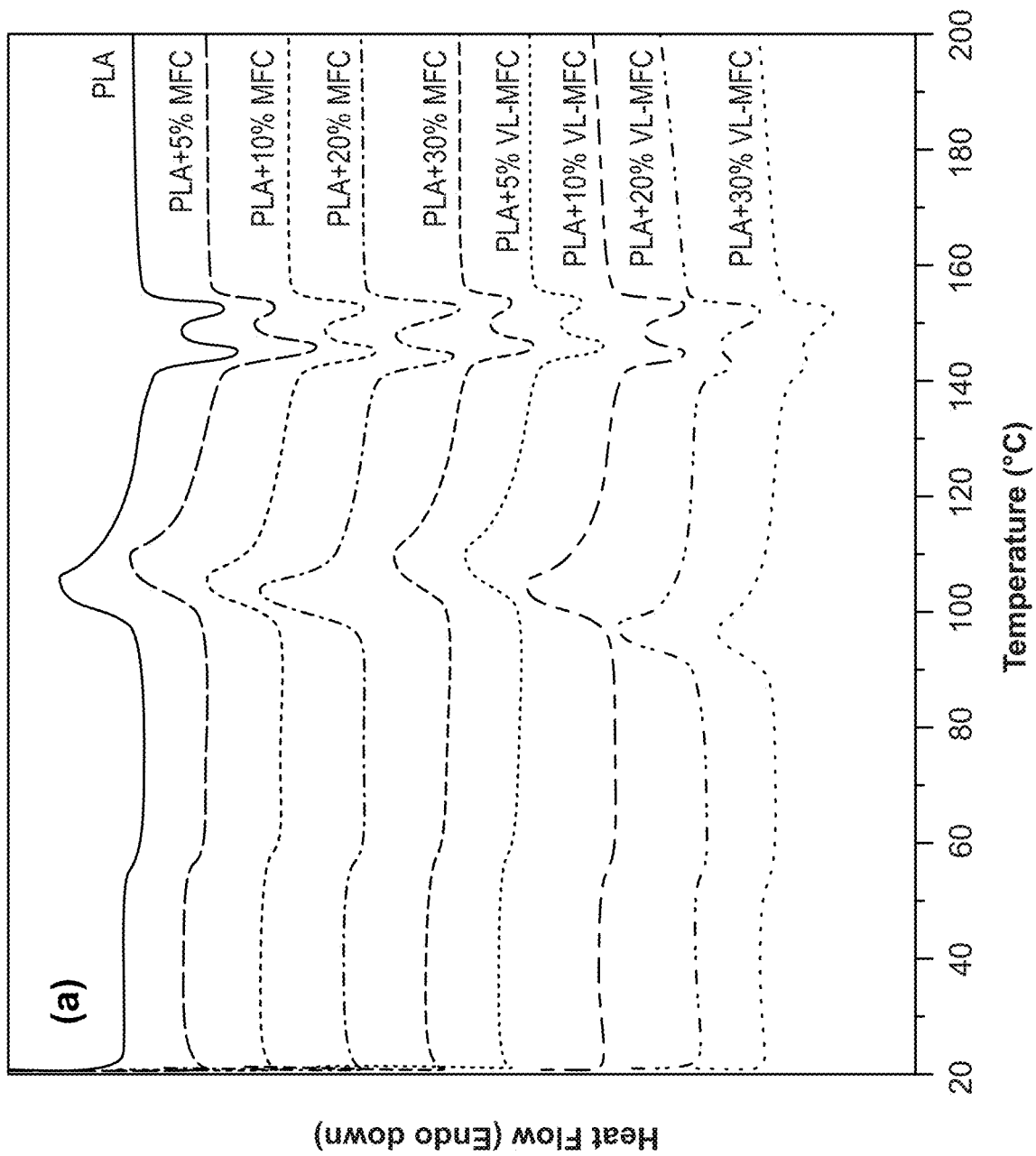
FIG. 14A is a plot of DSC results of MFC and VL-MFC reinforced PLA composites and neat PLA first heating circle.
Figure 14B:
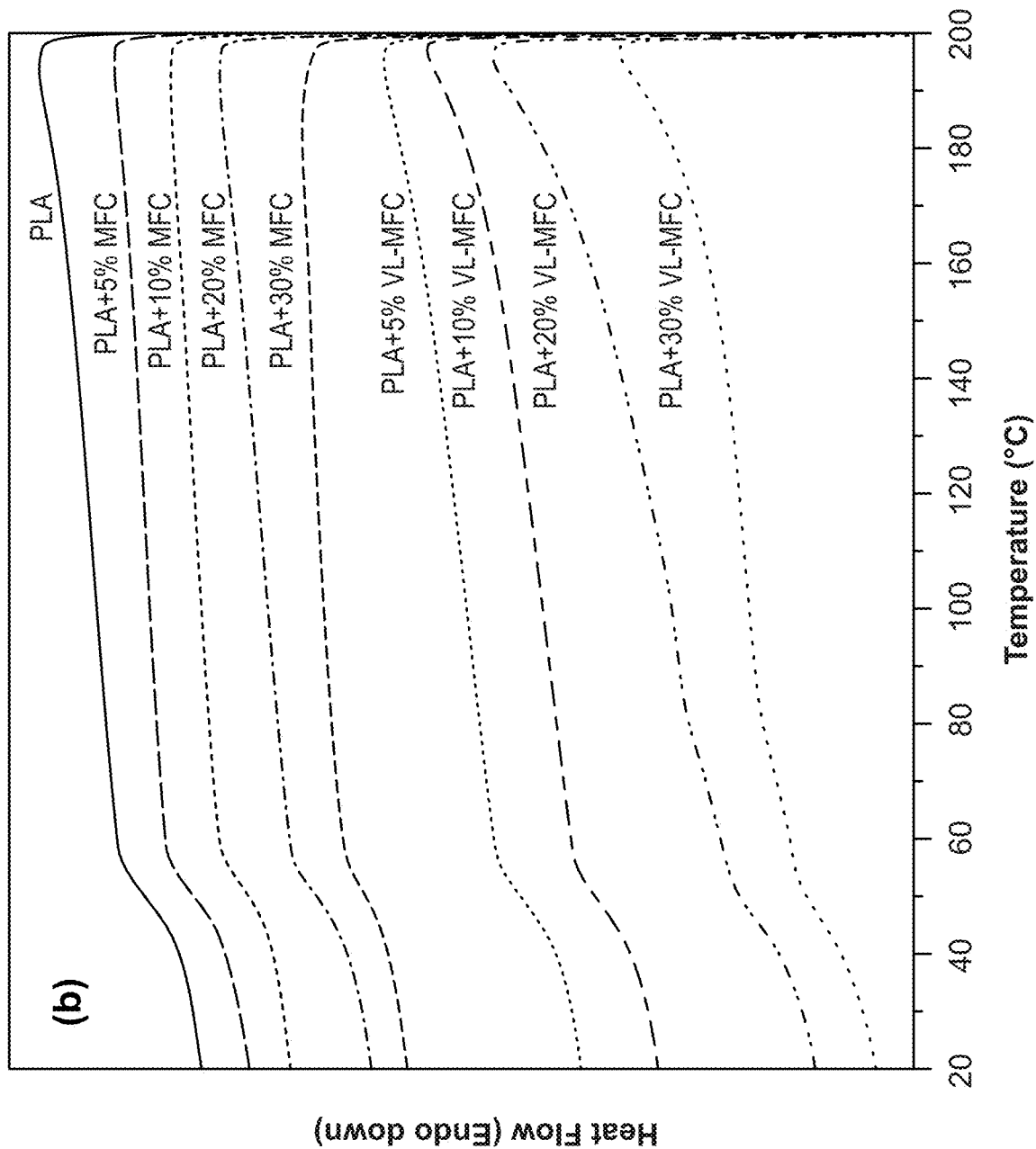
Fig. 14B is a plot of DSC results of MFC and VL-MFC reinforced PLA composites and neat PLA cooling circle.

Thermal properties of the composites were studied by TGA (FIG. 13) and DSC (FIG. 14), and the detailed results ae shown in Table 2. The thermal stability decreases with the addition of MFC and VL-MFC, and the T5% value decreases with an increase in the fiber content because cellulose fiber is less thermally stable than PLA. The DSC results suggest that the $T_g$ and melting temperature of PLA+MFC and PLA+VL-MFC composites are similar with a slight change. The crystallization peak (cold crystallization) decreases with increasing VL-MFC content for PLA+VL-MFC composites, suggesting crystallization of the PLA+VL-MFC composites becomes easier. The calculated crystallinity increases significantly with the VL-MFC content for PLA+VL-MFC composites and reaches 16% for PLA+30% VL-MFC, suggesting VL-MFC could induce crystallization of PLA. This is also evidenced in the cooling circles (FIG. 14B), in which a crystallization peak (85° C.) appears in PLA+20% VL-MFC and PLA+30% VL-MFC composites during cooling. There is no crystallization during cooling for neat PLA and PLA/MFC composites (FIG. 14B). It has been reported that cellulose fiber can induce PLA crystallization. This could explain the increase in crystallinity. Yu, H. Y.; Zhang, H.; Song, M. L.; Zhou, Y.; Yao, J.; Ni, Q. Q., From cellulose nanospheres, nanorods to nanofibers: Various aspect ratio induced nucleation/reinforcing effects on polylactic acid for robust-barrier food packaging. ACS Appl. Mater. Interfaces 2017, 9, 43920-43938; Ding, W.; Jahani, D.; Chang, E.; Alemdar, A.; Park, C. B.; Sain, M., Development of PLA/cellulosic fiber composite foams using injection molding: Crystallization and foaming behaviors. Compos. Part A Appl. Sci. Manuf 2016, 83, 130-139. Suryanegara et al. investigated the effect of crystallinity on PLA mechanical properties by adding nucleant phenylphosphonic acid zinc (PPA-Zn) and found the increased crystallinity did not improve the tensile strength of PLA. Suryanegara, L.; Okumura, H.; Nakagaito, A. N.; Yano, H., The synergetic effect of phenylphosphonic acid zinc and microfibrillated cellulose on the injection molding cycle time of PLA composites. *Cellulose* 2011, 18, 689-698. Therefore, the improved mechanical properties of PLA+VL-MFC composites are due to the fiber reinforcement effect.

TABLE 2

Thermal properties of PLA composites.[a]

| Sample | $T_{5\%}$ (°C.) | $T_g$ (°C.) | $T_c$ (°C.) | $T_m$ (°C.) | $\Delta H_c$ (J/g) | $\Delta H_m$ (J/g) | $\chi_c$ (%) |
|---|---|---|---|---|---|---|---|
| PLA | 325.5 | 56.5 | 105.4 | 145.2, 153.1 | 26.9 | 27.7 | 1 |
| PLA + 5% MFC | 319 | 56.7 | 109.4 | 146.0, 153.2 | 25.8 | 27.1 | 1 |
| PLA + 10% MFC | 318 | 58.2 | 105.7 | 145.2, 153.0 | 22.5 | 23.9 | 2 |
| PLA + 20% MFC | 313 | 56.3 | 103.4 | 144.3, 152.8 | 25.6 | 26.7 | 1 |
| PLA + 30% MFC | 307 | 58.8 | 101.6 | 146.5, 154.0 | 18.8 | 20.4 | 2 |
| PLA + 5% VL-MFC | 299.1 | 56.3 | 104.7 | 145.7, 153.7 | 27.2 | 28.3 | 1 |
| PLA + 10% VL-MFC | 283.3 | 55.2 | 104.6 | 145.1, 153.5 | 24.2 | 26.6 | 3 |
| PLA + 20% VL-MFC | 268.8 | 53.6 | 97.4 | 143.2, 152.5 | 20.4 | 25.4 | 7 |
| PLA + 30% VL-MFC | 258.1 | 53.1 | 96.5 | 143.1, 153.4 | 16.2 | 26.3 | 16 |

Figure 8A:
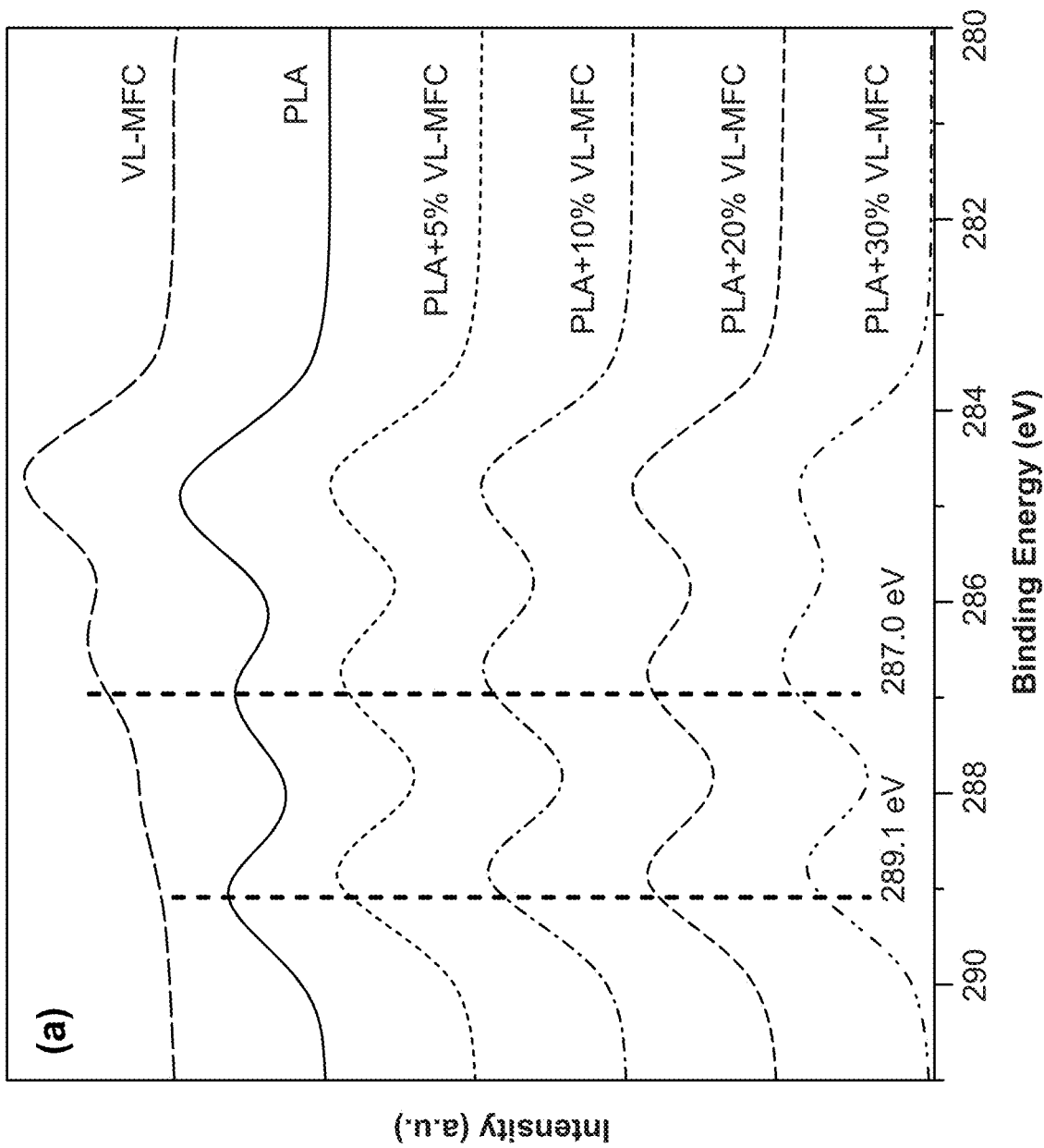
FIG. 8A depicts XPS spectra of C1s in VL-MFC, PLA, and PLA+VL-MFC composites.
Figure 8B:
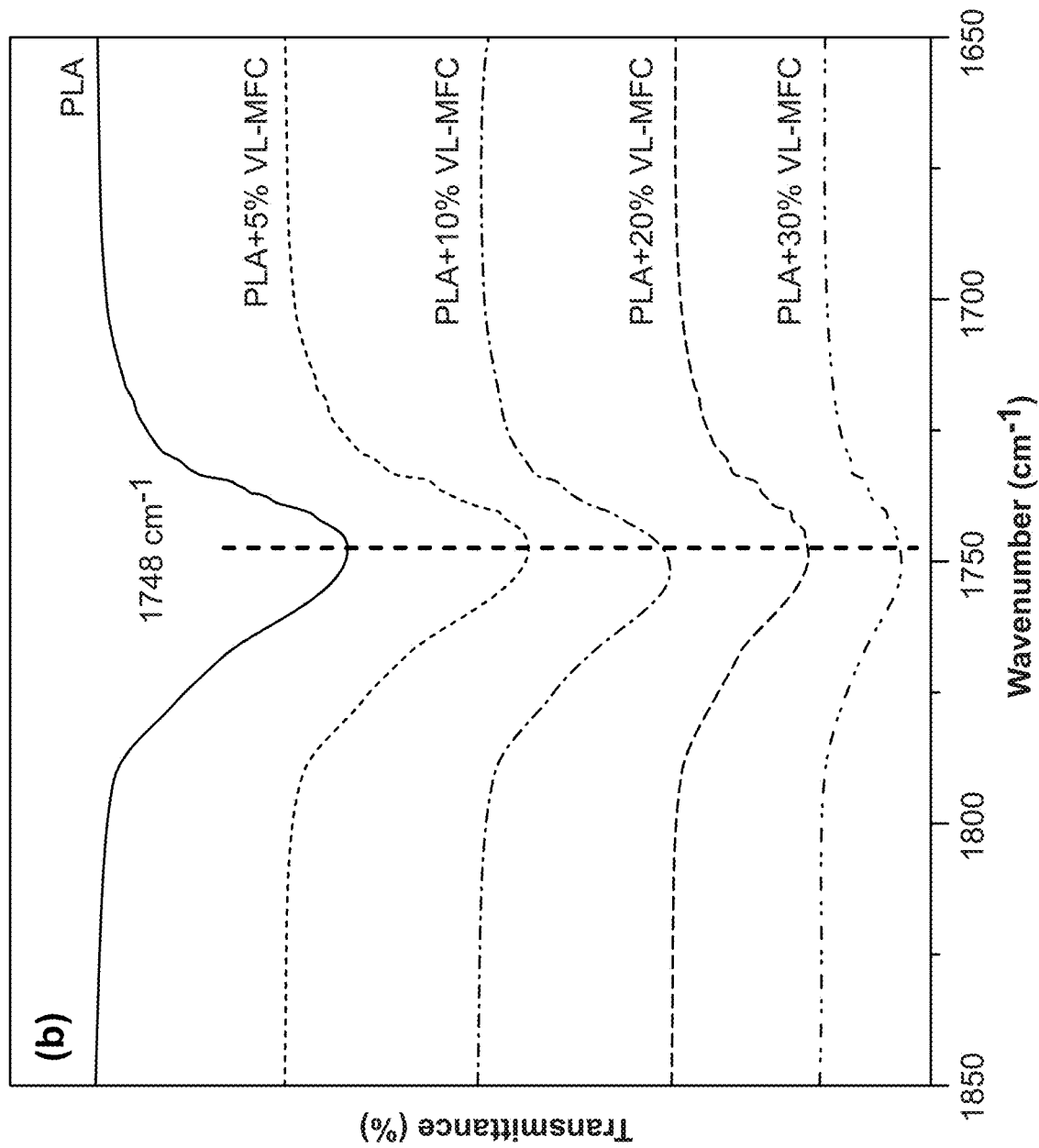
FIG. 8B depicts FTIR spectra of PLA and PLA+VL-MFC composites.
Figure 15A:
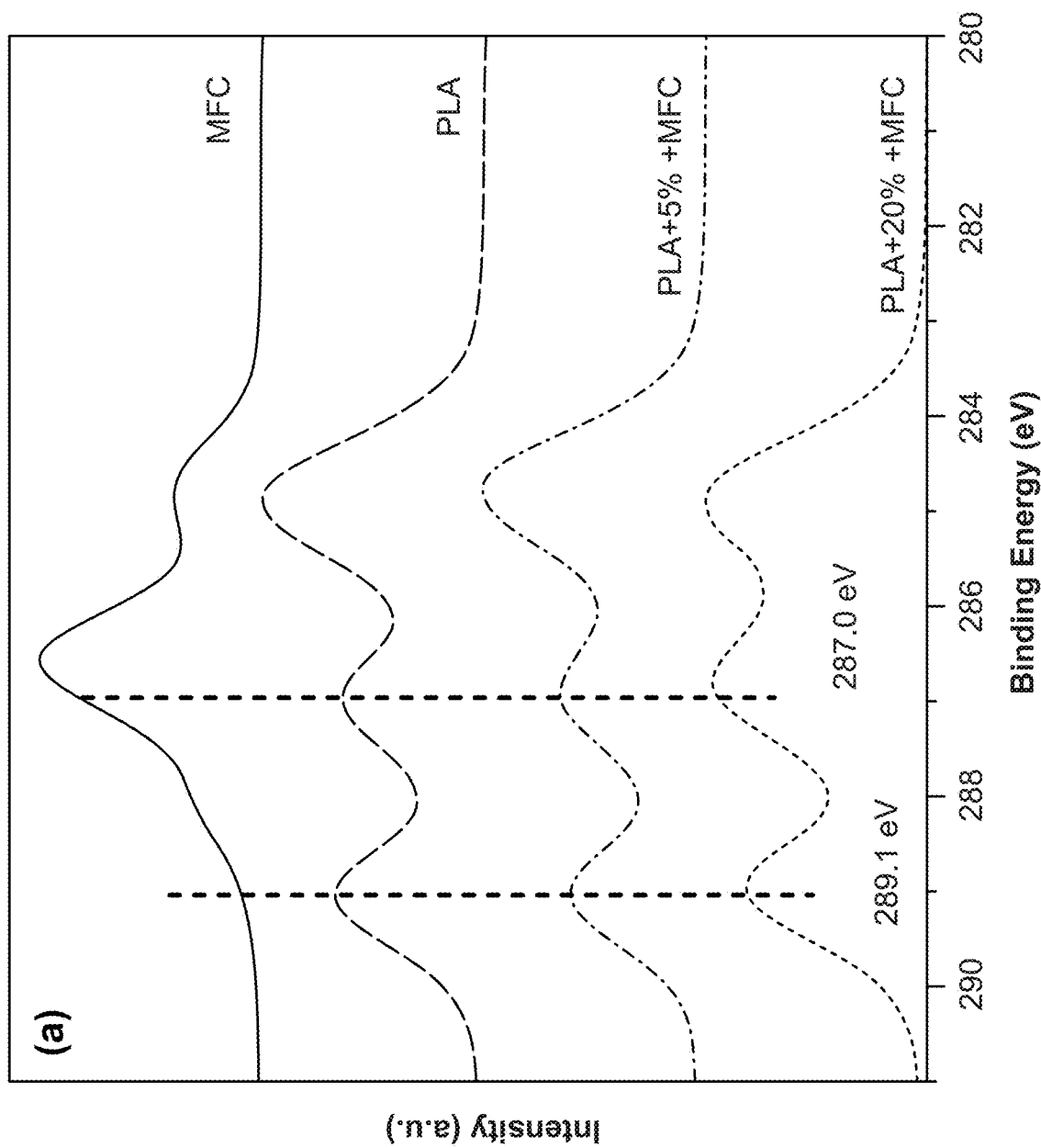
FIG. 15A is a plot of XPS spectra of C1s in MFC, PLA, and PLA+MFC composites.
Figure 15B:
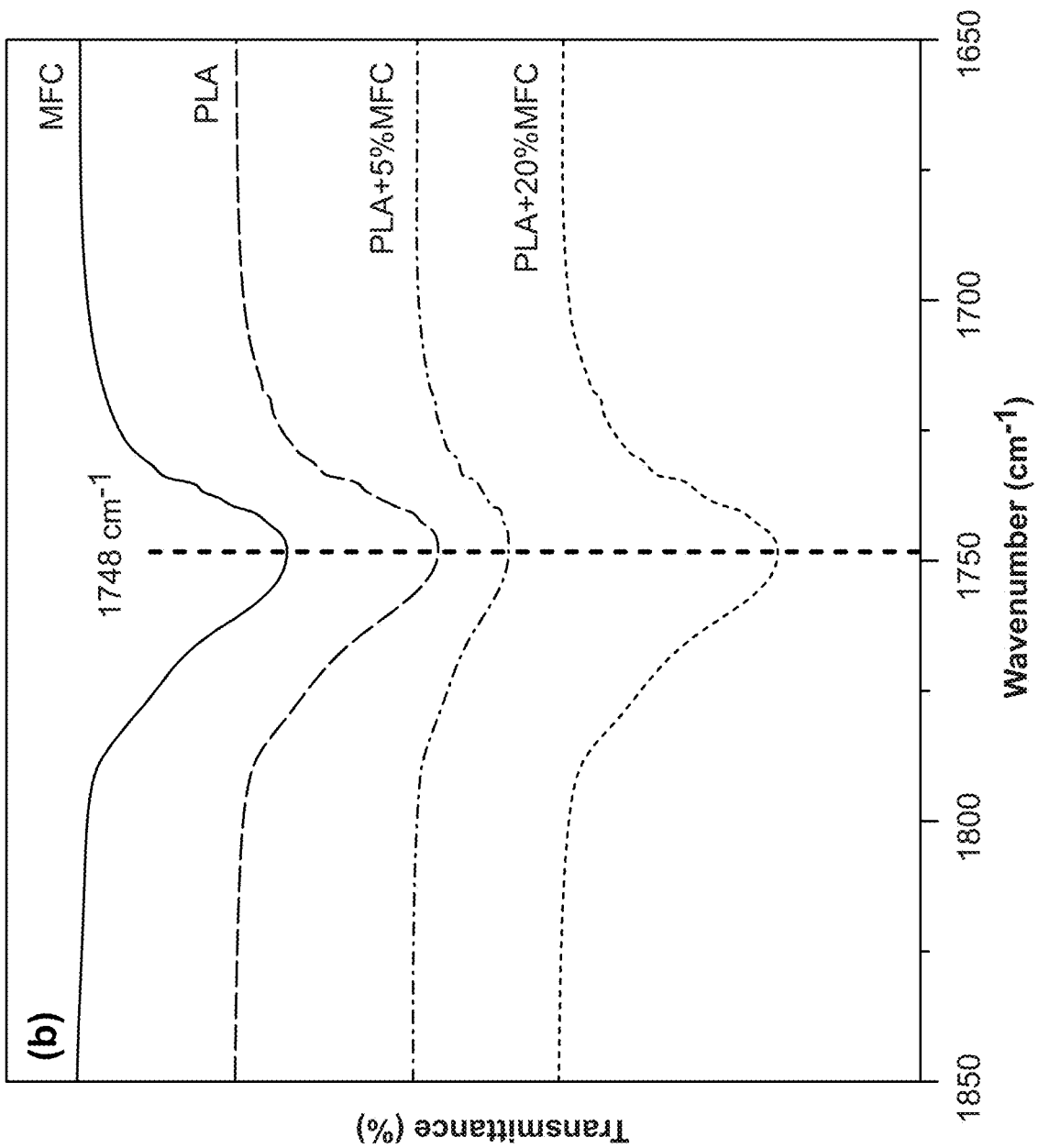
FIG. 15B is an FT-IR plot of PLA and PLA+MFC composites.
Figure 16A:
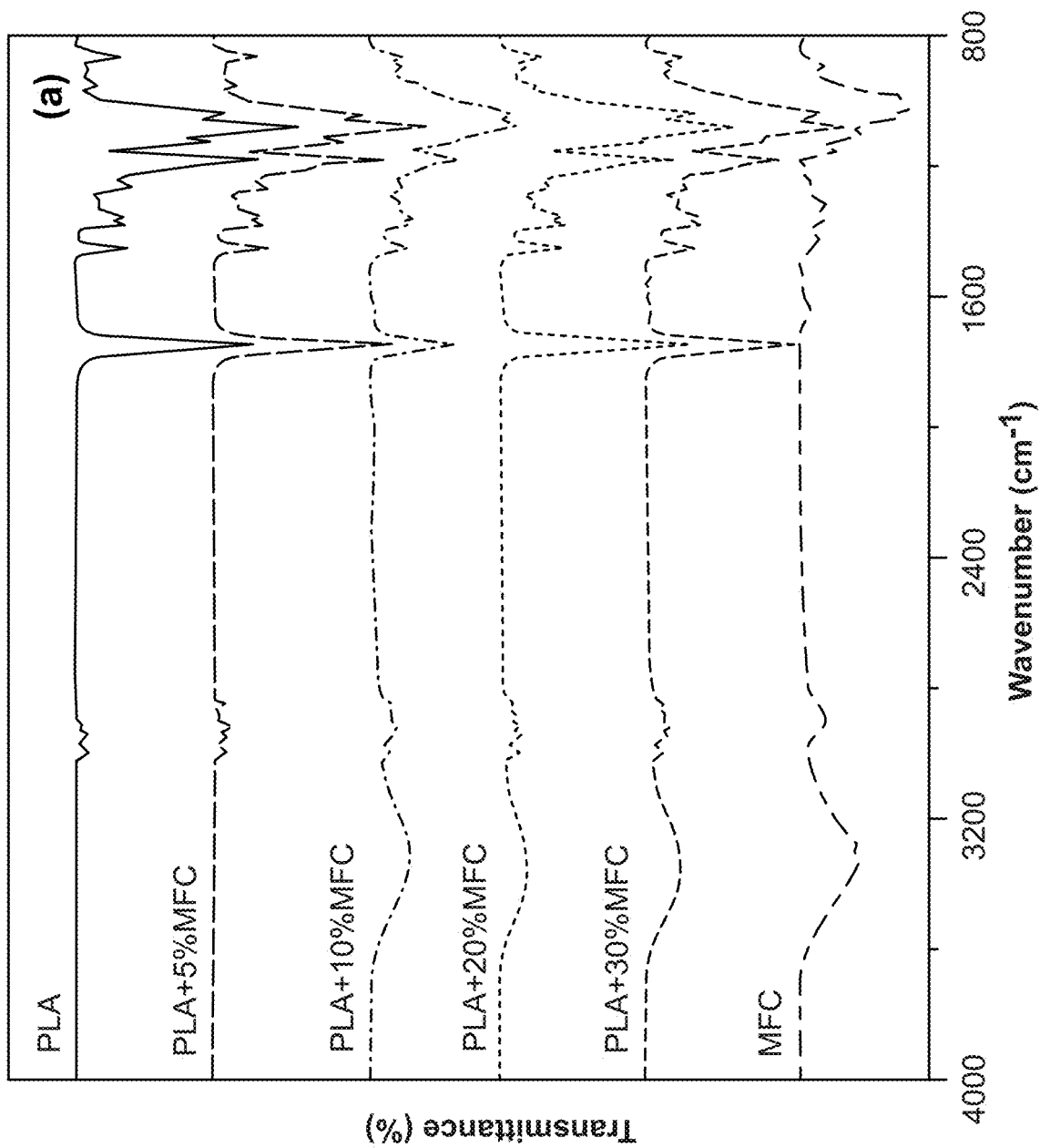
FIG. 16A is a plot of FT-IR spectra of the MFC and FIG. 16B is a plot of FT-IR spectra of the VL-MFC reinforced PLA composites.
Figure 16B:
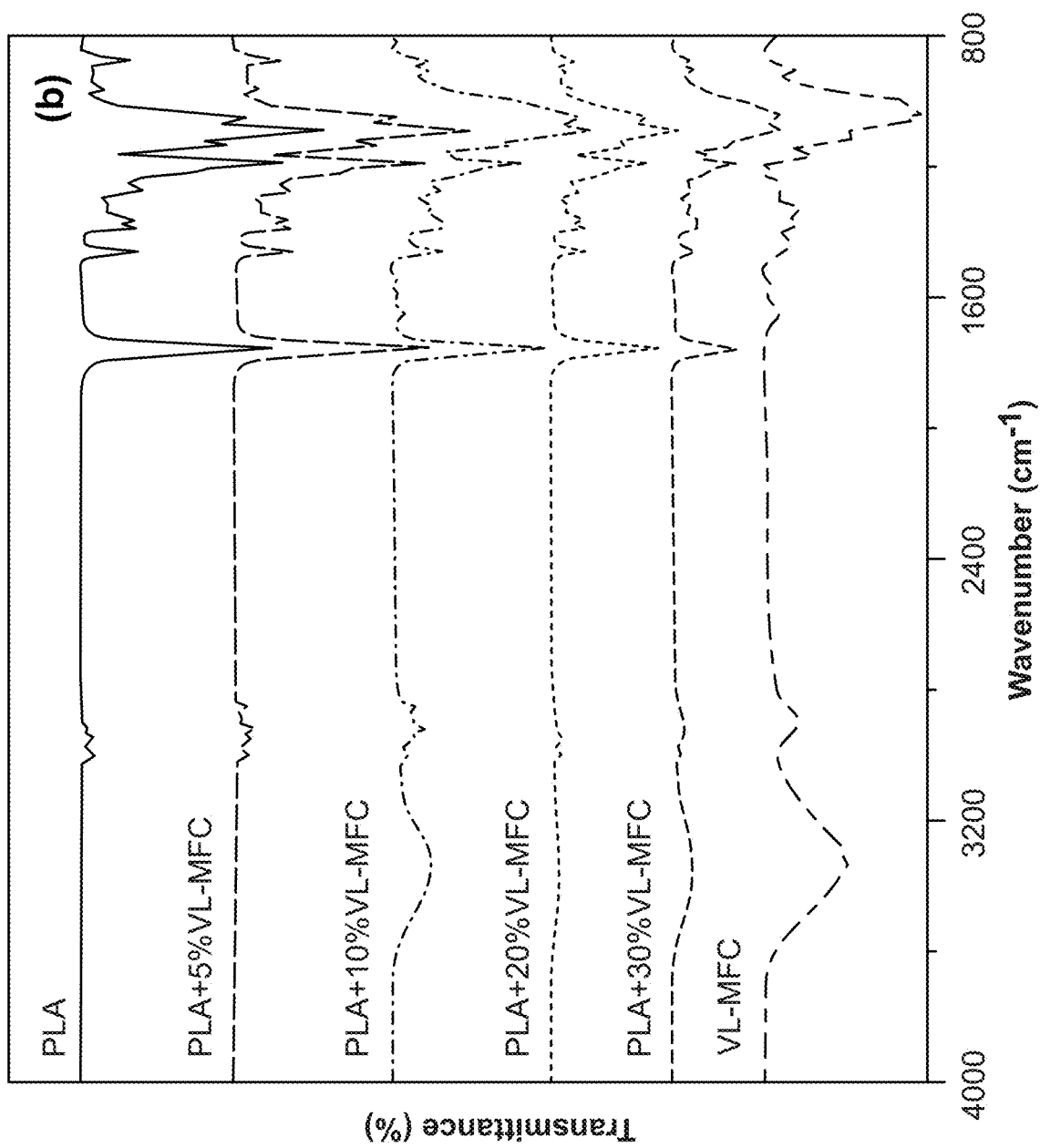

Notes:
[a]$T_{5\%}$: decomposition temperature; $T_g$: glass transition temperature; $T_c$: cold crystallization temperature during heating circle; $T_m$: melting point; $\Delta H_m$: melting enthalpies; $\Delta H_c$: crystallization enthalpies. $\chi_c$: crystallinity. $T_{5\%}$, $T_g$, $T_c$, $T_m$, $\Delta H_m$, and $\Delta H_c$ were determined from TGA and DSC XPS and FTIR spectra of the composites were recorded to identify the possible interfacial interaction between VL-MFC and the PLA matrix. As shown in FIG. 8A, the C1s spectrum of PLA contains three peaks centered at 284.9, 287.0, and 289.1 eV, which belong to C—C, O—C—O, and C=O, respectively. After the introduction of VL-MFC into the PLA matrix, the peaks at 289.1 and 287.0 eV shifted to 288.8 and 286.7 eV, respectively. This peak shift indicates a new carbon environment appeared as a result of the addition of VL-MFC. These new peaks were not generated from the carbon signal of VL-MFC, suggesting a strong interfacial interaction—possibly hydrogen bonds and hydrophobic interactions—between VL-MFC and PLA. The peaks (284.9, 287.0, and 289.1 eV) in the PLA+MFC composite remained the same after MFC was added to the PLA matrix (FIG. 15), suggesting a weak interfacial interaction between hydrophilic MFC and hydrophobic PLA Moreover, the FTIR spectra (FIG. 8, and FIG. 16) show evidence of improved interfacial interaction between VL-MFC and PLA compared with MFC and PLA. The peak at 1748 cm$^{-1}$ (C=O) in PLA shifts to a higher wavenumber with increasing VL-MFC content (FIG. 8b), suggesting possible hydrogen bond formation between the PLA chains and VL-MFC.[25] However, there is no such shift in the PLA+MFC composites (FIG. 15B). Therefore, the interfacial interaction between cellulose fiber and PLA was enhanced after modification, leading to the strong reinforcement effect.

Figure 9A:
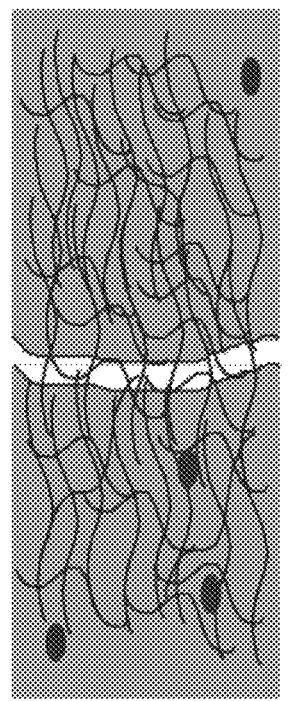
FIG. 9A is an illustration of the possible reinforcement mechanism of PLA+VL-MFC.
Figure 9B:
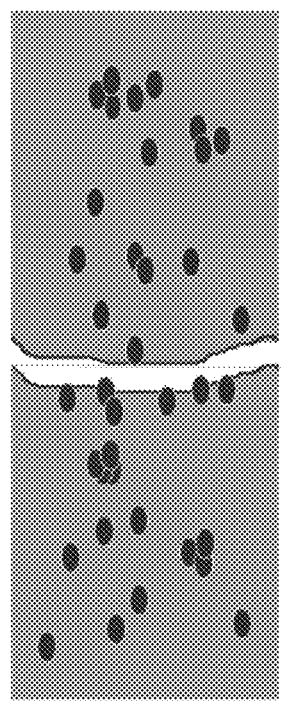
FIG. 9B is an illustration of the possible reinforcement mechanism of PLA+MFC.
Figure 10:
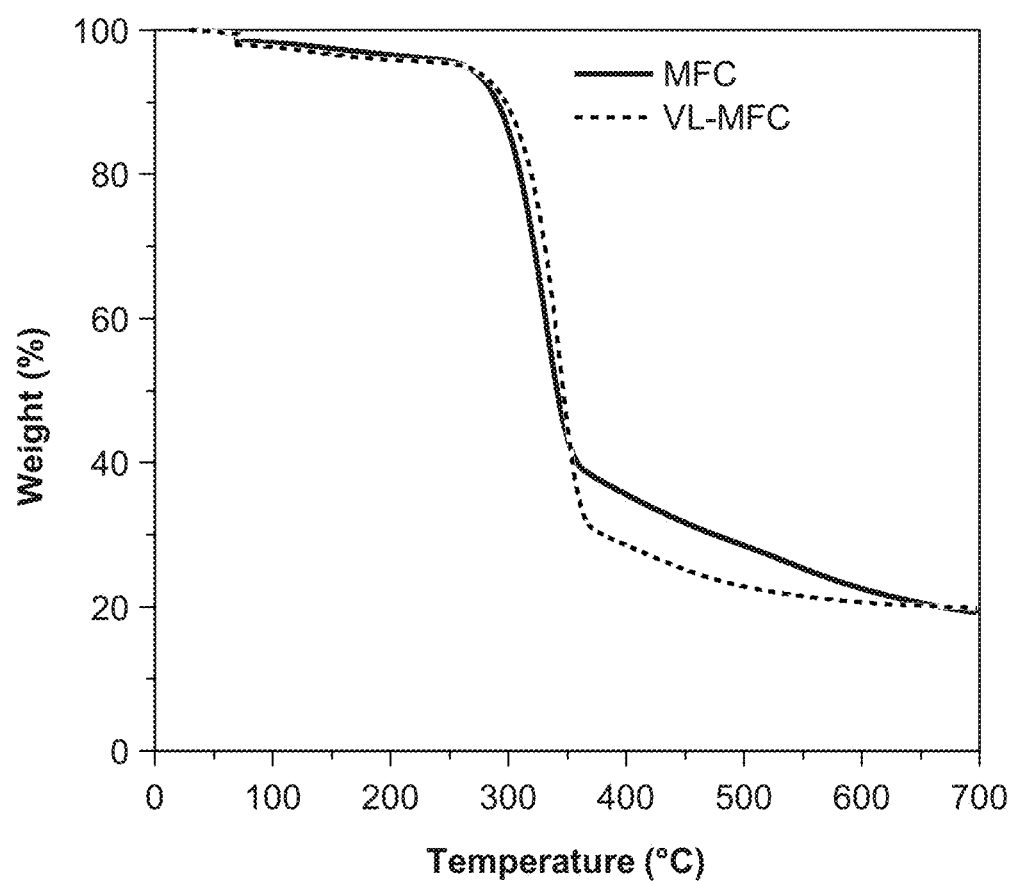
FIG. 10 is TGA plot of MFC and VL-MFC.

As discussed previously, after modification with VL, the hydrophilicity of MFC decreased and the fibril structure was preserved, even though there were still some aggregates. After VL-MFC was incorporated into the PLA matrix, it dispersed well and formed a cellulose network (FIG. 9). These networks play a reinforcement role in composites. Nanocellulose, for example, a CNF film (~100 MPa in tensile strength), is a stronger material than PLA. Li, K.; Skolrood, L.; Aytug, T.; Tekinalp, H.; Ozcan, S., Strong and tough cellulose nanofibrils composite films: Mechanism of synergetic effect of hydrogen bonds and ionic interactions. *ACS Sustainable Chem. Eng.* 2019, 7, 14341-14346. When an external force is applied to a composite, these cellulose networks help to dissipate the energy and make the composite stronger than neat PLA. Additionally, interfacial adhesion through hydrogen bonding or a hydrophobic interaction between VL-MFC and PLA was confirmed. The cellulose networks and interfacial adhesion allowed effective loading transfer between the filler (VL-MFC) and the PLA matrix and thus reinforced the PLA. For MFC, on the other hand, particles obtained after oven drying tended to aggregate in the polymer matrix because of the strong hydrogen bonding between the individual cellulose particles. Moreover, the interfacial adhesion was weak—the MFC particles acted as defects and tended to break easily under an external force, resulting in poor mechanical properties of composites, as observed in FIG. 3.

Comparison with Cellulose Fiber-Reinforced PLA.

To compare the reinforcement performance of VL-MFC, the mechanical properties of cellulose fiber-reinforced PLA composites from numerous reports are summarized in Table 3 below. To achieve good dispersion of microfibrillated cellulose, solution mixing or casting was used to prepare MFC/CNF-reinforced PLA; the tensile strengths reached 77 MPa with reasonable Young's moduli of around 5 GPa. Iwatake, A.; Nogi, M.; Yano, H., Cellulose nanofiber-reinforced polylactic acid. *Compos. Sci. Technol.* 2008, 68, 2103-2106; onoobi, M.; Harun, J.; Mathew, A. P.; Oksman, K., Mechanical properties of cellulose nanofiber (CNF) reinforced polylactic acid (PLA) prepared by twin screw extrusion. *Compos. Sci. Technol.* 2010, 70, 1742-1747; Suryanegara, L.; Nakagaito, A. N.; Yano, H., Thermomechanical properties of microfibrillated cellulose-reinforced partially crystallized PLA composites. *Cellulose* 2010, 17, 771-778; Okubo, K.; Fujii, T.; Thostenson, E. T., Multi-scale hybrid biocomposite: Processing and mechanical characterization of bamboo fiber reinforced PLA with microfibrillated cellulose. *Compos. Part A Appl. Sci. Manuf* 2009, 40, 469-475; and Suryanegara, L.; Nakagaito, A. N.; Yano, H., The effect of crystallization of PLA on the thermal and mechanical properties of microfibrillated cellulose-reinforced PLA composites. *Compos. Sci. Technol.* 2009, 69, 1187-1192. However, the solution-based process is costly and hard to scale up for large-volume composite applications such as large-scale additive manufacturing. Chemically modified cellulose fibers or crystals—such as maleic anhydride-modified CNC, (Pandey, J. K.; Lee, C. S.; Ahn, S.-H., Preparation and properties of bio-nanoreinforced composites from biodegradable polymer matrix and cellulose whiskers. *J. Appl. Polym. Sci.* 2010, 115, 2493-2501), acetylated CNF/CNC, (Lin, N.; Huang, J.; Chang, P. R.; Feng, J.; Yu, J., Surface acetylation of cellulose nanocrystal and its reinforcing function in poly(lactic acid). *Carbohydr. Polym.* 2011, 83, 1834-1842; Jonoobi, M.; Mathew, A. P.; Abdi, M. M.; Makinejad, M. D.; Oksman, K., A comparison of modified and unmodified cellulose nanofiber reinforced polylactic acid (pla) prepared by twin screw extrusion. *J. Polym. Environ.* 2012, 20, 991-997; and Lee, J. H.; Park, S. H.; Kim, S. H., Surface modification of cellulose nanowhiskers and their reinforcing effect in polylactide. *Macromol. Res.* 2014, 22, 424-430) 3-methacryloxypropyltrimethoxysilane-modified CNF (Qu, P.; Zhou, Y.; Zhang, X.; Yao, S.; Zhang, L., Surface modification of cellulose nanofibrils for poly(lactic acid) composite application. *J. Appl. Polym. Sci.* 2012, 125, 3084-3091) and others (Suryanegara, L.; Okumura, H.; Nakagaito, A. N.; Yano, H., The synergetic effect of phenylphosphonic acid zinc and microfibrillated cellulose on the injection molding cycle time of PLA composites. *Cellulose* 2011, 18, 689-698; Xiao, L.; Mai, Y.; He, F.; Yu, L.; Zhang, L.; Tang, H.; Yang, G., Bio-based green composites with high performance from poly(lactic acid) and surface-modified microcrystalline cellulose. *J. Mater. Chem.* 2012, 22, 15732-15739; Tanpichai, S.; Sampson, W. W.; Eichhorn, S. J., Stress-transfer in microfibrillated cellulose reinforced poly(lactic acid) composites using Raman spectroscopy. *Compos. Part A Appl. Sci. Manuf* 2012, 43, 1145-1152; Arias, A.; Heuzey, M.-C.; Huneault, M. A.; Ausias, G.; Bendahou, A., Enhanced dispersion of cellulose nanocrystals in melt-processed polylactide-based nanocomposites. *Cellulose* 2014, 22, 483-498; and Robles, E.; Urruzola, I.; Labidi, J.; Serrano, L., Surface-modified nanocellulose as reinforcement in poly(lactic acid) to conform new composites. *Ind. Crop. Prod.* 2015, 71, 44-53 have also been reported; however their tensile strength increased and Young's moduli did not improve or even decreased for those composites. The solution process was also the main methodology used in these efforts. Direct mixing of freeze-dried CNFs (40% fiber content) through molten compounding with PLA can produce composites with tensile strengths and Young's moduli of up to 100 MPa and 9 GPa, respectively. However, freeze drying also is expensive and hard to scale up to produce dried CNFs. In contrast, oven-dried VL-MFC can be directly compounded with PLA to make composites, and their mechanical performance is among the highest values reported so far—close to the value for PLA composites reinforced with 30% of freeze-dried CNFs (90 MPa tensile strength and 6.7 GPa Young's modulus). These results suggest that combining surface modification and oven-dried cellulose fiber is a promising strategy for generating dried microfibrillate cellulose for high-performance biocomposite applications.

TABLE 3

Comparison of mechanical properties of microfibrillated cellulose-reinforced PLA composites.

| Cellulose [a] | Composite preparation methods | Tensile strength (MPa) | Young's modulus (GPa) | |
|---|---|---|---|---|
| MFC | Solvent mixing, kneading, and press molding | 75 | 4.7 | |
| CNF | Solvent mixing, then extrusion, injection molding | 71 | 3.6 | |
| MFC | Solvent mixing, kneading, and press molding | 66 | 4.5 | |
| MFC | Pre-mixed with three-roll mill, and then injection molding | 45-55 | 3.8-4.8 | |
| MFC | Solvent mixing and kneading | 70 | 5.2 | |
| Acetylated CNC | Solution casting | 70 | 1 | |
| MFC + PPA-Zn | Solvent mixing, then injection molding | 77 | 5.16 | |
| Acetylated CNF | Solvent mixing as master batch, then compounded with extrusion | 70 | 3.6 | |
| MEMO-CNF | Solvent mixing, and solution casting | 55 | 1.57[c] | |
| MA-CNC | Solution casting | 38-52 | 4.8-6.2 | |
| Acetylated CNC | Solvent casting | 66 | 3.3 | |
| g-MC | Compression molding | 70 | 2.3 [c] | |
| MFC | Compression molding | 55.8 | 3.2 | 13 |
| CNC | Solvent mixing, melting compounding, and compression molding | 38 | 3.7 | 14 |
| CNE [b] | Extrusion | 31-42 | 1.2-3 | 15 |
| Freeze dried CNC | Extrusion | 60 | 1.4 | 16 |
| Freeze dried CNF | Molten compounding and compression molding | 100 | 9 | 17 |
| Oven dried VL-MFC | Molten compounding and compression molding | 82.6 | 5.8 | This work |

Notes:
[a] MA-CNC: maleic anhydride modified CNC;
PPA-Zn: phenylphosphonic acid zinc;
MEMO-CNF: 3-methacryloxypropyltrimethoxysilane modified CNF;
g-MC: L-lactic acid oligomer grafted microcrystalline cellulose.
[b] acetylated and silylated CNF.
[c] Value didn't provide in the paper, calculated based on the data in the paper Abbreviations ATR-IR means attenuated total reflectance infrared spectra.
DSC means differential scanning calorimetry.
DMA means dynamic mechanical analysis.
e.s.d. means equivalent spherical diameter.
eV means electron volts. 0
MFC means microfibrillated cellulose.
PLA means polylactic acid.
SEM means scanning electron microscope.
TGA means thermogravimetric analysis.
VL-MFC means vinyl laurate-modified MFC.
XPS means x-ray photoelectron spectroscopy.
$T_g$ means glass transition temperature.

REFERENCES

Miao, C.; Hamad, W. Y., Cellulose reinforced polymer composites and nanocomposites: a critical review. *Cellulose* 2013, 20, 2221-2262.

Raquez, J.-M.; Habibi, Y.; Murariu, M.; Dubois, P., Polylactide (PLA)-based nanocomposites. Prog. Polym. Sci. 2013, 38, 1504-1542.

Li, K.; Skolrood, L.; Aytug, T.; Tekinalp, H.; Ozcan, S., Strong and tough cellulose nanofibrils composite films: Mechanism of synergetic effect of hydrogen bonds and ionic interactions. ACS Sustainable Chem. Eng. 2019, 7, 14341-14346.

Lu, Y.; Tekinalp, H. L.; Eberle, C. C.; Peter, W.; Naskar, A. K.; Ozcan, S., Nanocellulose in polymer composites and biomedical applications. Tappi J. 2014, 13, 47-54.

Lu, Y.; Armentrout, A. A.; Li, J.; Tekinalp, H. L.; Nanda, J.; Ozcan, S., A cellulose nanocrystal-based composite electrolyte with superior dimensional stability for alkaline fuel cell membranes. J. Mater. Chem. A, 2015, 3, 13350-13356.

Van den Oever, M.; Beck, B.; M0ssig, J., Agrofibre reinforced poly (lactic acid) composites: Effect of moisture on degradation and mechanical properties. Compos. Part A Appl. Sci. Manuf. 2010, 41, 1628-1635.

Li, K.; Wang, Y.; Rowe, M.; Zhao, X.; Li, T.; Tekinalp, H.; Ozcan, S., Poly(lactic acid) toughening through chain end engineering. ACS Appl. Polym. Mater. 2020, 2, 411-417.

Zimmermann, M. V. G.; Borsoi, C.; Lavoratti, A.; Zanini, M.; Zattera, A. J.; Santana, R. M. C., Drying techniques applied to cellulose nanofibers. J. Reinf. Plast. Compos. 2016, 35, 628-643.

Tekinalp, H. L.; Meng, X.; Lu, Y.; Kunc, V.; Love, L. J.; Peter, W. H.; Ozcan, S., High modulus biocomposites via additive manufacturing: Cellulose nanofibril networks as "microsponges". Compos. B. Eng. 2019, 173, 106817.

Alliance, A. T. Cellulose nanomaterials research roadmap; 2016.

Lin, N.; Huang, J.; Chang, P. R.; Feng, J.; Yu, J., Surface acetylation of cellulose nanocrystal and its reinforcing function in poly(lactic acid). Carbohydr. Polym. 2011, 83, 1834-1842.

Sung, S. H.; Chang, Y.; Han, J., Development of polylactic acid nanocomposite films reinforced with cellulose nanocrystals derived from coffee silverskin. Carbohydr. Polym. 2017, 169, 495-503.

Habibi, Y., Key advances in the chemical modification of nanocelluloses. Chem. Soc. Rev. 2014, 43, 1519-1542.

Hu, Z.; Berry, R. M.; Pelton, R.; Cranston, E. D., One-pot water-based hydrophobic surface modification of cellulose nanocrystals using plant polyphenols. ACS Sustainable Chem. Eng. 2017, 5, 5018-5026.

Yoo, Y.; Youngblood, J. P., Green one-pot synthesis of surface hydrophobized cellulose nanocrystals in aqueous medium. ACS Sustainable Chem. Eng. 2016, 4, 3927-3938.

Dhuiège, B.; Pecastaings, G.; Sebe, G., Sustainable approach for the direct functionalization of cellulose nanocrystals dispersed in water by transesterification of vinyl acetate. ACS Sustainable Chem. Eng. 2019, 7, 187-196.

Palange, C.; Johns, M. A.; Scurr, D. J.; Phipps, J. S.; Eichhorn, S. J., The effect of the dispersion of microfibrillated cellulose on the mechanical properties of melt-compounded polypropylene-polyethylene copolymer. Cellulose 2019, 26, 9645-9659.

ASTM Standard D638-03. Standard test method for tensile properties of plastics. West Conshohocken, PA: ASTM International. 2003.

Zhao, X.; Tekinalp, H.; Meng, X.; Ker, D.; Benson, B.; Pu, Y.; Ragauskas, A. J.; Wang, Y.; Li, K.; Webb, E.; Gardner, D. J.; Anderson, J.; Ozcan, S., Poplar as biofiber reinforcement in composites for large-scale 3D printing. ACS Applied Bio Materials 2019, 2, 4557-4570.

Meng, X.; Nguyen, N. A.; Tekinalp, H.; Lara-Curzio, E.; Ozcan, S., Supertough PLA-silane nanohybrids by in situ condensation and grafting. ACS Sustainable Chem. Eng. 2018, 6, 1289-1298.

Qi, X.; Yang, G.; Jing, M.; Fu, Q.; Chiu, F.-C., Microfibrillated cellulose-reinforced bio-based poly(propylene carbonate) with dual shape memory and self-healing properties. J. Mater. Chem. A, 2014, 2, 20393-20401.

Tingaut, P.; Zimmermann, T.; Lopez-Suevos, F., Synthesis and characterization of bionanocomposites with tunable properties from poly(lactic acid) and acetylated microfibrillated cellulose. Biomacromolecules 2010, 11, 454-64.

Siqueira, G.; Bras, J.; Dufresne, A., Cellulose whiskers versus microfibrils: Influence of the nature of the nanoparticle and its surface functionalization on the thermal and mechanical properties of nanocomposites. Biomacromolecules 2009, 10, 425-432.

Gupta, A.; Simmons, W.; Schueneman, G. T.; Hylton, D.; Mintz, E. A., Rheological and thermo-mechanical properties of poly(lactic acid)/lignin-coated cellulose nanocrystal composites. ACS Sustainable Chem. Eng. 2017, 5, 1711-1720.

Yu, H. Y.; Zhang, H.; Song, M. L.; Zhou, Y.; Yao, J.; Ni, Q. Q., From cellulose nanospheres, nanorods to nanofibers: Various aspect ratio induced nucleation/reinforcing effects on polylactic acid for robust-barrier food packaging. ACS Appl. Mater. Interfaces 2017, 9, 43920-43938.

Ding, W.; Jahani, D.; Chang, E.; Alemdar, A.; Park, C. B.; Sain, M., Development of PLA/cellulosic fiber composite foams using injection molding: Crystallization and foaming behaviors. Compos. Part A Appl. Sci. Manuf. 2016, 83, 130-139.

Suryanegara, L.; Okumura, H.; Nakagaito, A. N.; Yano, H., The synergetic effect of phenylphosphonic acid zinc and microfibrillated cellulose on the injection molding cycle time of PLA composites. Cellulose 2011, 18, 689-698.

Iwatake, A.; Nogi, M.; Yano, H., Cellulose nanofiber-reinforced polylactic acid. Compos. Sci. Technol. 2008, 68, 2103-2106.

Jonoobi, M.; Harun, J.; Mathew, A. P.; Oksman, K., Mechanical properties of cellulose nanofiber (CNF) reinforced polylactic acid (PLA) prepared by twin screw extrusion. Compos. Sci. Technol. 2010, 70, 1742-1747.

Suryanegara, L.; Nakagaito, A. N.; Yano, H., Thermo-mechanical properties of microfibrillated cellulose-reinforced partially crystallized PLA composites. Cellulose 2010, 17, 771-778.

Okubo, K.; Fujii, T.; Thostenson, E. T., Multi-scale hybrid biocomposite: Processing and mechanical characterization of bamboo fiber reinforced PLA with microfibrillated cellulose. Compos. Part A Appl. Sci. Manuf. 2009, 40, 469-475.

Suryanegara, L.; Nakagaito, A. N.; Yano, H., The effect of crystallization of PLA on the thermal and mechanical properties of microfibrillated cellulose-reinforced PLA composites. Compos. Sci. Technol. 2009, 69, 1187-1192.

Pandey, J. K.; Lee, C. S.; Ahn, S.-H., Preparation and properties of bio-nanoreinforced composites from biodegradable polymer matrix and cellulose whiskers. J. Appl. Polym. Sci. 2010, 115, 2493-2501.

Jonoobi, M.; Mathew, A. P.; Abdi, M. M.; Makinejad, M. D.; Oksman, K., A comparison of modified and unmodified cellulose nanofiber reinforced polylactic acid (pla) prepared by twin screw extrusion. J. Polym. Environ. 2012, 20, 991-997.

Lee, J. H.; Park, S. H.; Kim, S. H., Surface modification of cellulose nanowhiskers and their reinforcing effect in polylactide. Macromol. Res. 2014, 22, 424-430.

Qu, P.; Zhou, Y.; Zhang, X.; Yao, S.; Zhang, L., Surface modification of cellulose nanofibrils for poly(lactic acid) composite application. J. Appl. Polym. Sci. 2012, 125, 3084-3091.

Xiao, L.; Mai, Y.; He, F.; Yu, L.; Zhang, L.; Tang, H.; Yang, G., Bio-based green composites with high performance from poly(lactic acid) and surface-modified microcrystalline cellulose. J. Mater. Chem. 2012, 22, 15732-15739.

Tanpichai, S.; Sampson, W. W.; Eichhorn, S. J., Stress-transfer in microfibrillated cellulose reinforced poly(lactic acid) composites using Raman spectroscopy. Compos. Part A Appl. Sci. Manuf 2012, 43, 1145-1152.

Arias, A.; Heuzey, M.-C.; Huneault, M. A.; Ausias, G.; Bendahou, A., Enhanced dispersion of cellulose nanocrystals in melt-processed polylactide-based nanocomposites. Cellulose 2014, 22, 483-498.

Robles, E.; Urruzola, I.; Labidi, J.; Serrano, L., Surface-modified nano-cellulose as reinforcement in poly(lactic acid) to conform new composites. Ind. Crop. Prod. 2015, 71, 44-53.

References discussed in the application are incorporated by reference in their entirety.

All patents, patent applications and publications cited herein are hereby incorporated by reference in their entirety. The disclosures of these publications in their entireties are hereby incorporated by reference into this application.

The disclosures of each and every patent, patent application, publication, and accession number cited herein are hereby incorporated herein by reference in their entirety.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

The foregoing embodiments and advantages are merely exemplary and are not to be construed as limiting the present invention. The present disclosures can be readily applied to other types of methods. Also, the description of the embodiments of the present invention is intended to be illustrative and not to limit the scope of the claims. Many alternatives, modifications, and variations will be apparent to those skilled in the art.

The various embodiments described in this specification can be combined to provide further embodiments. Aspects of the embodiments can be modified, if necessary to employ concepts of the various patents, applications and publications to provide yet further embodiments.

While the present disclosure has been disclosed with reference to various embodiments, it is apparent that other embodiments and variations of these may be devised by others skilled in the art without departing from the true spirit and scope of the disclosure. The appended claims are intended to be construed to include all such embodiments and equivalent variations.

The foregoing written specification is considered to be sufficient to enable one skilled in the art to practice the embodiments. The foregoing description and Examples detail certain embodiments and describes the best mode contemplated by the inventors. It will be appreciated, however, that no matter how detailed the foregoing may appear in text, the embodiment may be practiced in many ways and should be construed in accordance with the appended claims and any equivalents thereof.

What is claimed is:

1. A process for producing a vinyl-carboxylate, surface-modified microfibrillated cellulose-thermoplastic polyester or thermoplastic polyolefin biocomposite material having improved mechanical strength properties, the method comprising the following steps:
   (a) preparing a dried, vinyl-carboxylate, surface-modified microfibrillated cellulose directly from pulp that is a water suspension of cellulose fibers by water-based surface modification of the suspended microfibrillated cellulose fibers including transesterification in the aqueous phase with water as the only solvent, and subsequent drying of the surface-modified microfibrillated cellulose;
   (b) heating and mixing a thermoplastic polyester or thermoplastic polyolefin;
   (c) combining the dried vinyl-carboxylate, surface-modified microfibrillated cellulose with the heated thermoplastic polyester or thermoplastic polyolefin in a mixing apparatus; and
   (d) recovering the vinyl-carboxylate, surface-modified microfibrillated cellulose-thermoplastic polyester or thermoplastic polyolefin biocomposite; wherein the vinyl-carboxylate, surface-modified microfibrillated cellulose thermoplastic polyester or thermoplastic polyolefin biocomposite demonstrates improved tensile strength and Young's modulus compared to neat thermoplastic polyester or thermoplastic polyolefin.

2. The process according to claim 1, wherein the vinyl-carboxylate, surface-modified microfibrillated cellulose content of the vinyl-carboxylate, surface-modified microfibrillated cellulose-thermoplastic polyester biocomposite is about 5 wt. %.

3. The process according to claim 1, wherein the vinyl-carboxylate, surface-modified microfibrillated cellulose content of the vinyl carboxylate, surface-modified microfibrillated cellulose-thermoplastic polyester biocomposite is about 10 wt. %.

4. The process according to claim 1, wherein the vinyl-carboxylate, surface-modified microfibrillated cellulose content of the vinyl carboxylate, surface-modified microfibrillated cellulose-thermoplastic polyester biocomposite is about 15 wt. %.

5. The process according to claim 1, wherein the vinyl-carboxylate, surface-modified microfibrillated cellulose content of the vinyl-carboxylate, surface-modified microfibrillated cellulose-thermoplastic polyester biocomposite is about 20 wt. %.

6. The process according to claim 1, wherein the vinyl-carboxylate, surface-modified microfibrillated cellulose content of the vinyl-carboxylate, surface-modified microfibrillated cellulose thermoplastic polyester biocomposite is about 25 wt. %.

7. The process according to claim 1, wherein the vinyl-carboxylate, surface-modified microfibrillated cellulose content of the vinyl carboxylate, surface-modified microfibrillated cellulose-thermoplastic polyester biocomposite is about 30 wt. %.

8. The process according to claim 1, wherein the vinyl-carboxylate, surface-modified microfibrillated cellulose content of the vinyl carboxylate, surface-modified microfibrillated cellulose-thermoplastic polyester biocomposite is about 40 wt. %.

9. The process according to claim 1, wherein the vinyl-carboxylate, surface-modified microfibrillated cellulose content of the vinyl carboxylate, surface-modified microfibrillated cellulose-thermoplastic polyester biocomposite is about 50 wt. %.

10. The process according to claim 1, wherein the vinyl-carboxylate, surface-modified microfibrillated cellulose content of the vinyl carboxylate, surface-modified microfibrillated cellulose-thermoplastic polyester biocomposite is about 30 wt. % to about 50 wt. %.

11. The process according to claim 1, wherein the vinyl-carboxylate, surface-modified microfibrillated cellulose content of the vinyl carboxylate, surface-modified microfibrillated cellulose-thermoplastic polyester biocomposite is about 20 wt. % to about 50 wt. %.

12. The process according to claim 1, wherein the vinyl-carboxylate, surface-modified microfibrillated cellulose content of the vinyl carboxylate, surface-modified microfibrillated cellulose-thermoplastic polyester biocomposite is about 20 wt. % to about 40 wt. %.

13. The process according to any one of claims 1 to 12, wherein the vinyl carboxylate is vinyl laurate.

14. The process according to claim 1, wherein the thermoplastic polyester is polylactic acid.

15. The process according to claim 1, wherein the thermoplastic polyester is selected from the group consisting of polyglycolic acid (PGA), polylactic acid (PLA), polycaprolactone (PCL), polyhydroxyalkanoate (PHA), polyethylene adipate (PEA), and polyhydroxybutyrate (PHB), poly(lactic-co-glycolic acid (PLGA) and poly(lactic-co-glycolic acid)-poly-L-lysine (PLGA-PLL).

16. The process according to claim 1, wherein the thermoplastic polyester is selected from the group consisting of polyethylene terephthalate (PET), polybutylene terephthalate (PBT), polytrimethylene terephthalate (PTT) and polyethylene naphthalate (PEN).

17. The process according to claim 16, wherein the temperature in step (b) is about 80° C.

18. The process according to claim 1, wherein the thermoplastic polyester is a polycondensation copolymer of 4-hydroxybenzoic acid and 6-hydroxynaphthalene-2-carboxylic acid (LCP) or a polyester of Bisphenol A and phthalic acid (PAR).

19. The process according to claim 1, wherein the thermoplastic polyester is polybutylene succinate, or poly (3-hydroxybutyrate-co-3-hydroxyvalerate (PHBV).

20. The process according to claim 1, wherein the thermoplastic polyester is an aliphatic polyester, aliphatic and semi-aromatic copolymers, or an aromatic copolymer.

21. The process according to claim 1, wherein the thermoplastic polyolefin is selected from the group consisting of polyethylene (PE), polypropylene (PP), polymethylpentene (PMP), and polybutene-1 (PB-1).

22. The process according to claim 1, wherein the thermoplastic polyolefin is selected from the group consisting of polyisobutylene (PIB), ethylene propylene rubber (EPR), and ethylene propylene diene monomer (M-class) rubber (EPDM rubber).

23. The process of any one of claims 1 to 12, wherein the vinyl carboxylate is selected from the group of vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octylate, vinyl methacrylate, vinyl crotonate, vinyl sorbate, vinyl benzoate, or vinyl cinamate, still more preferably vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, or vinyl octylate, and most preferably vinyl acetate, vinyl propionate, or vinyl butyrate.

24. The process according to claim 1, further comprising the step of grinding the dried, vinyl-carboxylate, surface-modified microfibrillated cellulose.

* * * * *